United States Patent [19]

Hirata et al.

[11] 4,456,349
[45] Jun. 26, 1984

[54] CINEMATOGRAPHIC CAMERA

[75] Inventors: Noritsugu Hirata, Kanagawa; Hidekazu Okajima, Tokyo; Tomoshi Takigawa, Tokyo; Toshikazu Ichiyanagi, Tokyo; Hiroyuki Takimoto, Saitama, all of Japan

[73] Assignee: Canon Kabushiki Kaisha, Tokyo, Japan

[21] Appl. No.: 116,387

[22] Filed: Jan. 29, 1980

Related U.S. Application Data

[63] Continuation of Ser. No. 832,061, Sep. 9, 1977, abandoned.

[30] Foreign Application Priority Data

Sep. 9, 1976 [JP] Japan .................................. 51-108310
May 7, 1977 [JP] Japan .................................. 52-52533

[51] Int. Cl.³ .......................... G03B 9/26; G03B 21/36
[52] U.S. Cl. ................................... 352/91 C; 352/218
[58] Field of Search .................. 354/23 D; 352/91 R, 352/91 C, 91 S, 141, 214, 216, 217, 215, 218

[56] References Cited

U.S. PATENT DOCUMENTS 2,008,924  7/1935  Owens ........................... 352/218 X
3,490,835  1/1970  Nemeth et al. ...................... 352/141
3,748,029  7/1973  Sakaguchi et al. ................ 352/91 S
4,009,959  3/1977  Watson et al. ................. 352/91 R X
4,103,307  7/1970  Shinoda et al. .................. 354/23 D

FOREIGN PATENT DOCUMENTS 2651002  5/1977  Fed. Rep. of Germany ... 354/23 D

Primary Examiner—William B. Perkey
Attorney, Agent, or Firm—Toren, McGeady and Stanger

[57] ABSTRACT

This invention relates to a cinematographic camera and more particularly to a method of controlling operation of the cinematographic camera in accordance with a sequence of instructions programmed to carry out a photographic process. In order to carry out a plurality of operating modes by use of one and the same control circuit, the program is planed to include a plurality of different photographic process program sections along with a selection program for selection of any one of said process program sections.

7 Claims, 57 Drawing Figures

| IN | | OUT | | |
|---|---|---|---|---|
| HEX | PROGRAM INSTRUCTION | HEX | PROGRAM INSTRUCTION | DEVICE |
| #10 | RL | #10 | DISP 1 | LED |
| #11 | MODE | #11 | CONT 1 | Mg1,FILM MOTOR |
| #12 | FPS | #12 | CONT 2 | PULSE MOTOR |
| #13 | TIME | #13 | DISP 2 | LED |
| #14 | DEG | #14 | CONT 3 | Mg2 |
| #15 | DATA SET | #15 | CONT 4 | Mg3 |
| #18 | PHASE | #16 | CONT 5 | |
| #20 | EXT | #17 | CONT 6 | |
| #21 | LEVEL | | | |
| #22 | ICC | | | |

FIG.5c

| MBDATA 0-1-2-3-L | | | | #10 (RL) | | | | #11 MODE | | | | | #12 FPS | MODE | #13 TIME | | | | #14 DEG | | | | | #15 DATASET | |
|---|---|---|---|---|---|---|---|---|---|---|---|---|---|---|---|---|---|---|---|---|---|---|---|---|---|---|
| HEX | 3 | 2 | 1 | 0 | SW₁ | SW₂ | SW₃ | SW₄ | SW₅ | SW₆ | SW₇ | SW₈ | | | SW₁₂ | SW₁₃ | SW₁₄ | SW₁₅ | TIME | SW₁₆ | SW₁₇ | SW₁₈ | SW₁₉ | DEG | SW₂₀ | SW₂₁ |
| #0 | H | H | H | H | OFF | OFF | OFF | OFF | OFF | OFF | OFF | OFF | NORM | 1 | OFF | OFF | OFF | OFF | AUTO | OFF | OFF | OFF | OFF | AUTO | ON | OFF |
| #1 | H | H | H | L | ON | OFF | OFF | OFF | OFF | ON | OFF | OFF | DIAPHRAGM | 9 | ON | OFF | OFF | OFF | 1/8 | ON | OFF | OFF | OFF | 220° | OFF | ON |
| #2 | H | H | L | H | | | | | OFF | ON | OFF | OFF | MM | 18 | OFF | ON | OFF | OFF | 1/4 | OFF | ON | OFF | OFF | 200° | | |
| #3 | H | H | L | L | ON | OFF | OFF | OFF | ON | ON | OFF | OFF | IWS | 24 | ON | ON | OFF | OFF | 1/2 | ON | ON | OFF | OFF | 180° | | |
| #4 | H | L | H | H | | | | | OFF | OFF | ON | OFF | WS | SM | OFF | OFF | ON | OFF | 1 | OFF | OFF | ON | OFF | 160° | | |
| #5 | H | L | H | L | ON | OFF | OFF | OFF | ON | OFF | ON | OFF | ST | | ON | OFF | ON | OFF | 2 | ON | OFF | ON | OFF | 140° | | |
| #6 | H | L | L | H | | | | | OFF | ON | ON | OFF | TE1 | | OFF | ON | ON | OFF | 4 | OFF | ON | ON | OFF | 120° | | |
| #7 | H | L | L | L | ON | OFF | ON | ON | ON | ON | ON | OFF | TE2 | | ON | ON | ON | OFF | 8 | ON | ON | ON | OFF | 100° | | |
| #8 | L | H | H | H | | | | | OFF | OFF | OFF | ON | FI | | OFF | OFF | OFF | ON | 16 | OFF | OFF | OFF | ON | 80° | | |
| #9 | L | H | H | L | ON | ON | OFF | OFF | ON | OFF | OFF | ON | FO | | | | | | | ON | OFF | OFF | ON | 60° | | |
| #A | L | H | L | H | | | | | OFF | ON | OFF | ON | OL | | | | | | | OFF | ON | OFF | ON | 40° | | |
| #B | L | H | L | L | ON | ON | OFF | OFF | ON | ON | OFF | ON | WI | | | | | | | ON | ON | OFF | ON | 20° | | |
| #C | L | L | H | H | | | | | OFF | OFF | ON | ON | WO | | | | | | | OFF | OFF | ON | ON | 0° | | |
| #D | L | L | H | L | | | | | ON | OFF | ON | ON | WL | | | | | | | | | | | | | |
| #E | L | L | L | H | | | | | | | | | | | | | | | | | | | | | | |
| #F | L | L | L | L | | | | | | | | | | | | | | | | | | | | | | |

FIG.5d

| MBADD0~7 HEX DATA | OPERATION OF OUTPUT DEVICE | | | HEX | MBDATA 0~7 | | | | | | | |
|---|---|---|---|---|---|---|---|---|---|---|---|---|
| | | | | | 7 | 6 | 5 | 4 | 3 | 2 | 1 | 0 |
| #10 | LED DISPLAY (SHUTTER PHASE) | | | #00~#0F | H | H | H | H | L | L | L | L |
| #11 | Mg1 DE-ENERGIZED | FM(FILM MOTOR) STOP | | #02 | H | H | H | H | H | L | H | L |
| | " | FORWARD DIRECTION | | #06 | H | H | H | H | L | H | H | L |
| | " | REVERSE DIRECTION | | #00 | H | H | H | H | H | H | H | H |
| | ENERGIZED | STOP | | #03 | H | H | H | H | H | L | L | L |
| | " | FORWARD DIRECTION | | #07 | H | H | H | H | L | L | L | L |
| #12 | PULSE MOTOR | STOP | | #00 | H | H | H | H | H | H | H | H |
| | " | CLOCKWISE DIRECTION | | #20 | H | H | L | H | H | H | H | H |
| | " | COUNTER CLOCKWISE DIRECTION | | #10 | H | H | H | L | H | H | H | H |
| #13 | | LED | ON | #30 | H | H | L | L | H | H | H | H |
| | | | OFF | #00 | H | H | H | H | H | H | H | H |
| #14 | | TIME DATA LED | ON | #40 | H | L | H | H | H | H | H | H |
| | | | OFF | #00 | H | H | H | H | H | H | H | H |
| #15 | | OPENING ANGLE DATA LED | ON | #80 | L | H | H | H | H | H | H | H |
| | | | OFF | #00 | H | H | H | H | H | H | H | H |

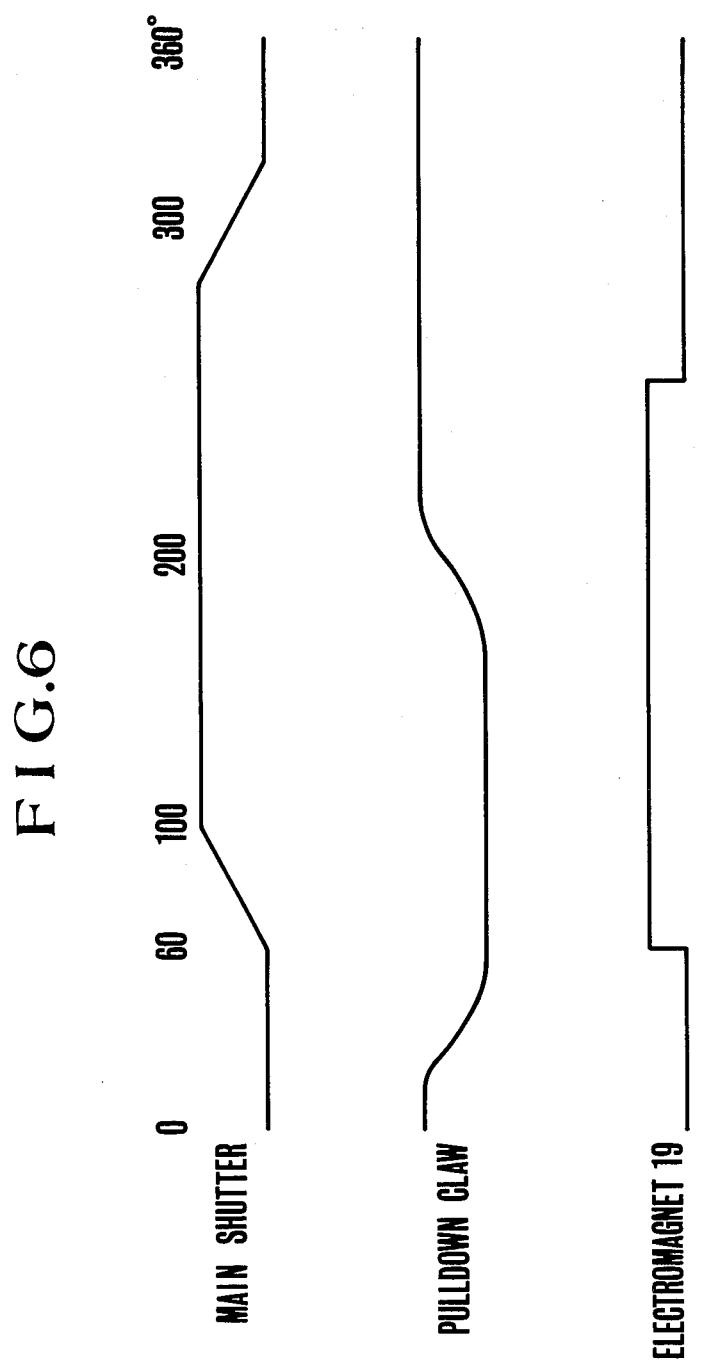

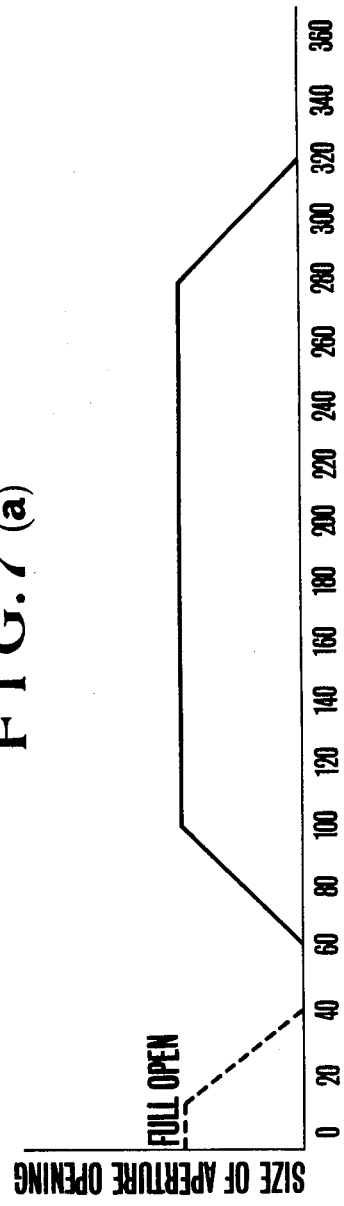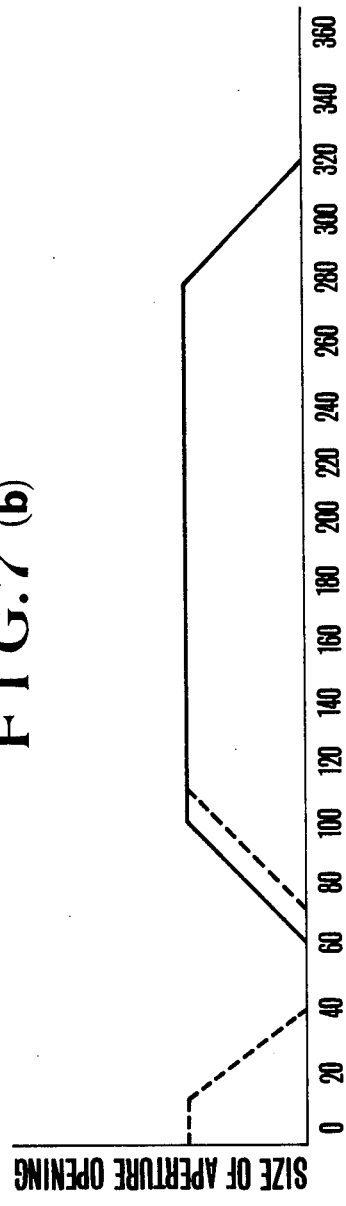

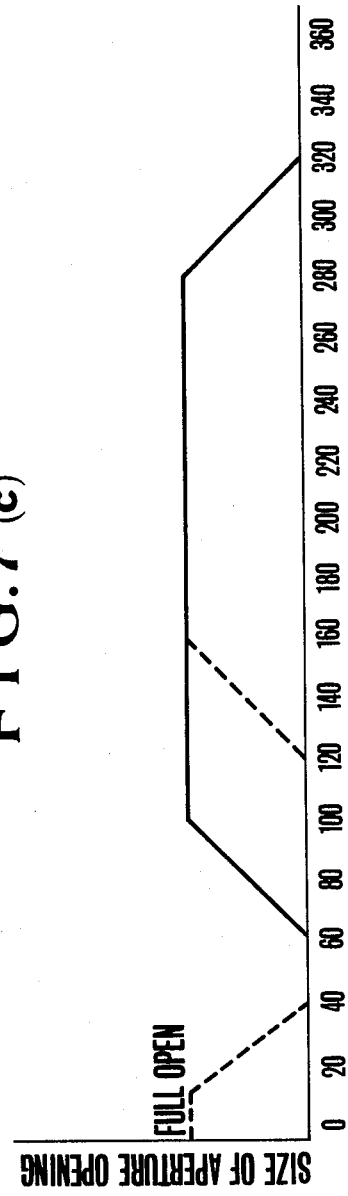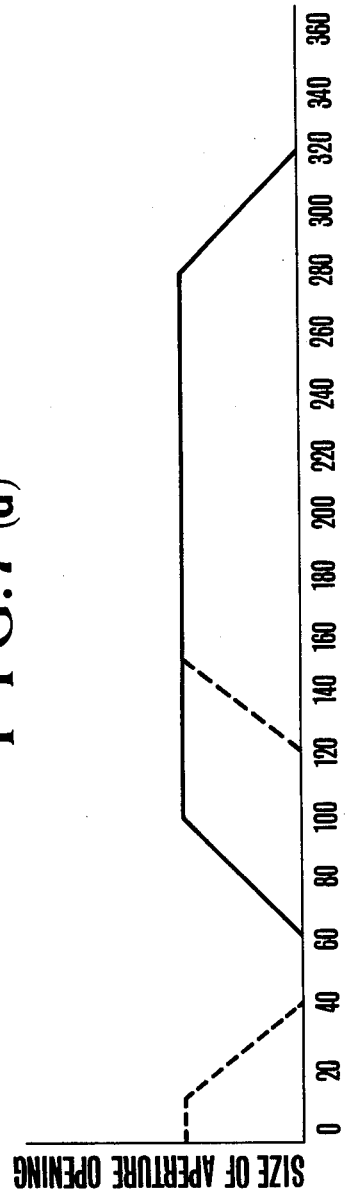

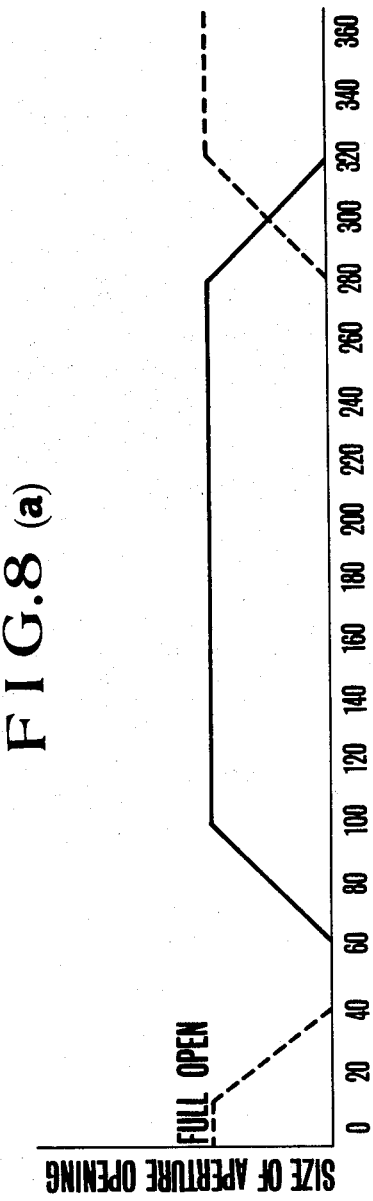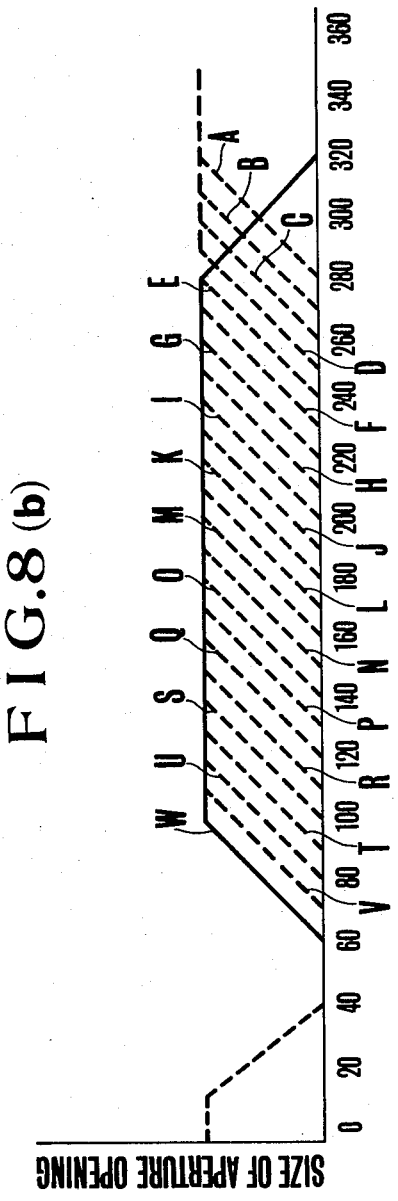

FIG.11

| INSTRUCTION SYMBOL | OPERAND | INSTRUCTION CODE | | | CONTENT & MEANING OF OPERATION ACCORDING TO INSTRUCTION | EFFECT ON CARRY FLIP-FLOP |
|---|---|---|---|---|---|---|
| | | FIRST BITE | SECOND BITE | THIRD BITE | | |
| MOV | A,E | 7B  01111011 | | | TRANSFER 8 BITS DATA IN REGISTER E TO REGISTER A | |
| MOV | E,A | 5F  01011111 | | | " A " " " " A | |
| MOV | L,A | 6F  01101111 | | | " A " " " " L | |
| MOV | H,A | 67  01100111 | | | " A " " " " H | |
| MVI | A | 3E  00111110 | 8 BITS DATA | | SET 8 BITS DATA OF SECOND BITE IN REGISTER A | |
| MVI | B | 06  00000110 | " | | " " " " " " B | |
| MVI | D | 16  00010110 | " | | " " " " " " D | |
| INR | E | 1C  00011100 | | | ADD +1 TO DATA IN REGISTER E | |
| DCR | A | 3D  00111101 | | | ADD −1 TO DATA IN REGISTER A | |
| DCR | B | 05  00000101 | | | " " " " " " B | |
| DCR | D | 15  00010101 | | | " " " " " " D | |
| DCR | E | 1D  00011101 | | | " " " " " " E | |
| DCR | H | 25  00100101 | | | " " " " " " H | |
| DCR | L | 2D  00101101 | | | " " " " " " L | |
| SUB | E | 93  10010011 | | | SET IN REGISTER A DIFFERENCE BETWEEN DATA IN REGISTERS A AND E. | EFFECTIVE |
| SUI | | D6  11010110 | 8 BITS DATA | | SET IN REGISTER A DIFFERENCE BETWEEN 8 BITS DATA OF SECOND BITE AND DATA IN REGISTER A. | EFFECTIVE |
| ANI | | E6  11100110 | 8 BITS DATA | | SET IN REGISTER A LOGIC PRODUCT OF 8 BITS DATA OF SECOND BITE AND DATA IN REGISTER A. | EFFECTIVE |
| CPI | | FE  11111110 | 8 BITS DATA | | COMPARE 8 BITS DATA OF SECOND BITE AND DATA IN REGISTER A. CONTENT OF REGISTER A UNCHANGED. | EFFECTIVE |
| RLC | | 07  00000111 | | | SHIFT DATA IN REGISTER A TO LEFT BY 1 BIT. ADVANCE A7 AND A0 TO CARRY F/F. A0 · 1 = A7 | |
| STA | | 32  00110010 | 8 BITS DATA | 8 BITS DATA | MAKE THIRD BINARY WORD UPPER ADDRESS AND SECOND BITE LOWER ADDRESS. TRANSFER DATA IN REGISTER A TO MEMORY ADDRESS. | |
| OUT | | D3  11010011 | 8 BITS DATA | | SEND I/O DEVICE CODE DENOTED IN SECOND BITE TO ADDRESS BUS AND DATA IN REGISTER A TO DATA BUS. | |
| IN | | DB  11011011 | 8 BITS DATA | | SEND I/O DEVICE CODE DENOTED IN SECOND BITE TO ADRESS BUS AND DATA AT DATA BUS TO REGISTER A. | |
| JMP | | C3  11000011 | 8 BITS DATA | 8 BITS DATA | JUMP TO MEMORY ADDRESS FOR THIRD BITE MADE UPPER ADDRESS AND SECOND BITE LOWER ADDRESS. | |
| JNZ | | C2  11000010 | " | " | JUMP TO MEMORY ADDRESS FOR THIRD BITE MADE UPPER ADDRESS AND SECOND BITE LOWER ADDRESS WHEN DATA IN REGISTER IS NOT 0. | |
| JZ | | CA  11001010 | " | " | JUMP TO MEMORY ADDRESS FOR THIRD BITE MADE UPPER ADDRESS AND SECOND BITE LOWER ADDRESS WHEN DATA IN REGISTER A IS 0. | |
| JP | | F2  11110010 | " | " | JUMP TO MEMORY ADDRESS FOR THIRD BITE MADE UPPER ADDRESS AND SECOND BITE LOWER ADDRESS WHEN DATA IN REGISTER A IS POSITIVE. | |
| CALL | | CD  11001101 | 8 BITS DATA | 8 BITS DATA | JUMP TO MEMORY ADDRESS FOR THIRD BITE MADE UPPER ADDRESS AND SECOND BITE LOWER ADDRESS. | |
| RET | | C9  11001001 | | | | |
| LDA | | 3A  00111010 | 8 BITS DATA | 8 BITS DATA | TRANSFER DATA IN MEMORY ADDRESS FOR THIRD BITE MADE UPPER ADDRESS AND SECOND BITE LOWER ADDRESS TO REGISTER A. | |

FIG.12-1

| STATEMENT NO. | NAME OF BRANCH | INSTRUCTION | OPERAND | |
|---|---|---|---|---|
| STMT | SOURCE | STATEMENT | | |
| 1 | RL | EQU | #10 | RELEASE SW |
| 2 | MODE | EQU | #11 | MODE SW |
| 3 | FPS | EQU | #12 | FRAMES/SEC DATA SW |
| 4 | TIME | EQU | #13 | TIME DATA SW |
| 5 | DEG | EQU | #14 | DEGREE DATA SW |
| 6 | PHASE | EQU | #18 | SHUTTER PHASE PULSES |
| 7 | DATASET | EQU | #15 | TIME, DEG DATASET SW |
| 8 | DISP 1 | EQU | #10 | DISPLAY 1 |
| 9 | CONT 1 | EQU | #11 | CONTROL 1 |
| 10 | CONT 2 | EQU | #12 | CONTROL 2 |
| 11 | DISP 2 | EQU | #13 | DISPLAY 2 |
| 12 | CONT 3 | EQU | #14 | |
| 13 | CONT 4 | EQU | #15 | |
| 14 | CONT 5 | EQU | #16 | |
| 15 | CONT 6 | EQU | #17 | |
| 16 | EXT | EQU | #20 | QUANTITY OF EXPOSURE |
| 17 | LEVEL | EQU | #21 | EXPOSURE LEVEL SETTING |
| 18 | DEG1M | EQU | #41F1 | INITIAL DEG MEMORY |
| 19 | DEG2M | EQU | #41F2 | END DEG MEMORY |
| 20 | | ORG | #4200 | |
| 21 | INITIAL | IN | MODE | |
| 22 | | CPI | #00 | |
| 23 | | JZ | NORM | NORMAL=0 |
| 24 | INITI 1 | CPI | #01 | |
| 25 | | JZ | DIAPHRAGM | DIAPHRAGM PREFERENCE=#01 |

FIG.12-2

| STATEMENT NO. | NAME OF BRANCH | INSTRUCTION | OPERAND | |
|---|---|---|---|---|
| 26 | INITI 2 | CPI | #02 | |
| 27 | | JZ | MM | MEMO MOTION =#02 |
| 28 | INITI 3 | CPI | #03 | |
| 29 | | JZ | IWS | INDENT WORK SUMPLING =#03 |
| 30 | INITI 4 | CPI | #04 | |
| 31 | | JZ | WS | WORK SUMPLING =#04 |
| 32 | INITI 5 | CPI | #05 | |
| 33 | | JZ | ST | SELF TIMER =#05 |
| 34 | INITI 6 | CPI | #06 | |
| 35 | | JZ | TE 1 | TIME EXPOSURE 1 =#06 |
| 36 | INITI 7 | CPI | #07 | |
| 37 | | JZ | TE 2 | TIME EXPOSURE 2 =#07 |
| 38 | INITI 8 | CPI | #08 | |
| 39 | | JZ | FI | FADE IN=#08 |
| 40 | INITI 9 | CPI | #09 | |
| 41 | | JZ | FO | FADE OUT=#09 |
| 42 | INITI 10 | CPI | #0A | |
| 43 | | JZ | OL | OVER LAP=#0A |
| 44 | INITI 11 | CPI | #0B | |
| 45 | | JZ | WI | WIPE IN =#0B |
| 46 | INITI 12 | CPI | #0C | |
| 47 | | JZ | WO | WIPE OUT=#0C |
| 48 | INITI 13 | CPI | #0D | |
| 49 | | JZ | WL | WIPE LAP=#0D |
| 50 | INITI 14 | JMP | INITIAL | |

FIG.12-3

| STATEMENT NO. | NAME OF BRANCH | INSTRUCTION | OPERAND |
|---|---|---|---|
| 51 | •NORMAL• | | |
| 52 | NORM | CALL | PMOST |
| 53 | NORM 1 | IN | RL |
| 54 | | CPI | #03 |
| 55 | | JNZ | NRM |
| 56 | | CALL | START |
| 57 | NORM 2 | IN | RL |
| 58 | | SUI | #02 |
| 59 | | JP | NORM 2 |
| 60 | Z 1 | IN | PHASE |
| 61 | | CPI | 34 |
| 62 | | JNZ | Z 1 |
| 63 | | CALL | STOP |
| 64 | | MVI | B, #00 |
| 65 | | IN | MODE |
| 66 | | CMP | B |
| 67 | | JZ | NORM 1 |
| 68 | NORM 3 | JMP | INITI 1 |
| 69 | •DIAPHRAGM PREFERENCE• | | |
| 70 | DIAPHRAGM | CALL | PMOST |
| 71 | DIAPHRAGM 1 | IN | RL |
| 72 | | CPI | #07 |
| 73 | | JNZ | SBRI |
| 74 | | CALL | START |
| 75 | DIAPHRAGM 2 | IN | EXT |

FIG.12-4

| STATEMENT NO. | NAME OF BRANCH | INSTRUCTION | OPERAND |
|---|---|---|---|
| 76 |  | MOV | E, A |
| 77 |  | CALL | SHUTTER |
| 78 |  | IN | RL |
| 79 |  | SUI | #02 |
| 80 |  | JP | DIAPHRAGM |
| 81 | Z2 | IN | PHASE |
| 82 |  | CPI | 34 |
| 83 |  | JNZ | Z2 |
| 84 |  | CALL | STOP |
| 85 |  | MVI | B, #01 |
| 86 |  | IN | MODE |
| 87 |  | CMP | B |
| 88 |  | JZ | DIAPHRAGM 1 |
| 89 | DIAPHRAGM | JMP | INITI 2 |
| 90 | •MEMO MOTION• |  |  |
| 91 | MM | CALL | PMOST |
| 92 |  | CALL | T1 SET |
| 93 | MM 1 | IN | RL |
| 94 |  | CPI | #07 |
| 95 |  | JNZ | MMB |
| 96 | MM 2 | CALL | START |
| 97 | K 1 | IN | PHASE |
| 98 |  | CPI | 34 |
| 99 |  | JNZ | K1 |
| 100 |  | CALL | STOP |

FIG. 12-5

| STATEMENT NO. | NAME OF BRANCH | INSTRUCTION | OPERAND |
|---|---|---|---|
| 101 | | CALL | T1 |
| 102 | | IN | RL |
| 103 | | SUI | #02 |
| 104 | | JP | MM2 |
| 105 | | CALL | STOP |
| 106 | | MVI | B, #02 |
| 107 | | IN | MODE |
| 108 | | CMP | B |
| 109 | | JZ | MM 1 |
| 110 | MM 3 | JMP | INITI 3 |
| 111 | •INDENT WORD SUMPLING• | | |
| 112 | IWS | CALL | PMOST |
| 113 | | CALL | T12SET |
| 114 | | MVI | D, 4 |
| 115 | IWS 1 | IN | RL |
| 116 | | CPI | #07 |
| 117 | | JNZ | IWSB |
| 118 | IWS 2 | CALL | START |
| 119 | K2 | IN | PHASE |
| 120 | | CPI | 34 |
| 121 | | JNZ | K2 |
| 122 | | CALL | STOP |
| 123 | | CALL | T1 |
| 124 | | DCR | D |
| 125 | | JNZ | IWS 2 |

FIG. 12-6

| STATEMENT NO. | NAME OF BRANCH | INSTRUCTION | OPERAND |
|---|---|---|---|
| 126 | | CALL | T2 |
| 127 | | MVI | D, 4 |
| 128 | | IN | RL |
| 129 | | SUI | #02 |
| 130 | | JP | IWS 2 |
| 131 | | CALL | STOP |
| 132 | | MVI | B, #03 |
| 133 | | IN | MODE |
| 134 | | CMP | B |
| 135 | | JZ | IWS 1 |
| 136 | IWS 4 | JMP | INITI 4 |
| 137 | *WORK SUMPLING* | | |
| 138 | WS | CALL | PMOST |
| 139 | | CALL | T12SET |
| 140 | WS 1 | IN | RL |
| 141 | | CPI | #07 |
| 142 | | JNZ | WSB |
| 143 | WS 2 | CALL | START |
| 144 | | CALL | T1 |
| 145 | K3 | IN | PHASE |
| 146 | | CPI | 34 |
| 147 | | JNZ | K3 |
| 148 | | CALL | STOP |
| 149 | | CALL | T2 |
| 150 | | IN | RL |

FIG.12-7

| STATEMENT NO. | NAME OF BRANCH | INSTRUCTION | OPERAND |
|---|---|---|---|
| 151 | | SUI | #02 |
| 152 | | JP | WS 2 |
| 153 | | CALL | STOP |
| 154 | | MVI | B, #04 |
| 155 | | IN | MODE |
| 156 | | CMP | B |
| 157 | | JZ | WS 1 |
| 158 | WS 3 | JMP | INITI 5 |
| 159 | • SELF TIMER • | | |
| 160 | ST | CALL | PMOST |
| 161 | | CALL | T12SET |
| 162 | ST 1 | IN | RL |
| 163 | | CPI | #07 |
| 164 | | JNZ | STB |
| 165 | | CALL | T1 |
| 166 | | CALL | START |
| 167 | | CALL | T2 |
| 168 | K4 | IN | PHASE |
| 169 | | CPI | 34 |
| 170 | | JNZ | K4 |
| 171 | | CALL | STOP |
| 172 | | MVI | B, #05 |
| 173 | | IN | MODE |
| 174 | | CMP | B |
| 175 | | JZ | ST 1 |

FIG.12-8

| STATEMENT NO. | NAME OF BRANCH | INSTRUCTION | OPERAND |
|---|---|---|---|
| 176 | ST 2 | JMP | INITI 6 |
| 177 | •TIME EXPOSURE1• | | |
| 178 | TE 1 | CALL | PMOST |
| 179 | | CALL | T12SET |
| 180 | TE 11 | IN | RL |
| 181 | | CPI | #07 |
| 182 | | JNZ | TE1B |
| 183 | TE 13 | CALL | START |
| 184 | TE 12 | IN | PHASE |
| 185 | | CPI | 16 |
| 186 | | JNZ | TE 12 |
| 187 | | CALL | STOP |
| 188 | | CALL | T1 |
| 189 | | CALL | START |
| 190 | K5 | IN | PHASE |
| 191 | | CPI | 34 |
| 192 | | JNZ | K5 |
| 193 | | CALL | STOP |
| 194 | | CALL | T2 |
| 195 | | IN | RL |
| 196 | | SUI | #02 |
| 197 | | JP | TE 13 |
| 198 | | CALL | STOP |
| 199 | | MVI | B, #06 |
| 200 | | IN | MODE |

FIG.12-9

| STATEMENT NO. | NAME OF BRANCH | INSTRUCTION | OPERAND |
|---|---|---|---|
| 201 | | CMP | B |
| 202 | | JZ | TE 11 |
| 203 | TE 14 | JMP | INITI 7 |
| 204 | •TIME EXPOSURE 2• | | |
| 205 | TE 2 | CALL | PMOST |
| 206 | TE 21 | IN | RL |
| 207 | | CPI | #07 |
| 208 | | JNZ | TE2B |
| 209 | | IN | LEVEL |
| 210 | | MOV | E, A |
| 211 | TE 24 | CALL | START |
| 212 | TE 22 | IN | PHASE |
| 213 | | CPI | 16 |
| 214 | | JNZ | TE 22 |
| 215 | | CALL | STOP |
| 216 | TE 23 | IN | ICC ICC=#22 |
| 217 | | SUB | E |
| 218 | | JNZ | TE 23 |
| 219 | | CALL | START |
| 220 | K6 | IN | PHASE |
| 221 | | CPI | 34 |
| 222 | | JNZ | K6 |
| 223 | | CALL | STOP |
| 224 | | IN | RL |
| 225 | | SUI | #02 |

FIG.12-10

| STATEMENT NO. | NAME OF BRANCH | INSTRUCTION | OPERAND |
|---|---|---|---|
| 226 | | JP | TE 24 |
| 227 | | MVI | B, #07 |
| 228 | | IN | MODE |
| 229 | | CMP | B |
| 230 | | JZ | TE 21 |
| 231 | TE 25 | JMP | INITI 8 |
| 232 | •FADE IN• | | |
| 233 | FI | CALL | PMOST |
| 234 | | CALL | D12SET |
| 235 | FI 1 | IN | RL |
| 236 | | CPI | #07 |
| 237 | | JNZ | FIB |
| 238 | | LDA | DEG1M |
| 239 | | MOV | E, A |
| 240 | | CALL | START |
| 241 | FI 5 | MVI | D, 6 |
| 242 | FI 2 | CALL | SHUTTER |
| 243 | | DCR | D |
| 244 | | JNZ | FI 2 |
| 245 | | INR | E |
| 246 | | CALL | DISPLAY 1 |
| 247 | | LDA | DEG2M |
| 248 | | SUB | E |
| 249 | | JNZ | FI5 |
| 250 | FI 3 | CALL | CHUTTER |

F I G.12-11

| STATEMENT NO. | NAME OF BRANCH | INSTRUCTION | OPERAND |
|---|---|---|---|
| 251 |  | IN | RL |
| 252 |  | SUI | #02 |
| 253 |  | JP | FI 3 |
| 254 | K7 | IN | PHASE |
| 255 |  | CPI | 34 |
| 256 |  | JNZ | K7 |
| 257 |  | CALL | STOP |
| 258 |  | MVI | B, #08 |
| 259 |  | IN | MODE |
| 260 |  | CMP | B |
| 261 |  | JZ | F11 |
| 262 | FI 4 | JMP | INITI 9 |
| 263 | •FADE OUT• |  |  |
| 264 | FO | CALL | PMOST |
| 265 |  | CALL | D12SET |
| 266 | FO 1 | IN | RL |
| 267 |  | CPI | #07 |
| 268 |  | JNZ | FOB |
| 269 |  | LDA | DEG1M |
| 270 |  | MOV | E, A |
| 271 |  | CALL | START |
| 272 | FO 5 | MVI | D, 6 |
| 273 | FO 2 | CALL | SHUTTER |
| 274 |  | DCR | D |
| 275 |  | JNZ | FO 2 |

FIG.12-12

| STATEMENT NO. | NAME OF BRANCH | INSTRUCTION | OPERAND |
|---|---|---|---|
| 276 | | DCR | E |
| 277 | | CALL | DISPLAY 1 |
| 278 | | LDA | DEG2M |
| 279 | | SUB | E |
| 280 | | JNZ | FO5 |
| 281 | FO 3 | CALL | SHUTTER |
| 282 | | IN | RL |
| 283 | | SUI | #02 |
| 284 | | JP | FO3 |
| 285 | K8 | IN | PHASE |
| 286 | | CIP | 34 |
| 287 | | JNZ | K8 |
| 288 | | CALL | STOP |
| 289 | | MVI | B, #09 |
| 290 | | IN | MODE |
| 291 | | CMP | B |
| 292 | | JZ | FO1 |
| 293 | FO 4 | JMP | INITI 10 |
| 294 | •OVER LAP• | | |
| 295 | OL | CALL | PMOST |
| 296 | | CALL | D12SET |
| 297 | OL 1 | IN | RL |
| 298 | | CPI | #07 |
| 299 | | JNZ | OLB |
| 300 | | LDA | DEG1M |

F I G.12-13

| STATEMENT NO. | NAME OF BRANCH | INSTRUCTION | OPERAND |
|---|---|---|---|
| 301 | | MOV | E, A |
| 302 | | CALL | START |
| 303 | OL 5 | MVI | D, 6 |
| 304 | OL 2 | CALL | SHUTTER |
| 305 | | DCR | D |
| 306 | | JNZ | OL 2 |
| 307 | | INR | E |
| 308 | | CALL | DISPLAY 1 |
| 309 | | LDA | DEG2M |
| 310 | | SUB | E |
| 311 | | JNZ | OL 5 |
| 312 | K9 | IN | PHASE |
| 313 | | CPI | 34 |
| 314 | | JNZ | K9 |
| 315 | | CALL | STOP |
| 316 | OL 3 | IN | RL |
| 317 | | SUI | #02 |
| 318 | | JP | OL 3 |
| 319 | | LDA | DEG1M |
| 320 | | MOV | E, A |
| 321 | | CALL | PMCST |
| 322 | | CALL | REV |
| 323 | K12 | MVI | D, 6 |
| 324 | OL 4 | IN | PHASE |
| 325 | | CPI | #00 |

F I G.12-14

| STATEMENT NO. | NAME OF BRANCH | INSTRUCTION | OPERAND |
|---|---|---|---|
| 326 |  | JNZ | OL 4 |
| 327 | K11 | IN | PHASE |
| 328 |  | CPI | #00 |
| 329 |  | JZ | K 11 |
| 330 |  | DCR | D |
| 331 |  | JNZ | OL 4 |
| 332 |  | INR | E |
| 333 |  | LDA | DEG2M |
| 334 |  | SUB | E |
| 335 |  | JNZ | K 12 |
| 336 | K13 | IN | PHASE |
| 337 |  | CPI | 34 |
| 338 |  | JNZ | K 13 |
| 339 |  | CALL | STOP |
| 340 | OL 41 | IN | RL |
| 341 |  | CPI | #07 |
| 342 |  | JNZ | OL 41 |
| 343 |  | CALL | PMOST |
| 344 |  | LDA | DEG2M |
| 345 |  | MOV | E, A |
| 346 |  | CALL | START |
| 347 | OL 10 | MVI | D, 6 |
| 348 | OL 5 | CALL | SHUTTER |
| 349 |  | DCR | D |
| 350 |  | JNZ | OL 5 |

FIG.12-15

| STATEMENT NO. | NAME OF BRANCH | INSTRUCTION | OPERAND |
|---|---|---|---|
| 351 | | DCR | E |
| 352 | | CALL | DISPLAY 1 |
| 353 | | LDA | DEG1M |
| 354 | | SUB | E |
| 355 | | JNZ | OL 10 |
| 356 | OL 6 | CALL | SHUTTER |
| 357 | | IN | RL |
| 358 | | SUI | #02 |
| 359 | | JP | OL 6 |
| 360 | K 14 | IN | PHASE |
| 361 | | CPI | 34 |
| 362 | | JNZ | K 14 |
| 363 | | CALL | STOP |
| 364 | | MVI | B, #0A |
| 365 | | IN | MODE |
| 366 | | CMP | B |
| 367 | | JZ | OL 1 |
| 368 | OL 7 | JMP | INITI 11 |
| 369 | •WIPE IN• | | |
| 370 | WI | CALL | PMCST |
| 371 | | CALL | T1SET |
| 372 | WI 1 | IN | RL |
| 373 | | CPI | #07 |
| 374 | | JNZ | WIB |
| 375 | | CALL | START |

FIG.12-16

| STATEMENT NO. | NAME OF BRANCH | INSTRUCTION | OPERAND |
|---|---|---|---|
| 376 | | MVI | D, 2 |
| 377 | WI 2 | CALL | PMO |
| 378 | | CALL | MS 5 |
| 379 | | CALL | PMSTOP |
| 380 | | CALL | T 1 |
| 381 | | DCR | D |
| 382 | | JNZ | WI 2 |
| 383 | WI 3 | IN | RL |
| 384 | | SUI | #02 |
| 385 | | JP | WI 3 |
| 386 | K 15 | IN | PHASE |
| 387 | | CPI | 34 |
| 388 | | JNZ | K 15 |
| 389 | | CALL | STOP |
| 390 | | MVI | B, #0B |
| 391 | | IN | MODE |
| 392 | | CMP | B |
| 393 | | JZ | WI 1 |
| 394 | WI 4 | JMP | INITI 12 |
| 395 | *WIPE OUT* | | |
| 396 | WO | CALL | PMOST |
| 397 | | CALL | T1SET |
| 398 | WO 1 | IN | RL |
| 399 | | CPI | #07 |
| 400 | | JNZ | WOB |

FIG.12-17

| STATEMENT NO. | NAME OF BRANCH | INSTRUCTION | OPERAND |
|---|---|---|---|
| 401 | | CALL | START |
| 402 | | MVI | D, 2 |
| 403 | WO 2 | CALL | PMC |
| 404 | | CALL | MS 5 |
| 405 | | CALL | PMSTOP |
| 406 | | CALL | T 1 |
| 407 | | DCR | D |
| 408 | | JNZ | WO 2 |
| 409 | K 16 | IN | PHASE |
| 410 | | CPI | 34 |
| 411 | | JNZ | K 16 |
| 412 | | CALL | STOP |
| 413 | | MVI | B, #0C |
| 414 | | IN | MODE |
| 415 | | CMP | B |
| 416 | | JZ | WO 1 |
| 417 | WO 3 | JMP | INITI 13 |
| 418 | •WIPE LAP• | | |
| 419 | WL | CALL | PMOST |
| 420 | | CALL | T1SET |
| 421 | WL 1 | IN | RL |
| 422 | | CPI | #07 |
| 423 | | JNZ | WLB |
| 424 | | CALL | START |
| 425 | | CALL | T 1 |

F I G.12-18

| STATEMENT NO. | NAME OF BRANCH | INSTRUCTION | OPERAND |
|---|---|---|---|
| 426 | | MVI | D, 2 |
| 427 | WL 2 | CALL | PMC |
| 428 | | CALL | MS 5 |
| 429 | | CALL | PMSTOP |
| 430 | | CALL | T 1 |
| 431 | | DCR | D |
| 432 | | JNZ | WL 2 |
| 433 | K 17 | IN | PHASE |
| 434 | | CPI | 34 |
| 435 | | JNZ | K 17 |
| 436 | | CALL | STOP |
| 437 | WL 3 | IN | RL |
| 438 | | SUI | #02 |
| 439 | | JP | WL 3 |
| 440 | | MVI | D, 3 |
| 441 | | CALL | REV |
| 442 | WL 4 | CALL | T 1 |
| 443 | | DCR | D |
| 444 | | JNZ | WL 4 |
| 445 | K 18 | IN | PHASE |
| 446 | | CPI | 34 |
| 447 | | JNZ | K 18 |
| 448 | | CALL | STOP |
| 449 | WL 5 | IN | RL |
| 450 | | CPI | #03 |

FIG.12-19

| STATEMENT NO. | NAME OF BRANCH | INSTRUCTION | OPERAND |
|---|---|---|---|
| 451 | | JNZ | WL 5 |
| 452 | | CALL | START |
| 453 | | CALL | T 1 |
| 454 | | MVI | D, 2 |
| 455 | WL 6 | CALL | PMC |
| 456 | | CALL | MS 5 |
| 457 | | CALL | PMSTOP |
| 458 | | CALL | T 1 |
| 459 | | DCR | D |
| 460 | | JNZ | WL 6 |
| 461 | K 19 | IN | PHASE |
| 462 | | CPI | 34 |
| 463 | | JNZ | K 19 |
| 464 | | CALL | STOP |
| 464-1 | | CALL | PMO |
| 464-2 | | CALL | MS 5 |
| 464-3 | | CALL | PMSTOP |
| 465 | | CALL | PMOST |
| 466 | | MVI | B, #0D |
| 467 | | IN | MODE |
| 468 | | CMP | B |
| 469 | | JZ | WL 1 |
| 470 | WL 7 | JMP | INITI 14 |
| 471 | ··SHUTTER·· | | |
| 472 | SHUTTER | IN | PHASE |
| 473 | | CPI | #00 |
| 474 | | JNZ | SHUTTER |
| 475 | | MVI | B, 2 |

F I G.12-20

| STATEMENT NO. | NAME OF BRANCH | INSTRUCTION | OPERAND |
|---|---|---|---|
| 476 | STR 1 | IN | PHASE |
| 477 | | ANI | #01 |
| 478 | | JZ | STR 1 |
| 479 | | CALL | PMC |
| 480 | STR 2 | IN | PHASE |
| 481 | | ANI | #01 |
| 482 | | JNZ | STR 2 |
| 483 | | CALL | PMSTOP |
| 484 | | DCR | B |
| 485 | | JNZ | STR 1 |
| 486 | STR 3 | IN | PHASE |
| 487 | | SUB | E |
| 488 | | JNZ | STR 3 |
| 489 | | MVI | B, 2 |
| 490 | STR 4 | IN | PHASE |
| 491 | | ANI | #01 |
| 492 | | JNZ | STR 4 |
| 493 | | CALL | PMO |
| 494 | STR 5 | IN | PHASE |
| 495 | | ANI | #01 |
| 496 | | JZ | STR 5 |
| 497 | | CALL | PMSTOP |
| 498 | | DCR | S |
| 499 | | JNZ | STR 4 |
| 500 | | RET | |

F I G.12-21

| STATEMENT NO. | NAME OF BRANCH | INSTRUCTION | OPERAND |
|---|---|---|---|
| 501 | ..START.. | | |
| 502 | START | MVI | A, #06 |
| 503 | | OUT | CONT 1 |
| 504 | | RET | |
| 505 | ..STOP.. | | |
| 506 | STOP | MVI | A, #03 |
| 507 | | OUT | CONT 1 |
| 508 | | CALL | MS 5 |
| 509 | | MVI | A, #02 |
| 510 | | OUT | CONT 1 |
| 511 | | RET | |
| 512 | ..REV.. | | |
| 513 | REV | MVI | A, #0 |
| 514 | | OUT | CONT 1 |
| 515 | | RET | |
| 516 | ..PMO.. | | |
| 517 | PMO | MVI | A#10 |
| 518 | | OUT | CONT 2 |
| 519 | | RET | |
| 520 | ..PMC.. | | |
| 521 | PMC | MVI | A#20 |
| 522 | | OUT | CONT 2 |
| 523 | | RET | |
| 524 | ..PMSTOP.. | | |
| 525 | PMSTOP | MVI | A, #0 |

FIG. 12-22

| STATEMENT NO. | NAME OF BRANCH | INSTRUCTION | OPERAND |
|---|---|---|---|
| 526 | | OUT | CONT 2 |
| 527 | | RET | |
| 528 | ..PMOST.. | | |
| 529 | PMOST | MVI | B, 3 |
| 530 | PMOST 1 | MVI | A, #10 |
| 531 | | OUT | CONT 2 |
| 532 | | CALL | MS 05 |
| 533 | | CALL | PMSTOP |
| 534 | | CALL | MS 5 |
| 535 | | DCR | B |
| 536 | | JNZ | PMOST 1 |
| 537 | | RET | |
| 538 | ..PMCST.. | | |
| 539 | PMCST | MVI | B, 3 |
| 540 | PMCST 1 | MVI | A, #20 |
| 541 | | OUT | CONT 2 |
| 542 | | CALL | MS 05 |
| 543 | | CALL | PMSTOP |
| 544 | | CALL | MS 5 |
| 545 | | DCR | B |
| 546 | | JNZ | PMCST 1 |
| 547 | | RET | |
| 548 | ..DISPLAY1.. | | |
| 549 | DIAPLAY 1 | MOV | A, E |
| 550 | | OUT | DISP 1 |

FIG.12-23

| STATEMENT NO. | NAME OF BRANCH | INSTRUCTION | OPERAND |
|---|---|---|---|
| 551 | | RET | |
| 552 | ..T 1.. | | MOVB, H |
| 553 | T 1 | CALL | MS 125 |
| 554 | | DCR | B |
| 555 | | JNZ | T 1 |
| 556 | | RET | |
| 557 | ..T 2.. | | MOVB, L |
| 558 | T 2 | CALL | MS 125 |
| 559 | | DCR | B |
| 560 | | JNZ | T 2 |
| 561 | | RET | |
| 562 | ..TSET.. | | |
| 563 | TSET | MVI | A, #40 |
| 564 | | OUT | DISP 2 |
| 565 | | CALL | MS 500 |
| 566 | | MVI | A, #00 |
| 567 | | OUT | DISP 2 |
| 568 | | CALL | MS 500 |
| 569 | | IN | DATASET |
| 570 | | CPI | #01 |
| 571 | | JNZ | TSET |
| 572 | | RET | |
| 573 | DEGSET | MVI | MVIA, #80 |
| 574 | | OUT | DISP 2 |
| 575 | | CALL | MS 500 |

FIG.12-24

| STATEMENT NO. | NAME OF BRANCH | INSTRUCTION | OPERAND |
|---|---|---|---|
| 576 | | MVI | A, #00 |
| 577 | | OUT | DISP 2 |
| 578 | | CALL | MS 500 |
| 579 | | IN | DATASET |
| 580 | | CPI | #02 |
| 581 | | JNZ | DEGSET |
| 582 | | RET | |
| 583 | ‥T12SET‥ | | |
| 584 | T12SET | CALL | TSET |
| 585 | | IN | TIME |
| 586 | | DCR | A |
| 587 | | MOV | B, A |
| 588 | | MVI | A, #01 |
| 589 | T12SET1 | RLC | |
| 590 | | DCR | B |
| 591 | | JNZ | T12SET |
| 592 | | MOV | H, A |
| 593 | | CALL | TSET |
| 594 | | IN | TIME |
| 595 | | DCR | A |
| 596 | | MOV | B, A |
| 597 | | MVI | A, #01 |
| 598 | T12SET2 | RLC | |
| 599 | | DCR | B |
| 600 | | JNZ | T12SET2 |

FIG.12-25

| STATEMENT NO. | NAME OF BRANCH | INSTRUCTION | OPERAND |
|---|---|---|---|
| 601 | | MOV | L, A |
| 602 | | RET | |
| 603 | ··T1SET·· | | |
| 604 | T1SET | CALL | TSET |
| 605 | | IN | TIME |
| 606 | | DCR | A |
| 607 | | MOV | B, A |
| 608 | | MVI | A, #01 |
| 609 | T1SET 1 | RLC | |
| 610 | | DCR | B |
| 611 | | JNZ | T1SET 1 |
| 612 | | MOV | H, A |
| 613 | | RET | |
| 614 | ··D12SET·· | | |
| 615 | D12SET | CALL | D1SET |
| 616 | | CALL | DEGSET |
| 617 | | IN | DEG |
| 618 | | CALL | DEGA |
| 619 | | STA | DEG2M |
| 620 | D12SET 1 | RET | |
| 621 | ··D1SET·· | | |
| 622 | D1SET | CALL | DEGSET |
| 623 | | IN | DEG |
| 624 | | CPI | #00 |
| 625 | | JZ | AA |

FIG.12-26

| STATEMENT NO. | NAME OF BRANCH | INSTRUCTION | OPERAND |
|---|---|---|---|
| 626 | | CALL | DEGA |
| 627 | D1SET 1 | STA | DEG1M |
| 628 | | RET | |
| 629 | ..DEGA.. | | |
| 630 | DEGA | CPI | #01 |
| 631 | | JZ | A5 |
| 632 | | CPI | #02 |
| 633 | | JZ | A7 |
| 634 | | CPI | #03 |
| 635 | | JZ | A9 |
| 636 | | CPI | #04 |
| 637 | | JZ | A11 |
| 638 | | CPI | #05 |
| 639 | | JZ | A13 |
| 640 | | CPI | #06 |
| 641 | | JZ | A15 |
| 642 | | CPI | #07 |
| 643 | | JZ | A17 |
| 644 | | CPI | #08 |
| 645 | | JZ | A19 |
| 646 | | CPI | #09 |
| 647 | | JZ | A21 |
| 648 | | CPI | #0A |
| 649 | | JZ | A23 |
| 650 | | CPI | #0B |

FIG.12-27

| STATEMENT NO. | NAME OF BRANCH | INSTRUCTION | OPERAND |
|---|---|---|---|
| 651 | | JZ | A 25 |
| 652 | | MVI | A, 27 |
| 653 | DEGA 1 | RET | |
| 654 | ··DEGREE DECORD SECTION·· | | |
| 655 | A5 | MVI | A, 5 |
| 656 | | JMP | DEGA 1 |
| 657 | A7 | MVI | A, 7 |
| 658 | | JMP | DEGA 1 |
| 659 | A9 | MVI | A, 9 |
| 660 | | JMP | DEGA 1 |
| 661 | A11 | MVI | A, 11 |
| 662 | | JMP | DEGA 1 |
| 663 | A13 | MVI | A, 13 |
| 664 | | JMP | DEGA 1 |
| 665 | A15 | MVI | A, 15 |
| 666 | | JMP | DEGA 1 |
| 667 | A17 | MVI | A, 17 |
| 668 | | JMP | CEGA 1 |
| 669 | A19 | MVI | A, 19 |
| 670 | | JMP | DEGA 1 |
| 671 | A21 | MVI | A, 21 |
| 672 | | JMP | DEGA 1 |
| 673 | A23 | MVI | A, 23 |
| 674 | | JMP | DEGA 1 |
| 675 | A25 | MVI | A, 25 |

FIG.12-28

| STATEMENT NO. | NAME OF BRANCH | INSTRUCTION | OPERAND |
|---|---|---|---|
| 676 | | JMP | DEGA1 |
| 677 | ..TIME INTERVAL SUBLOUTINE.. | | |
| 678 | MS05 | MVI | C, #40 |
| 679 | MS05A | DCR | C |
| 680 | | JNZ | MS05A |
| 681 | | RET | |
| 682 | MS5 | MVI | C, #0A |
| 683 | MS5A | MVI | D, #40 |
| 684 | MS5B | DCR | D |
| 685 | | JNZ | MS5B |
| 686 | | DCR | C |
| 687 | | JNZ | MS5A |
| 688 | | RET | |
| 689 | MS125 | MVI | C, #80 |
| 690 | MS125A | MVI | D, #7F |
| 691 | MS125B | DCR | D |
| 692 | | JNZ | MS125B |
| 693 | | DCR | C |
| 694 | | JNZ | MS125A |
| 695 | | RET | |
| 696 | MS500 | MVI | C, #FF |
| 697 | MS500A | MVI | D, #7F |
| 698 | MS500B | DCR | D |
| 699 | | JNZ | MS500B |
| 700 | | DCR | C |

FIG.12-29

| STATEMENT NO. | NAME OF BRANCH | INSTRUCTION | OPERAND |
|---|---|---|---|
| 701 | | JNZ | MS500A |
| 702 | | RET | |
| 703 | DE | NOP | |
| 704 | | RET | |
| 705 | ··AA· | | |
| 706 | AA | MVI | A, 5 |
| 707 | | STA | DEG1M |
| 708 | | MVI | A, 27 |
| 709 | | STA | DEG2M |
| 710 | | JMP | D12SET1 |
| 711 | ··MODE SELECT BLANCHES·· | | |
| 712 | NRM | MVI | B, #00 |
| 713 | | IN | MODE |
| 714 | | CMP | B |
| 715 | | JZ | MORM1 |
| 716 | | JMP | NORM3 |
| 717 | SBRI | MVI | B, #01 |
| 718 | | IN | MODE |
| 719 | | CMP | B |
| 720 | | JZ | DIAPHRAGM 1 |
| 721 | | JMP | DIAPHRAGM 4 |
| 722 | MMB | MVI | B, #02 |
| 723 | | IN | MODE |
| 724 | | CMP | B |
| 725 | | JZ | MM 1 |

F I G. 12-30

| STATEMENT NO. | NAME OF BRANCH | INSTRUCTION | OPERAND |
|---|---|---|---|
| 726 | | JMP | MM 3 |
| 727 | IWSB | MVI | B, #03 |
| 728 | | IN | MODE |
| 729 | | CMP | B |
| 730 | | JZ | IWS 1 |
| 731 | | JMP | IWS 4 |
| 732 | WSB | MVI | B, #04 |
| 733 | | IN | MODE |
| 734 | | CMP | B |
| 735 | | JZ | WS 1 |
| 736 | | JMP | WS 3 |
| 737 | STB | MVI | B, #05 |
| 738 | | IN | MODE |
| 739 | | CMP | B |
| 740 | | JZ | ST 1 |
| 741 | | JMP | ST 2 |
| 742 | TE1B | MVI | B, #06 |
| 743 | | IN | MODE |
| 744 | | CMP | B |
| 745 | | JZ | TE 11 |
| 746 | | JMP | TE 14 |
| 747 | TE2B | MVI | B, #07 |
| 748 | | IN | MODE |
| 749 | | CMP | B |
| 750 | | JZ | TE 21 |

F I G.12-31

| STATEMENT NO. | NAME OF BRANCH | INSTRUCTION | OPERAND |
|---|---|---|---|
| 751 | | JMP | TE 25 |
| 752 | FIB | MVI | B, #08 |
| 753 | | IN | MODE |
| 754 | | CMP | B |
| 755 | | JZ | FI 1 |
| 756 | | JMP | FI 4 |
| 757 | FOB | MVI | B, #09 |
| 758 | | IN | MODE |
| 759 | | CMP | B |
| 760 | | JZ | FO 1 |
| 761 | | JMP | FO 4 |
| 762 | OLB | MVI | B, #0A |
| 763 | | IN | MODE |
| 764 | | CMP | B |
| 765 | | JZ | OL 1 |
| 766 | | JMP | OL 7 |
| 767 | WIB | MVI | B, #0B |
| 768 | | IN | MODE |
| 769 | | CMP | B |
| 770 | | JZ | WI 1 |
| 771 | | JMP | WI 4 |
| 772 | WOB | MVI | B, #0C |
| 773 | | IN | MODE |
| 774 | | CMP | B |
| 775 | | JZ | WO 1 |

F I G. 12-32

| STATEMENT NO. | NAME OF BRANCH | INSTRUCTION | OPERAND |
|---|---|---|---|
| 776 | | JMP | WO 3 |
| 777 | WLB | MVI | B, #OD |
| 778 | | IN | MODE |
| 779 | | CMP | B |
| 780 | | JZ | WL 1 |
| 781 | | JMP | WL 7 |
| 782 | | END | |

CINEMATOGRAPHIC CAMERA

This is a continuation of application Ser. No. 832,061, filed Sept. 9, 1977 now abandoned.

BACKGROUND OF THE INVENTION

1. Field of the Invention

This invention relates to cinemaographic cameras, and more particularly to a cinematographic camera having a control circuit constructed in the form of a digital circuit operating with a program written in a read only memory (ROM) of a central processing unit (CPU).

2. Description of the Prior Art

It is known to provide a cinematographic camera capable of performing not only normal operation but also special operations such as those with fade-in and fade-out effects. In the conventional cinematographic cameras of such functions, use has been made of an analogue type control circuit, the complexity of which tends to increase as the number of specific operating modes required is increased. In application to small size cine-cameras, therefore, because of limited availability of spare space, it has been impossible to provide as large a number of operating modes as desired.

Attempts have been made to overcome the above-mentioned drawback of the analogue type control circuit by employing wired logic circuits in constructing the control circuit. This digital type control circuit, however, gives rise to an alternate problem such that the number of wired logic circuits necessary increases with an increase in the number of operating modes. This is so since each of the wired logic circuits is designed to perform only one particular sequential operation in the corresponding one of the operating modes because of the impossibility of predesigning a common circuit portion by which different operating modes are selectively processed. Thus, use of digital circuitry also leads to an increase in the complexity of circuit construction.

On the other hand, the mechanical structure of the conventional cinematographic camera capable of producing fade-in and fade-out effects is characterized by use of two shutter blades arranged to vary the relative position of their cutouts with variation of an opening angle from zero up to a certain value, usually 150°. In a recently developed XL type camera, however, it is required to extend the shutter opening angle to about 200° at maximum. This makes it impossible to establish the setting of the two shutter blades at a zero degree angle of the opening defined thereby. To overcome this problem, one solution is to use three shutter blades arranged to define a single variable opening in a range of 0° to 200°. This proposal has, however, disadvantages such that the control mechanism for these three shutter blades becomes complicated in structure and that a completely different control method from that for the two shutter blades must be created to produce fade effects. As has been mentioned above, however, the control circuit of the camera is itself of the analogue or wired logic type which is incapable of performing a sequential operation in fade-in and fade-out modes because it exceeds the capacity of the conventional control circuit.

SUMMARY OF THE INVENTION

An object of the present invention is to provide a cinematographic camera selectively operating in an increased number of modes and employing a micro processor as a sequence control circuit constructed independently of what modes are required to be available in the camera. Accordingly, the various operating modes can be carried out selectively by one and the same control circuit since there is provided a program incorporated in a CPU of the processor and corresponding to each of the individual modes.

Another object of the present invention is to provide a sequence control circuit for a cinematographic camera, said camera having an auxiliary shutter controllable to close and open an exposure aperture independently of a rotary main shutter which upon rotation closes and opens the common exposure aperture intermittently, whereby operation of the auxiliary shutter is controlled in accordance with the instructions of the aforesaid processor to define a shutter opening angle as movement and/or position of the auxiliary shutter is related to the actual phase of the main shutter in a manner dependent upon the selected one of the various modes.

These and other objects, features and advantages of the present invention will become more apparent from the following detailed description of some embodiments thereof taken in conjunction with the accompanying drawings in which:

BRIEF DESCRIPTION OF THE DRAWINGS

FIG. 5C is a table in which the possible combinations of the switched positions of SW1 to SW21 of FIG. 5A for the various information settings are related to the corresponding combinations of four input signals entered into lines MBADATA$\emptyset$-L to MBADATA$_3$-L.

FIG. 5D is a table in which the conditions of operation of the individual output devices of the camera are related to corresponding combinations of output signals appearing at respective lines MBDATA$\emptyset$-L to 7-L.

FIG. 6 is a chart showing a coordination of operation of the main shutter blade, film pulldown claw and electromagnet 19 of FIGS. 2 and 3 with respect to the phase angle of the main shutter.

FIGS. 7(a), 7(b) and 7(c) are diagrams showing a process for variation of the shutter opening angle when in a fade-out mode.

FIG. 7(d) is a diagram showing variation of the shutter opening angle when in a diaphragm preselection automatic exposure mode.

FIGS. 8(a) and 8(b) are diagrams showing a process for increasing the shutter opening angle when in a fade-in mode.

FIG. 11 is a list of micro instructions.

FIGS. 12-1 to 12-32 are a list of programs in micro instructions as programmed in a ROM of CPU in a micro computer of FIG. 5A.

DETAILED DESCRIPTION OF THE PREFERRED EMBODIMENTS

Figure 1:
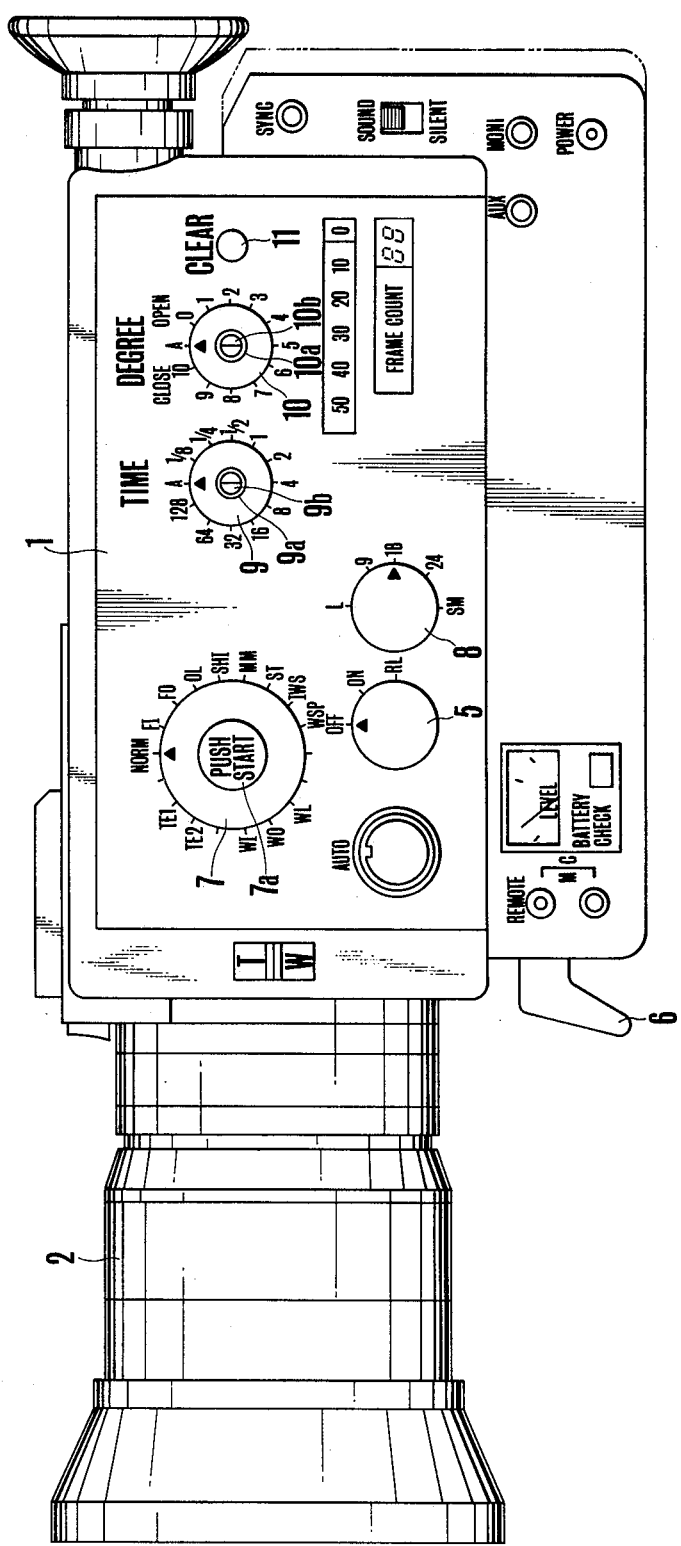
FIG. 1 is a side elevational view of a cinematographic camera to which the present invention relates.

In FIG. 1, there is shown the cinematographic camera having a housing 1 with a zoom objective lens barrel 2 attached to the front panel of the housing 1 and a manual release trigger lever 6 extending forwardly of the front panel. On one side of the camera housing 1, there is shown a control panel having arranged thereon a plurality of control knobs including a main switch dial 5, a mode selecting dial 7, a frame speed selecting dial 8, a time data selecting dial 9 for selective control of a time interval or intervals such as a self-timer operation period and a shutter opening angle data selecting dial 10. The mode selecting dial 7 is associated with a push button 7a arranged in coaxial relation to the dial 7 upon depression to start performance of a program for the selected mode. The time and degree dials 9 and 10 are provided with respective data input push buttons 9a and 10a arranged in coaxial relation to the dials 9 and 10 to effect the entry of the selected data into the CPU which will be described later. The push buttons 9a and 10a carry a red and a blue light-emitting diode 9b and 10b respectively. In order to clear the data entered by the push buttons 9a and 10a, there is provided a clear push button 11.

Figure 2:
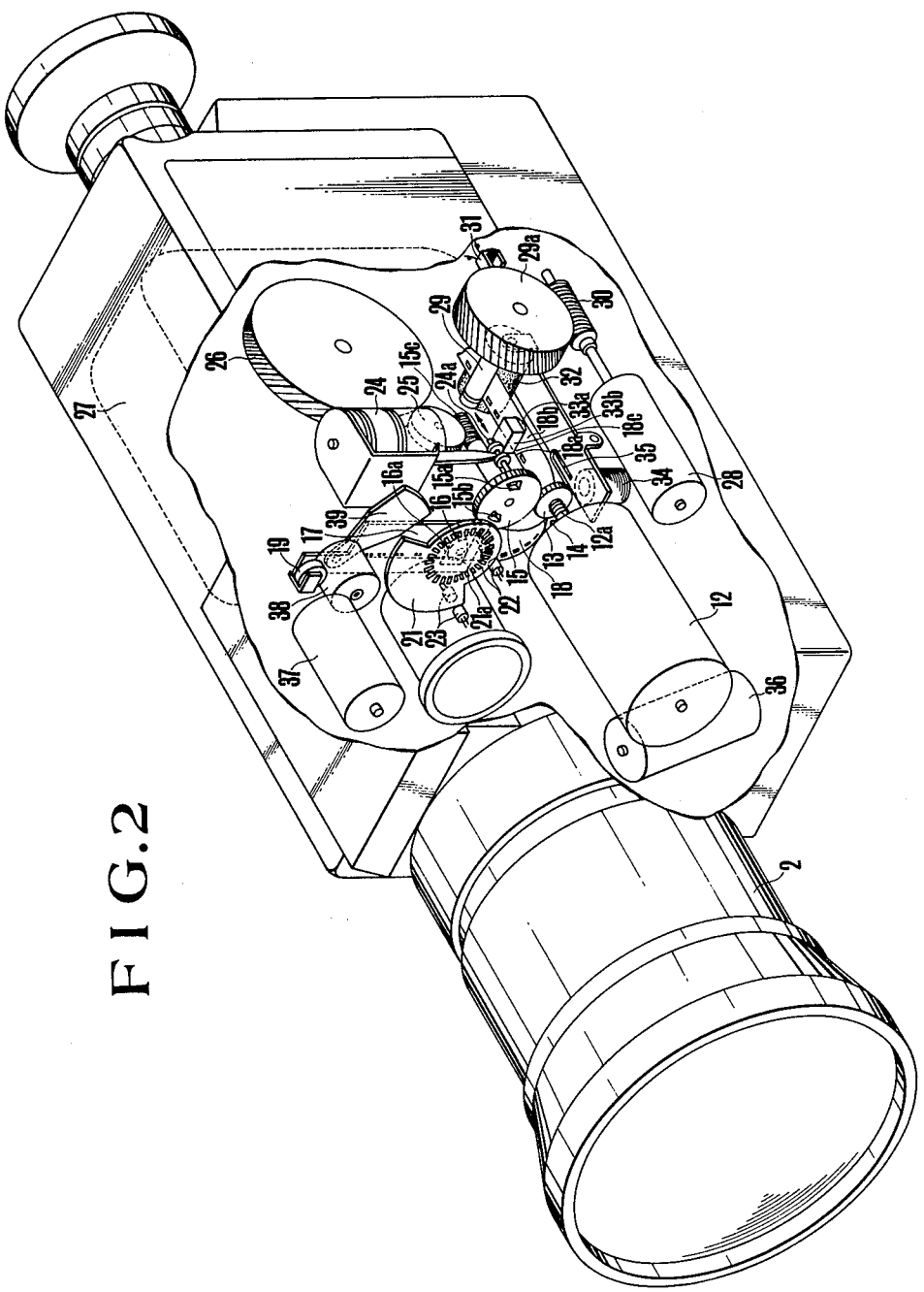
FIG. 2 is a perspective view of the camera of FIG. 1 partly broken away to show an arrangement of the basic parts of the internal structure thereof.

Referring to FIGS. 2 and 3, the internal structure of the camera of FIG. 1 includes a first electrical motor or film motor 12 having an output shaft 12a through which motion of the motor 12 is transmitted to a pinion 13 movable about the shaft 12a through a suitable torque buffering spring 14 positioned around the shaft 12a. Rotation torque of the pinion 13 is transmitted through an idle gear 15 to a shutter gear 16 which fixedly carries a main shutter blade 21 at the front surface thereof, on the opposite surface of which is fixedly mounted a cam 16a for controlling intermittent film driving operation of a pulldown plate 17 in front of an aperture 20, as the pulldown plate 17 is guided for vertical movement by a pair of pins 41a and 41b extending from a frame structure 41 of the housing into respective slots provided through the pulldown plate 17 at upper and lower portions thereof. Mounted on the pulldown plate 17 is a pin 17a as a claw arranged to be brought into driving engagement with one of the perforations of a photographic film 18 when an electromagnet 19 fixedly carried on the plate 17 is de-energized. When the electromagnet 19 is energized, an armature 19a is attracted against the force of a spring 19b, causing the pulldown claw pin 17a to be retracted from the perforations against the force of the spring 17c. 40a is a stopper pin for holding the auxiliary shutter at its initial opening position, and 40b is a stopper pin for holding the auxiliary shutter at its initial closing position, and is arranged so as to be movable within the recess 101c in association with an operation member (not shown).

Figures 4, 5E:
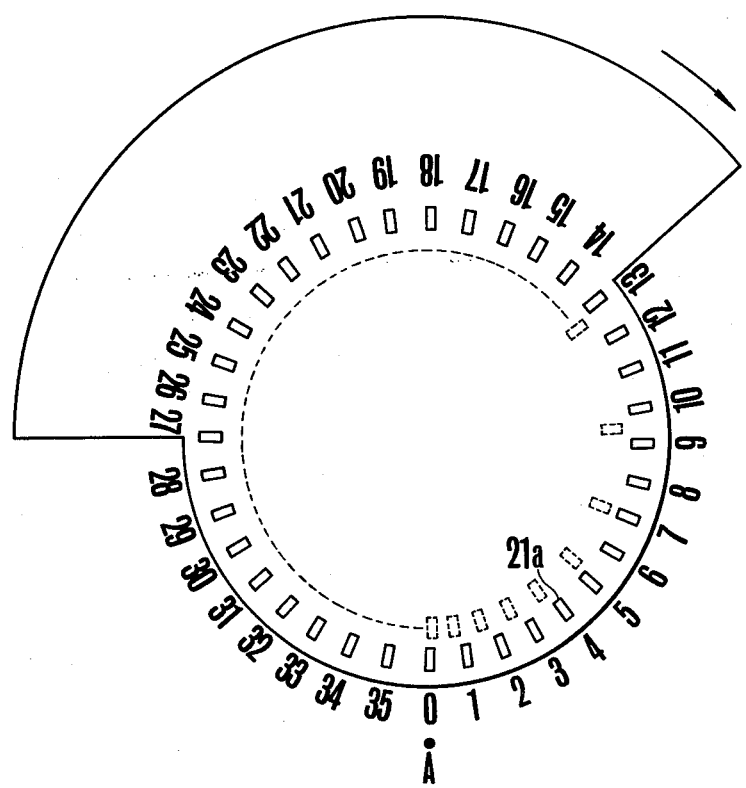
FIG. 4 is a plane view showing two different examples of arrangement of slits provided on the main shutter blade.
FIG. 5E is a table in which the reference numbers representing the individual devices are related to the symbols representing the individual program instructions.

As shown in FIG. 4, the main shutter blade 21 is configured to have a central circular portion larger in radius than the drive gear 16 therefor by a distance long enough to provide an annular zone in which thirty-six slits 21a are arranged in equally spaced relation as designated by numerals 0 to 35 and short enough to permit clearance for the picture gate 20 when the main shutter blade 21 occupies a rotation phase ranging from 100° to 280° with respect to an index point A. The main shutter takes an initial phase angle of zero degree in the illustrated position where the slit designated zero is placed in registry with the index point A. As the shutter is rotated from this position, each time one slit comes to registration with the index point A, the resulting phase angle is advanced 10° from the just proceeding one. In this example of FIG. 4, at a time when the shutter takes a phase angle of 60°, the aperture starts to be opened. Then, it continues to be fully open during a time interval corresponding to a range of phase angles 100° to 280°, and then fully closed at a phase angle of 320°. This configuration of the main shutter blade, therefore, provides a shutter opening angle of 220°.

Figure 3A:
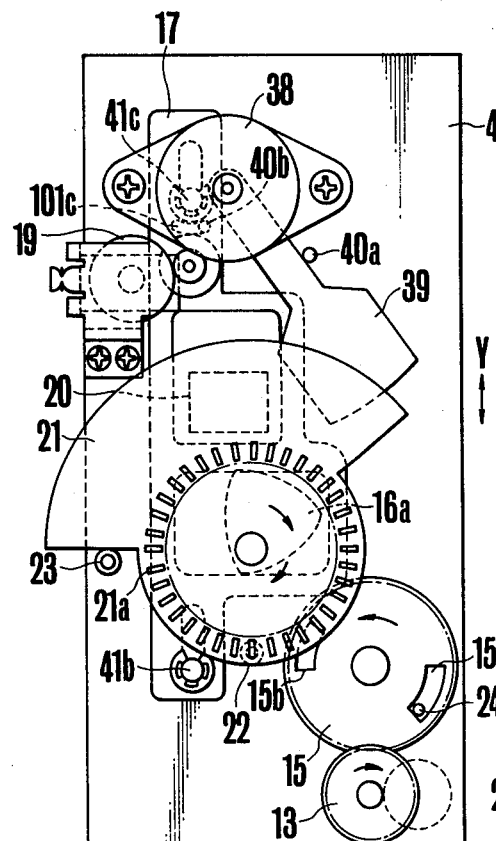
FIG. 3A is a front view showing the details of the structure of a shutter control mechanism for the main and auxiliary shutter blades of FIG. 2.

Referring again to FIGS. 2 and 3, in order to detect the rotation phase of the aforesaid main shutter 21, there is provided a pair of means 2 positioned in alignment with each other and with the 0 slit as the shutter 21 assumes the illustrated position of FIGS. 3A and 4. A second pair of shutter phase detecting means 23 is provided as arranged to produce a pulse when the shutter 21 is rotated from the final phase angle to the initial phase angle. In order that the main shutter 21 is stopped from further rotation in either of two discrete positions, namely, the aperture fully closed and fully open positions, there is provided an arresting means comprising an electromagnet 24 (Mg1), and an engaging shaft 24a operable with an armature 24b of the electromagnet 24 and arranged to the axis of the idle gear 15 to be movable into selective engagement with either of two arcuate slots 15a and 15b provided through the wall of the idle gear 15 when the electromagnet 24 is energized. When de-energized, the engaging shaft 24a is retracted under the action of a spring 24c connected between the housing and the opposite end of the armature 24b to that having the engaging shaft 24a, thereby the engaging shaft 24a is disengaged from the slot 15a or 15b to permit rotation of the main shutter 21. It is of course possible to reverse the operation of the electromagnet 24 with respect to the movement of the engaging shaft 24a to effect an equivalent result to the above.

Motion of the first motor 12 is also transmitted to a take-up reel of a film magazine 27 through a known slip torque means and through a gear train, the latter comprising the pinion 13, the idle gear 15, a worm 15c coaxially connected to the idle gear 15 and meshing with a worm wheel 25, and a winding worm wheel 26 meshing with the wheel 25 and fixedly mounted on a shaft which terminates at an adapter piece not shown engageable with a hub not shown of the take-up reel of the film magazine 27.

There is provided a second electrical motor or capstan motor 28 having an output shaft on which a worm 30 is fixedly mounted. The worm 30 meshes with a worm wheel 29a affixed a capstan 29 against which the film 18 having first and second magnetic sound recording tracks 18b and 18c is pressed by a pinch roller 32. In order to detect rotation phase of the capstan 29, there is provided a magnetic head 31 positioned adjacent the periphery of the worm wheel 29a so as to detect variation of magnetic resistance due to the displacement of the teeth of the wheel 29a. The pinch roller 32 drives the sound film 8, which has been driven intermittently by the pulldown plate 17, at a constant speed at the position of the first and second magnetic recording heads (33a, 33b) positioned at a position corresponding to the first and second magnetic recording tracks 18b and 18c. The pinch roller 32 is pressed to the capstan 29 by the electromagnet 34 (Mg3), when the electromagnet 34 is energized. Upon detection of variation of the slack loop of the film 18 by a loop sensor 35, the speed of either of the first and second motors 12 and 28 is controlled so as to compensate for the difference between the speed VI of transport of the film 18 at a point under the sound recording heads 33a and 33b and the average speed V2 of intermittent advancement of the film 18 driven by the pulldown plate 17. The output of the sensor 35 controls the rotation rate of the film motor 12 or the capstan motor 28 so as to maintain a constant amount of film loop under the driving condition. Third and fourth electrical motors for driving the zoom lens 2 and a not shown diaphragm mechanism are respectively indicated at 36 and 37.

Figure 9:
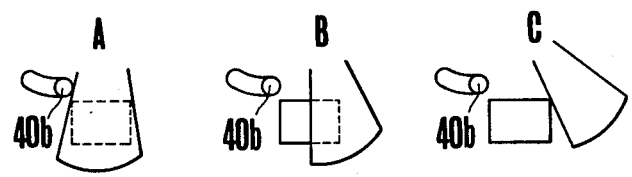
FIG. 9 is a front view of the auxiliary shutter blade in three successive operative positions A, B and C relative to the picture aperture when in a wipe-in mode.
Figure 10:
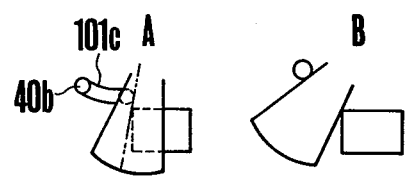
FIG. 10 is a similar view with two successive operative positions A and B when in a wipe-to-lap mode.

An auxiliary shutter blade 39 is fixedly mounted at its pivot point on the output shaft of a fifth motor 38 which is, in this instance, of the pulse controlled type and has an effective area so configured to fully cover the aperture when the pulse motor 38 produces an output with magnitude proportional to the number of pulses entered the area of the aperture 20 is either fully, or half covered, or fully uncovered as shown in FIGS. 9 and 10, as the blade 39 is pivoted. In order to hold the blade 39 in the initial position for the fully open aperture 20, there is provided a stopper pin 40a fixedly mounted on the housing to the right of the blade 39 as viewed in FIG. 3A. The limit of leftward movement of the blade 39 is controlled by another stopper pin 40b arranged to be movable as guided by an arcuate slot 101c in linkage with a not shown operating member, so that the blade 39 when driven for abutment therewith can be held in either a fully closed, or a partly closed position. Instead of using a pulse motor as the fifth motor 38, use may be made of a D.C. motor or the like.

Figure 3C:
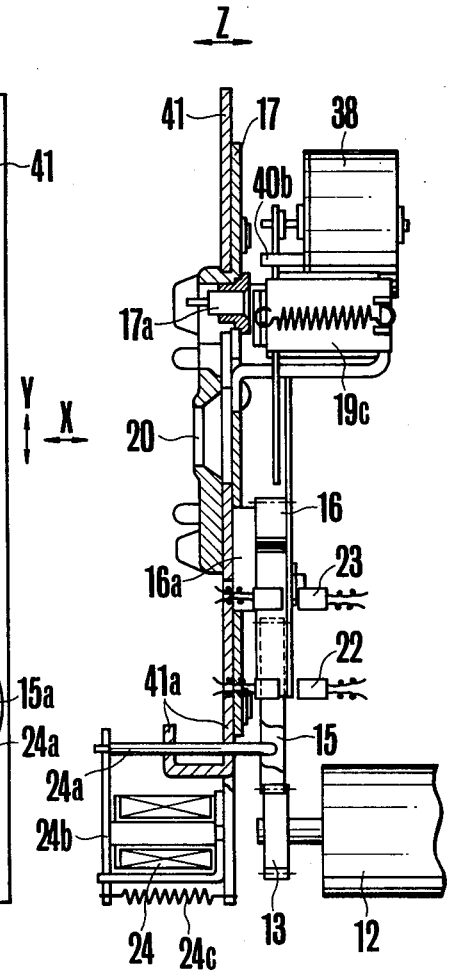
FIG. 3C is a longitudinal vertical view of the shutter control mechanism and an intermittent film advancing control mechanism of FIGS. 2 and 3A.
Figure 3B:
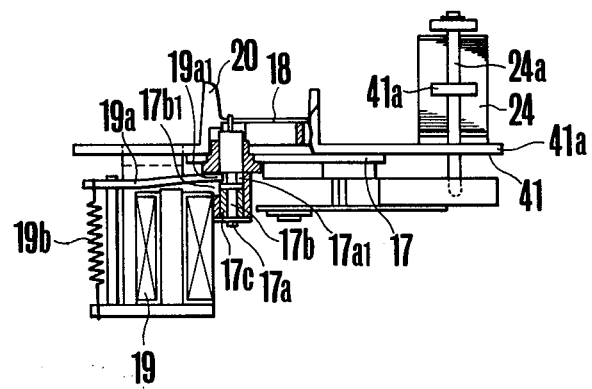
FIG. 3B is a fragmentary horizontal, partly elevational, partly sectional view of the internal structure of FIG. 2.

In FIG. 3A to FIG. 3C showing the detailed structures of the main shutter and the auxiliary shutter, the electromagnet 24 is fixed to the framestructure 41 fixed to the camera body 1, the engaging shaft 24a is axially slidably supported on the supporting portion 41a and biased by the restoring spring 24c in a direction retreating from the idle gear 15, and the armature 24b is connected to the engaging shaft with some degree of freedom and when the electromagnet is energized it drives the engaging shaft 24a from the position where the shaft is unable to engage with the holes 15a and 15b of the idle gear to a position where it can engage with them against the force of the spring 24c.

The electromagnet 19 is also fixed to the framestructure 41. The pulldown plate 17 is guided by the guide shafts 41b, 41c fixed to the framestructure and driven by the cam 16a to move up and down in the Y direction. The sleeve having a ratched portion $17b_1$ connected to the pulldown plate 17, contains the pin 17a slidably in the axial direction, and this pin 17a is biased by the restoring spring 17b so as to engage with the film 18. The end $19a_1$ of the aperture 19a of the electromagnet 19 is inserted into the notched portion $17b_1$ of the sleeve 17b and engages with the stepped portion $17a_1$ of the pin 17a.

Figure 5A:
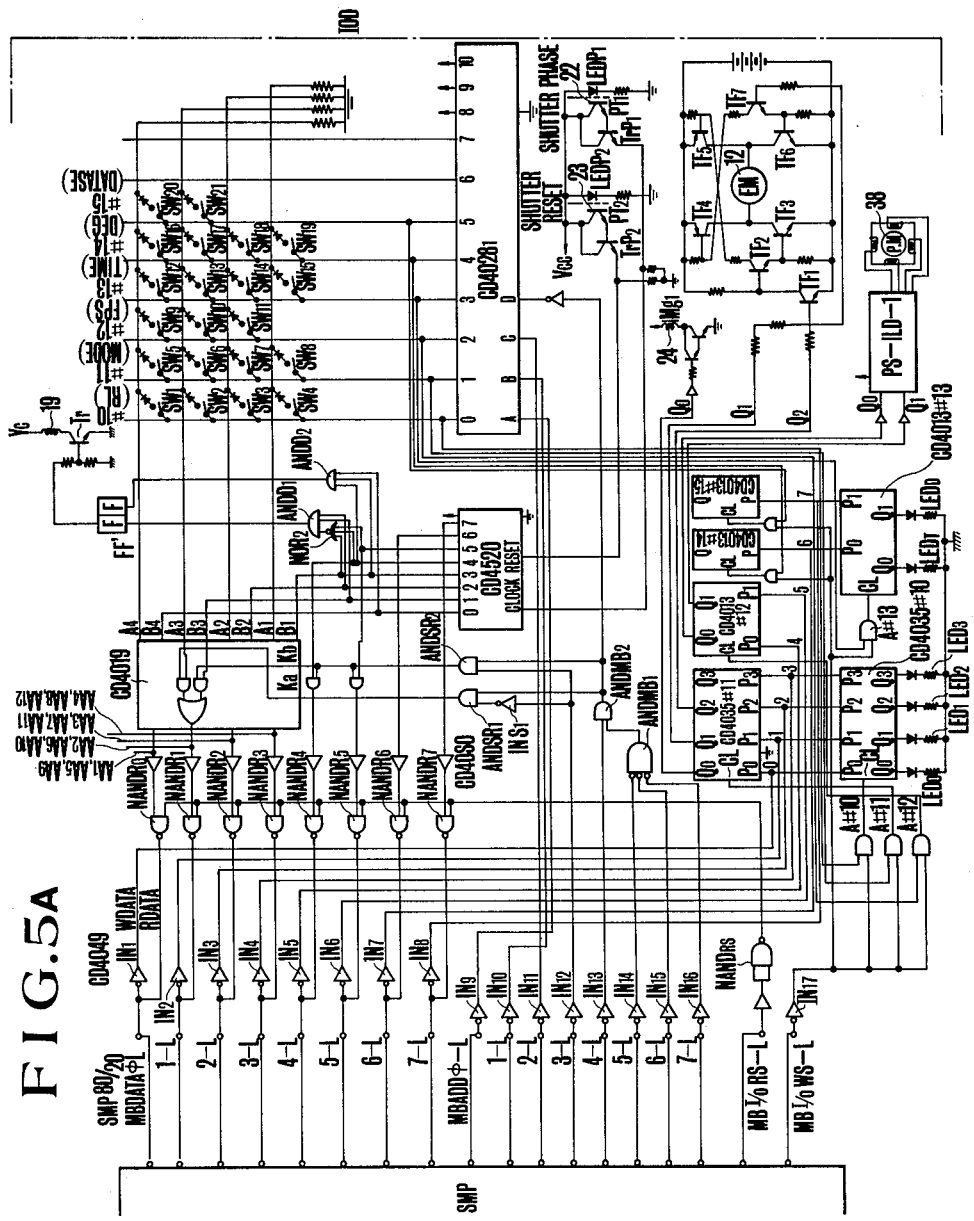
FIG. 5A is a schematic electrical circuit diagram, partly in block form, of one embodiment of a control system for the cinematographic camera according to the present invention.
Figure 5B:
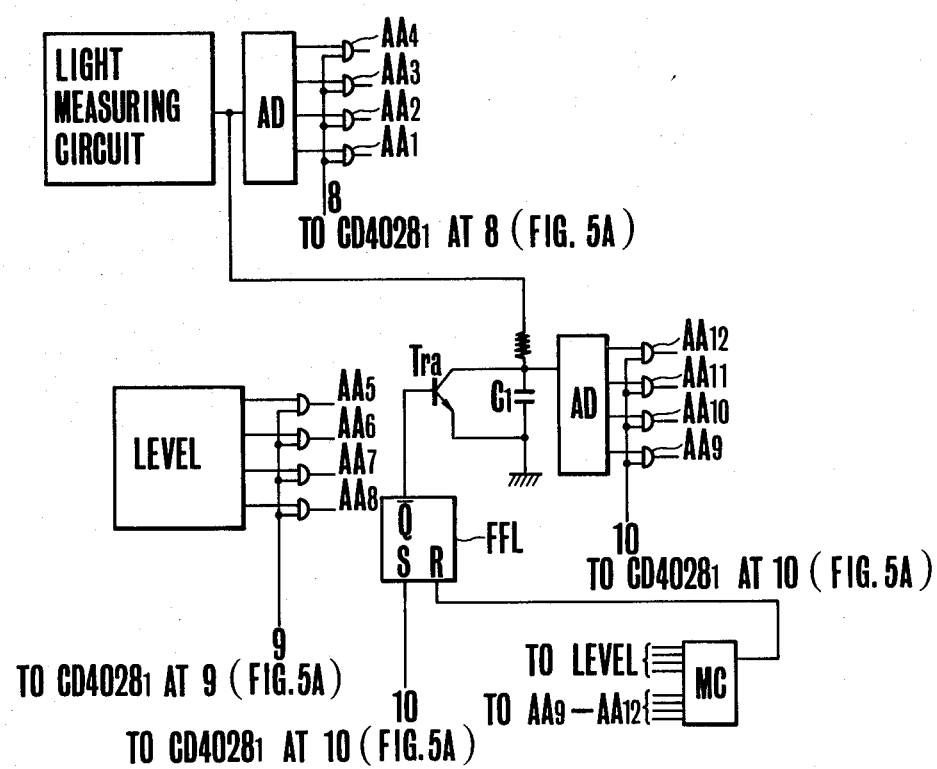
FIG. 5B is a fragmentary circuit diagram of the system of FIG. 5A.

Referring to FIGS. 5A and 5B, one embodiment of a control circuit for the cinematographic camera according to the present invention is shown comprising micro computer SMP available, for example, from SORD Co., Ltd. under the tradename of SMP80/20 with inclusion of a CPU (for example, 8080) for performing programs which will be described in detail later, and various input and the control circuit section IOD for controlling the cine camera according to the sign from SMP operatively connected to the micro computer SMP through eight data bus line terminals MBDATA$\emptyset$-L to MBDATA$_{7-L}$, eight address bus line terminals MBADD$\emptyset$-L to MBADD$_{7-L}$ for appointment of desired ones of the devices which are to receive or produce the aforesaid input and output data, and two data input and output operation control signal output terminals MB I/O RS-L and MB I/O WS-L at which respective signals of low level appear when data are to be introduced to and produced from the micro computer SMP respectively. The outputs from a network of switches SW1 to SW21 controlled by a decoder CD4028$_1$ and some of the outputs from a binary counter CD452$\emptyset$ are selectively introduced into the data bus lines MBDATA$\emptyset$-L to MBDATA$_{3-L}$ through a data selector CD4019 and through respective NAND gates NANDR0 to NANDR3 of which the gating control input terminals are connected by way of a common lead to the signal output terminal MB I/O RS-L through a NAND gate NAND$_{RS}$. The remaining outputs from the binary counter CD452$\emptyset$ are introduced to the remaining data input bus line terminals MBDATA$_{4-L}$ to MBDATA$_{7-L}$ through respective NAND gates NANDR4 to NANDR7 of which the gating control input terminals are also connected to the output terminal of NAND$_{RS}$. The data output bus line terminals MBDATA$\emptyset$ to MBDATA$_{7-L}$ are connected through respective inverters IN1 to IN8 to respective input terminals of six D-flip-flops CD4035#10, CD4035#11, CD4013#12, CD4013#13, CD4013#14 and CD4013#15 of which the clock input terminals CL are connected to respective output terminals of AND gates A#10 to A#14 with their one input terminal connected to respective output terminals 0 to 5 of the decoder CD4028$_1$ and with their other input terminals connected by way of a common lead to the output permission signal output terminal MB I/O WS-L through an inverter IN17. The first three address bus line terminals MBADD$\emptyset$-L to MBADD$_{2-L}$ are connected to respective inverters IN9 to IN11 to input terminals A, B and C of the decoder CD4028$_1$ respectively. The fourth terminal MBADD$_{3-L}$ is connected through an inverter IN$_{S1}$ to one input terminal of an AND gate AND$_{SR1}$ and also directly to one input terminal of an AND gate AND$_{SR2}$, the output terminals of these AND gates being connected to the data selector CD4019. The other input terminals of AND$_{SR1}$ and AND$_{SR2}$ are connected to an output terminal of and AND gate AND$_{MB2}$ to which is also connected an input terminal D of the decoder CD4028$_1$ through an inverter. AND$_{MB2}$ has two input terminals one of which is connected through an inverter IN13 to MBADD4-L and the other of which is connected to an output terminal of an AND gate AND$_{MB1}$. It is to be noted here that the symbols CD4019, CD4028$_1$, CD4013, CD4035 and CD452 are based on the types and numbers of the corresponding devices available from Radio Corp. of America.

The outputs Q0 to Q3 of CD4035#10 are connected to respective light-emitting diodes LED0 to LED3, and the outputs Q0 and Q1 of CD4013#13 are connected to respective light-emitting diodes LED$_T$ and LED$_D$. The outputs Q0 to Q3 of CD4035#11 are connected at Q0 to an electronic switch for the electromagnet 24 (Mg1) of FIGS. 1 to 3, and at Q1 and Q2 to a control circuit for the film motor 12 (EM). This control circuit includes seven transistors TF1 to TF7 arranged so that when signals of high level appears at Q1 and Q2, TF1 and TF7 are turned on and therefore TF2, TF3 and TF5 are turned off while TF4 and TF6 are turned on to drive the motor EM for forward rotation; when signals of high and low levels appears at Q1 and Q2 respectively, TF1 is turned on while TF7 is turned off, thus all the other transistors are turned off to stop the motor EM; and when signals of low level appears at Q1 and Q2, TF1 and TF7 are turned off, then TF4 and TF6 are turned off, and then TF2, TF3 and TF5 are turned on to drive the motor EM for reversed rotation. The outputs Q0 and Q1 of CD4013#12 are connected to a control circuit PS-ILD-1 for the pulse motor 38 available from Japan Pulse Motor Co., Ltd. When high and low level signals appear at Q0 and Q1, respectively, PS-ILD-1 drives the motor P.M. for rotation in a counter-clockwise direction; when low and high level signls appear at Q0 and Q1 respectively, the direction of rotation is reversed; and when signals of low level appears, the drive is stopped.

A light-emitting diode LED$_{P1}$, a photo-transistor PT1 and a transistor TrP1 constitute the shutter phase detecting circuit means 22, while a light-emitting diode LED$_{P2}$, a photo-transistor PT2 and a transistor TrP2 constitute the initial shutter phase detecting circuit means 23. The outputs of these means 22 and 23 are connected to clock and reset input terminals CLOCK and RESET of the binary counter CD452$_\emptyset$. The first six outputs 0 to 5 of the binary counter CD452$_\emptyset$ are selectively combined by a NOR gate NOR2, and two AND gates AND$_{D1}$ and AND$_{D2}$ to set and reset a flip-flop F.F.' by the outputs of AND$_{D1}$ and AND$_{D2}$ respectively. The output of F.F.' is connected to an electronic switch Tr for the electromagnet 19.

Switches SW1 and SW2 are arranged to cooperate with the aforementioned manual release lever 6 in such a manner that upon depression to a first release stroke, SW1 is turned on, and, upon further depression to a second stroke, SW2 is turned on while SW1 remains in the ON state. SW3 is turned on when the button 7$a$ is pushed down. SW4 is turned on when the buttom 11 is pushed down. A combination of the switched positions of SW5 to SW8 is dependent upon the selected mode on the dial 7. A combination of the switched positions of SW9 to SW11 depends upon the selected frame frequency on the dial 8. A combination of the switched positions of SW12 to SW15 is dependent upon the selected time on the dial 9. A combination of the switched positions of SW16 to SW19 is dependent upon the selected shutter opening angle on the dial 10. SW20 and SW21 are turned on when the buttons 9$a$ and 10$a$ are pushed down respectively.

The first four NANDs R0 to R3 are selectively receptive of the outputs not only from SWs 1 to 21 through the data selector CD4019 but also from AND gates AAs 1 to 12 shown in FIG. 5B. EXT is a light measuring circuit responsive to the level of brightness of a scene being photographed for producing an analogue output which is then converted to a digital output by an analogue-to-digital converter AD. The converter AD has four output terminals connected to the respective AND gates AA1 to AA4 at one input terminals thereof, the other input terminals of which are connected by way of a common lead to an output terminal 8 of the decoder CD4028$_1$. LEVEL is a circuit for producing a digital output representative of a predetermined constant and constructed from a number of switches as shown in FIG. 13B. Circuit LEVEL has four output terminals connected to respective AND gates AA5 to AA8 at one input terminals thereof, the other input terminals of which are connected by way of a common lead to an output terminal 9 of the decoder CD4028$_1$. A last output terminal 10 of CD4028$_1$ is connected both to a set-terminal S of a flip-flop FF$_L$ and to each of the one input terminals of AND gates AA9 to AA12, the other input terminals of which are connected to respective output terminals of an analogue-to-digital converter AD'. An input terminal of the converter AD' is connected to a point on connection between a resistor and a capacitor C1, the resistor being receptive of the output of the light measuring circuit EXT. Connected across the capacitor C1 is a transistor Tr$_a$ having a base connected to the output terminal $\overline{Q}$ of the flip-flop FF$_L$. A reset-terminal R of FF$_L$ is connected to an output terminal of a comparator MC having input terminals connected to LEVEL and AAs 9 to 12.

Figure 13A:
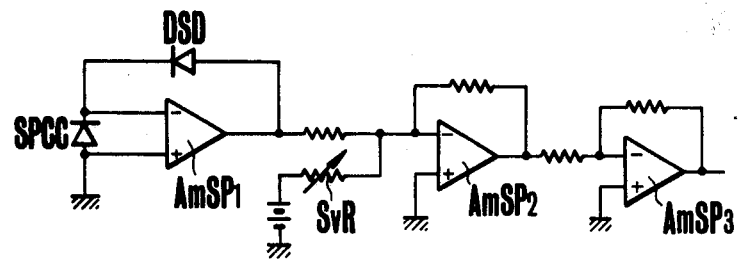
FIGS. 13A, 13B, 13C, and 13D are schematic electrical circuit diagrams, partly in block form, of the blocks AD, AD', EXT, LEVEL and MC of FIG. 5B.
Figure 13B:
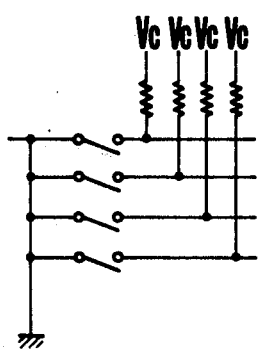
Figure 13C:
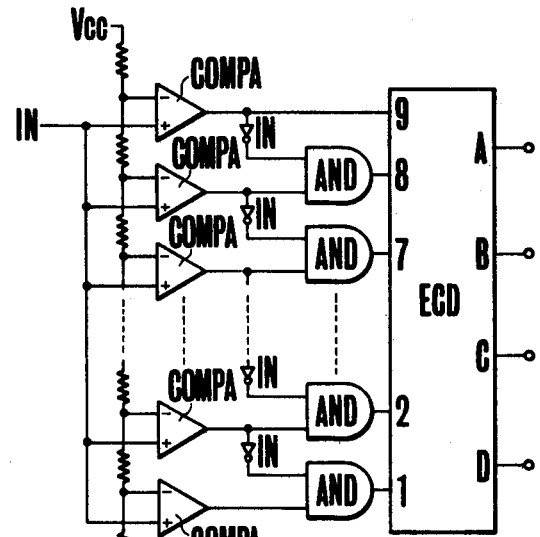
Figure 13D:
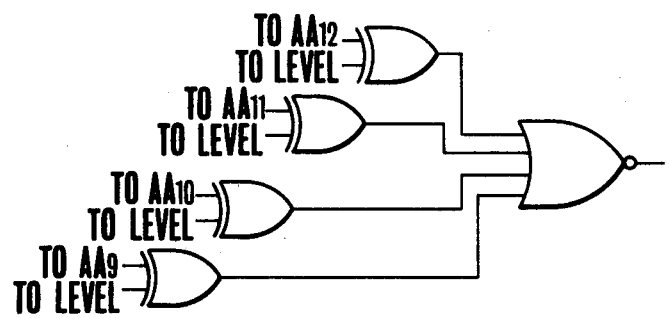

An example of the light measuring circuit EXT is shown in FIG. 13A, including a photo-cell SPCC such as SPC connected across two input terminals of an amplifier AmSP$_1$, and a diode DSD connected in the feedback network of AmSP$_1$, the parts SPCC, DSD and AmSP$_1$ constituting a logarithmic converter. SvR is a variable resistor for setting film speed information. AmSP$_2$ and AmSP$_3$ are operational amplifiers connected in series to each other and to the logarithmic converter and SvR so that the brightness information and the film speed information are combined to produce a light value. An example of the A-to-D converter of FIG. 5B is shown in FIG. 13C including a number of comparators COMPA, inverters IN and AND gates AND and an encoder ECD. The arrangement and construction of these components of the converter are known in the art as the parallel comparison AD converter. An example of the comparator circuit of FIG. 5B is shown in FIG. 13D including exclusive OR and NOR gates constituting a coincidence detecting circuit of known construction.

Before consideration is given to the operation of the cinematographic camera with the control circuit of the invention, a program usable in this embodiment of the invention will be explained in connection with FIGS 12-1 to 12-32 for the various subroutines. The micro instructions listed in FIGS. 12-1 to 12-32 are written in a read only memory (ROM) within CPU, and the addresses of the micro instructions are advanced in the same order as the statement numbers in FIGS. 12-1 to 12-32.

Start Subroutine

This subroutine covers Statements Nos. 501 to 504 inclusive.

MVI A,#06: Transfer a digital value representative of #06 to the accumulator.

OUT CONT1: Produce to the address lines MBADDs $\emptyset$-L a digital output representative of #11.

Hence, MBADD lines $\emptyset$-L and 4-L only become low with production of a high level output at the terminal 1 of the decoder CD4028$_1$, and line MB I/O WS-L becomes low. This causes the AND gate A#11 to take AND, so that a pulse is applied to the clock terminal of the D flip-flop CD4035#11. At the same time, the content #06 of the accumulator is fed to the data lines MBDATAs $\emptyset$-L to 7-L with the result that only lines 1-L and 2-L become low to apply signals of high level to the input terminals P1 and P2 of the D flip-flop CD4035#11. Therefore, an output appearing at the terminals Q1 and Q2 of CD4035#11 actuates the film motor 12 for forward rotation drive.

Stop Subroutine

This subroutine covers statements Nos. 505 to 511.

MVI A,#03: Transfer a digital value representative of #03 to the accumulator.

OUT CONT1: Likewise as in the start subroutine, a pulse is applied to the clock terminal of the D flip-flop CD4035#11, and also the content #03 of the accumulator is fed to the data lines with only $\emptyset$-L and 1-L taking low level to apply high level signals to the input terminals P0, P1 of CD4035#11 with the result that an output appearing at only terminals Q0 and Q1 leads to energize the electromagnet 24 and also to stop the motor 12.

CALL MS5: Perform the content of a subroutine MS5 to be described later, so that the aforesaid state is maintained for 5 milliseconds.

MVI A,#02: Transfer a digital value representative of #02 to the accumulator.

OUT CONT1: Likewise as in the start subroutine, a pulse is applied to the clock terminal of CD4035#11, and the content #02 of the accumulator is fed to the data lines with only 1-L taking low level to apply a high level signal to the input terminal P1 of CD4035#11 with the result that an output appearing at only terminal Q1 leads to maintain the motor stopped and to de-energize the electromagnet 24.

Thus, the motor 12 gets stopped and maintained in this state, while the electromagnet 24 is supplied with a current for 5 milliseconds to actuate the plunger 24a for arresting the rotating shutter. After the motor 12 and the main shutter blade 21 have been stopped, the electromagnet 24 is again de-energized to save an electrical energy consumption which would be otherwise used up wastfully.

Reverse Subroutine

This subroutine covers statements Nos. 512 to 515.

MVI A, #00: Transfer a digital value representative of #00 to the accumulator.

OUT CONT1: Likewise as in the start subroutine, a pulse is applied to the clock terminal of CD4035#11, and the content #00 of the accumulator is fed to the data lines. As all the data lines take high level, all the input signals to CD4035#11 are of low level, and all the output signals appearing at terminal Q0-Q2 are of low level with the result that the motor 12 is driven for rotation in a reverse direction.

Pulse Motor Open (PMO) Subroutine

This subroutine covers statements Nos. 516 to 519.

MVI A,#10: transfer a digital value representative of #10 to the accumulator.

OUT CONT2: Produce a digital output representative of a hexadecimal number #12 to the address lines MBADDs $\emptyset$-L to 7-L with only 1-L and 4-L becoming low to apply a signal of high level to the input terminal B of the decoder CD4028$_1$ so that only output terminal 2 of CD4028$_1$ produces a high level output signal which is applied to one of the input terminals of the AND gate A#12. On the other hand, MB I/O WS-L becomes low so that the inverter IN17 produces a high level signal which is then applied to the other input terminal of A#12. By the output of A#12, therefore, the D flip-flop CD4013#12 is called on with a pulse applied to the clock terminal of said flip-flop. Further, the content of the accumulator, that is, the hexadecimal number #10 is fed to the data lines MBDATA $\emptyset$-L to 7-L with only 4-L line taking low level to apply a high level signal from the inverter IN5 to the input terminal P0 of CD4013#12, which in turn produces a high level signal at the terminal Q0 thereof. This signal is directed to the input terminal Q0 of the pulse motor control circuit PS-ILD-1, thereby the pulse motor 38 is driven to rotate one step in a counter-clockwise direction.

As the auxiliary shutter 39 is left in an operative position where the aperture is fully closed, such one-step rotation of the pulse motor 38 causes the auxiliary shutter 39 to be placed in an operative position where the aperture 20 is uncovered to laterally half the aperture area thereof as shown in FIG. 9B. Upon further rotation of the pulse motor 38 to one more step in the same direction, the aperture is fully opened as shown in FIG. 9C.

Pulse Motor Close (PMC) Subroutine

This subroutine covers statements Nos. 520 to 523.

MVI A,#20: Transfer a digital value representative of a hexadecimal number #20 to the accumulator.

OUT CONT2: Likewise as in the PMO subroutine, CD4013#12 is called on with application of a pulse to the clock terminal thereof, while the content #20 of the accumulator is fed to the data lines with only 5-L line taking low level. A high level signal is transmitted by IN6 to P1 input terminal of CD4013#12 which in turn produces a high level signal at the output terminal Q1. As a result, low and high level signals are applied to the input terminals Q0 and Q1 of the pulse motor control circuit PS-ILD-1 respectively, thereby the pulse motor 38 is driven to rotate one step in a clockwise direction.

As the auxiliary shutter 39 is initially set in a position where the aperture 20 is fully open as shown in FIG. 9C, such one-step rotation of the pulse motor 38 causes the auxiliary shutter 39 to cover half the area of aperture 20. A further one-step rotation of the pulse motor 38 results in the entire closure of the aperture 20.

Pulse Motor Stop (PMSTOP) Subroutine

This subroutine covers statements Nos. 524 to 527.

MVI A,#00: Transfer a digital value representative of a hexadecimal number #00 to the accumulator.

OUT CONT2: Likewise as in the PMO subroutine, CD4013#12 is addressed, while the content #00 of the accumulator is fed to the data lines. As all the data lines become high, all the outputs of INs 1 to 8 are of low level so that CD4013#12 produces low level output signals at Q0 and Q1 which are applied to the input terminals Q0 and Q1 of the pulse motor control circuit PS-ILD-1 to terminate the driving of the pulse motor 38.

Pulse Motor Open Set (PMOST) Subroutine

This subroutine covers statements Nos. 529 to 537.

MVI B, 3: Transfer a digital value representative of a decimal number 3 to B register.

MVI A,#10: Transfer a digital value representative of a hexadecimal number #10 to the accumulator.

OUT CONT2: Likewise as in the PMO subroutine, CD4013#12 is addressed, while the content #10 of the accumulator is fed to the data line so that the pulse motor 38 is rotated one step in the counter-clockwise direction.

CALL MSO5: Call an MSO5 subroutine which will be described later to effect maintenance of such state for 0.5 millisecond.

CALL PMSTOP: Perform the program of the aforementioned PMSTOP subroutine to stop the pulse motor 38.

CALL MS5: Perform the program of a MS5 subroutine to be described later to effect maintenance of such state for 5 milliseconds.

DCR B: Perform subtraction of 1 from the content of B register. Thereafter, the content of B register becomes 2. By such subtraction, all the condition flip-flops except the carry are affected.

JNZ PMOST1: Jump to an address denoted by the branch names PMOST1 when the aforesaid DCR B results in that the zero flip-flop is 0. As the aforesaid DCR B leads to the content 2 of the B register, the zero flip-flop is 0 so that a jump to the address denoted by PMOST1 is effected to perform again the aforesaid program. Until the content of the B register becomes 0, the aforesaid program is repeated 3 times to cause the pulse motor 38 to be rotated three steps in one and the same counter-clockwise direction, thereby the auxiliary shutter is set to the initial position where the aperture is fully open.

Pulse Motor Close Set (PMCST) Subroutine

This subroutine covers statements Nos. 538 to 547.

MVI B, 3: Transfer a digital value representative of a decimal number 3 to the B register.

MVI A, #20: Transfer a digital value representative of a hexadecimal number #20 to the accumulator.

OUT CONT2: Perform the program of the PMC subroutine together with the aforementioned MVI A,#20 to result in one-step clockwise rotation of the pulse motor 38.

CALL MSO5: Call the PMOST subroutine to maintain such state for 0.5 milliseconds CALL PMSTOP: Call the PMSTOP subroutine to stop the pulse motor.

CALL MS5: Call the MS5 subroutine to maintain such state for 5 milliseconds.

DCR B: Subtract 1 from the content of the B register likewise as in the PMOST subroutine.

JNZ PMCST1: Jump to the address denoted by the branch name PM CST1 except when the content of the B register is 0, thereby the aforesaid program is again performed.

Finally, the pulse motor 38 is rotated three steps in the clockwise direction with the auxiliary shutter set in the aperture closed position.

Display Subroutine

This subroutine covers statements Nos. 548 to 551.

MOV A, E: Transfer the content of the E register to the accumulator.

OUT DISP1: Produce to the address lines MBADDs ∅-L to 7-L a digital output representative of a hexadecimal number #10. As only 4-L line becomes low, all the inputs A to D of the decoder CD4028$_1$ become low so that only output terminal 0 of CD4028$_1$ produce a high level signal which is applied to one of the input terminals of the AND gate A#10, to the other input terminal of which is applied a high level signal from IN17, as a low level signal is applied thereto from MB I/O WS-L. The output of A#10 is applied to the clock terminal of the D flip-flop CD4035#10. On the other hand, the content of the accumulator is transmitted through the data lines to the input terminals P0 to P3 of CD4035#10, with the resulting output signals from the terminals Q0 to Q3 of CD4035#10 depending upon the content of the accumulator and being displayed by the light-emitting diodes LEDs 0 to 3 respectively.

Time Set (TSET) Subroutine

This subroutine covers statements Nos. 562 to 572.

MVI A,#40: Transfer a digital value representative of a hexadecimal number #40 represented by HEX code to the accumulator.

OUT DISP2: Produce a digital output representative of a number #13 to the address lines MBADDs ∅-L to 7-L. As only ∅-L, 1-L and 4-L become low, CD4028$_1$ receives high level signals at the input terminals A and B, and then produces a high level output signal at 3 which is applied to the AND gate A#13 at one input terminal thereof, to the other input terminal of which is applied a high level signal from IN17, as a low level signal is applied thereto from MB I/O WS-L. The output of A#13 is applied to the clock terminal of the D flip-flop CD4013#13. On the other hand, the content #40 of the accumulator is fed to the data lines with only 6-L becoming low. This signal after inverted is applied to the input terminal P0 of CD4013#13 which in turn produces an output at Q0, thereby the light-emitting diode LED$_T$ is energized.

CALL MS500: Perform the program of a subroutine MS500 which will be described later to maintain LED$_T$ in the lighting state for 500 milliseconds.

MVI A,#00: Transfer a digital value representative of #00 to the accumulator.

OUT DISP2: Likewise as in the aforementioned OUT DISP2, a high level signal is applied to the clock terminal of CD4013#13, while the content of the accumulator is fed to the data lines. As the content of the accumulator is #00, all the data lines take high level with application of low level signals to both of the input terminals P0 and P1 of CD4013#13, thereby the light-emitting diode LED$_T$ is de-energized.

CALL MS500: Perform the program of the subroutine MS500 to be described later, so that LED$_T$ is maintained in the de-energized state for 500 milliseconds.

IN DATASET: Produce to the address lines an output representative of a hexadecimal number #15. As only 4-L, ∅-L, and 2-L lines. become low, the decoder CD4028$_1$ receives through INs 9 and 11 high level signals at the input terminals A and C, and then produces a high level signal at the output terminal 5. On the other hand, MB I/O RS-L becomes low, causing the NAND gate NAND$_{RS}$ to produce a high level signal which is applied to one input terminals of the NAND gates NANDs R0 to R7. At this time, as the address lines ∅-L, 2-L and 4-L provide low level signals, and the output of the AND gate AND$_{MB1}$ is applied to one input terminal of the AND gate AND$_{MB2}$, the AND$_{MB2}$ produces an AND output which is applied to one terminals of AND$_{SR1}$ and AND$_{SR2}$. As the other input terminal of AND$_{RS1}$ is connected through the inverter IN$_{S1}$ to the address line 3-L, only AND$_{RS1}$ produces an AND output. For this reason, a high level signal is applied to an input terminal Ka of the data selector CD4019, so that only signals appearing at the input terminals A1 to A4 of the selector are permitted to enter the NANDs R0 to R7. On the other hand, at only output terminal 5 of the decoder CD4028$_1$ there appears a high level output, so that a digital value depending upon the switched positions of the data setting switches SW20 and SW21 are selected for the entry through the data input terminals A4 and A3 to the accumulator. As mentioned before, when the push button 9$a$ is depressed, SW20 is closed, causing NAND R0 to produce a low level signal and causing the other NANDs to produce high level signals. After all, digital value representative of a hexadecimal number #01 enter the accumulator.

CPI #01: Compare the content of the accumulator with #01. When the content of the accumulator is coincident with #01, the zero flip-flop is set. Now assuming that the push button 9$a$ was depressed, the content of the accumulator was #01, thus the CPI #01 leading to the setting of the zero flip-flop.

JNZ TSET: Jump to the address denoted by the branch name TSET when zero flip-flop is not set. When the push button 9$a$ was depressed, the zero flip-flop is made set. Thus the subroutine in question comes to end.

In conclusion, the light-emitting diode LED$_T$ continues to operate with intermittent lighting until the push button 9$a$ is depressed to set a desired value of time selected by the dial 9.

Degree Set (DEGSET) Subroutine

This subroutine covers statements Nos. 573 to 582.

MVI A,#80: Transfer a digital value representative of a hexadecimal number #80 to the accumulator.

OUT DISP2: Likewise as in the aforementioned TSET subroutine, a high level signal is applied to the clock terminal of CD4013#13, while the content #80 of the accumulator is fed to the data lines. As only 7-L data line becomes low, CD4013#13 receives a high level signal at the input terminal P1 and then energize the light-emitting diode LED$_D$.

CALL MS500: Perform the program of a subroutine MS500 which will be described later to maintain LED$_D$ in the energized state for 500 milliseconds.

MVI A,#00: Transfer a digital value representative of a hexadecimal number #00 to the accumulator.

OUT DISP2: Likewise as in the aforementioned OUT DISP2, the light-emitting diode LED$_D$ is de-energized.

CALL MS500: Maintain the LED$_D$ in the de-energized state for 500 milliseconds.

IN DATASET: Likewise as in the aforementioned TSET subroutine, digital value dependent upon the switches positions of SW20 and SW21 are transmitted through the input terminals A4 and A3 of the selector CD4019 and the NAND gates to the accumulator. When the push button 10$a$ is depressed to close SW21, an only signal appering at the data line 1-L becomes low, thus digital value representative of a hexadecimal number #02 entering the accumulator.

CPI #02: Compare the content of the accumulator with #02. Likewise as in the aforementioned CPI instruction, the setting condition of the zero flip-flop is determined. If the push button 10$a$ was depressed, the zero flip-flop is made set.

JNZ DEGSET: Terminate operation of a subroutine in question when the zero flip-flop is set, or otherwise jump to the address corresponding to the branch DEGSET. After all, the light-emitting diode LED$_D$ continues to operate with intermittent lighting until the push button 10$a$ is depressed.

Time One Set (TISET) Subroutine

This subroutine covers statements Nos. 602 to 613.

CALL TSET: Perform the program of the aforementioned TSET subroutine to provide intermittent display of LED$_T$ until the push button 9$a$ is depressed. Upon depression of the push button 9$a$, the following instructions are performed.

IN TIME: Provide an output of digital value representative of a hexadecimal number #13 to the address lines with only ∅-L, 1-L and 4-L becoming low. As INs 9 and 10 produces high level signals which are applied to the input terminals A and B of the decoder CD4028$_1$, at an only output terminal 3 of CD4028$_1$ there appears a high level signal for selection of SWs 12 to 15. As IN13 produces a high level signal which is transmitted through AND$_{MB2}$ and AND$_{SR1}$ to the input terminal Ka of the selector CD4019, and MB I/O RS-L produces a low level signal which after inverted by NAND$_{RS}$ is applied to NANDs R0 to R3, digital value dependent upon the switched positions of SWs 12 to 15 and representative of a desired value of time selected by the dial 9 are transferred through the selector CD4019 and NANDs R0 to R3 to the accumulator.

DCR A: Subtract digital value representative of decimal number 1 from the content of the accumulator.

MOV B, A: Transfer the content of the accumulator to B register.

MVI A,#01: Transfer digital value representative of #01 to the accumulator.

RLC: Shift the content of the accumulator left one bit. As the accumulator contained the digital value representative of #01, the resulting new content of the accumulator is digital value representative of #02.

DCR B: Subtract digital value representative of a decimal number 1 from the content of the accumulator.

JNZ TISET1: Proceed to the following instructions when the DCR B results in the setting of the zero flip-flop, or otherwise jump to the address denoted by the branch T1SET1.

Hence, the substraction of 1 from the time data selected by the dial 9 is repeated until the time data become zero, and therefore #01 is shifted to left by a number of times of repetition. For example, let us now assume that the dial 9 was operated to select 1 second, #04 enters the accumulator as can be seen from FIG. 5C. By DCR A, #03 can be obtained. The number of times by which the subtraction of #01 from #03 is repeated until #00 is resulted, is three so that the content of the accumulator, that is, #01 is shifted left three bits with the resulting content being #08 which, in the following step MOV H,A, is transferred to a H register. After all, when a time interval of 1 second is set, this time information is stored in the form of digital value representative of a hexadecimal number #08 in the H register. In other words, in the embodiment of the present invention, the hexadecimal number #01 provides 125 milliseconds. In consequence, #08 provides 125×8=1000 milliseconds. In general, if a time data in question is X, the content of the H register is in the form of 125×X.

Time One and Two Set (T12SET) Subroutine

This subroutine covers statements Nos. 583 to 602. CALL TSET; IN TIME; DCR A; MOV B;A; MVI A,#01; RLC; DCR B; JNZ T12SET; and MOV H,A are performed so that the first set time information is stored in the H register likewise as in the aforementioned subroutine T1SET. In the next place, CALL TSET; IN TIME; DCR A; MOV B, A; MVI A, #01; RLC; DCR B; JNZ T12SET2 are performed to process the subsequently set time information likewise as in the aforementioned T1SET subroutine. By MOV L,A, the content of the accumulator resulting from the processing of the time information is transferred to an L register. In conclusion, when two values of time are required for a single operation mode, a first required value of time is stored in the H register, while the second required value of time is stored in the L register.

Degree One and Two Set (D12SET) Subroutine

This subroutine covers statements Nos. 614 to 620. CALL D1SET: Call a subroutine D1SET (Degree One Set). By the above CALL D1SET, a subroutine D1SET is called and performed the undermentioned program.

Degree One Set (D1SET) Subroutine

This subroutine covers statements Nos. 621 to 628.

CALL DEGSET: Perform the aforesaid DEGSET subroutine with the result that the light-emitting diode $LED_D$ is intermittently energized until the push button 10a is depressed.

IN DEG: Provide an output of digital value representative of a hexadecimal number #14 to the address lines with only 2-L and 4-L becoming low. As the inverter IN11 produces a high level signal which is applied to the input terminal C of the decoder $CD4028_1$, there is an output of high level at only output terminal 4 of $CD4028_1$ for selection of angular degree setting switches SWs 16 to 19. As inverter IN13 produces a high level signal which is applied to $AND_{MB2}$ at one input terminal thereof, to the other input terminal of which is applied a high level signal from $AND_{MB1}$, then $AND_{MB2}$ produces a high level signal which is applied to $AND_{SR1}$ and $AND_{SR2}$. As 3-L line is high, only $AND_{SR1}$ produces an output which is applied to the input terminal Ka of the selector CD4019, so that the input terminals A1 to A4 are gated on, while MB I/O RS-L produces a low level signal which is converted by $NAND_{RS}$ to a high level signal by which NANDs R0 to R7 are gated on. Thus an output of digital value representative of a desired value of shutter opening angle selected by the dial 10 and dependent upon the switched positions of SWs 16 to 19 is transmitted through the data lines to the accumulator.

CPI #00: Compare the content of the accumulator with the digital value representative of a hexadecimal number #00, the content of the accumulator is coincident with #00, the zero flip-flop is set to a binary condition "1". Such situation occurs only when the dial 10 is set in a position for "Auto" mode as can be seen from FIG. 5C.

JN AA: Jump to the address denoted by branch AA when the zero flip-flop is set to "1", or otherwise perform the following instructions. Thus, except for "Auto" mode, the following instructions are performed.

CALL DEGA: Call a DEGA subroutine.

Degree A (DEGA) Subroutine

This subroutine covers statements Nos. 629 to 653.

CPI #01: Compare the content of the accumulator with #01. If the content of the accumulator is coincident with #01, the zero flip-flop is set to "1".

JZ A5: Jump to the address denoted by branch A5 when the zero flip-flop is set to "1", or otherwise perform the following instructions.

CPI #02: Compare the content of the accumulator with #02. Upon coincidence, the zero flip-flop is set to "1".

JZ A7: Jump to the address denoted by branch A7 when the zero flip-flop is set to "1", or otherwise perform the following instructions.

CPI #03: Compare the content of the accumulator with #03. Upon coincidence, the zero flip-flop is set to "1".

JZ A9: Jump to the address denoted by branch A9 when the CPI #03 results in the setting of the zero flip-flop to "1" or otherwise perform the following instructions.

CPI #04: Compare the content of the accumulator with #04. Upon coincidence, the zero flip-flop is set to "1".

JZ A11: Jump to the address denoted by branch A11 when the CPI #04 results in the setting of the zero flip-flop to "1", or otherwise perform the following instructions.

CPI #05: Compare the content of the accumulator with #05. Upon coincidence, the zero flip-flop is set to "1".

JZ A13: Jump to the address denoted by branch A13 provided that the CPI #05 results in the setting of the zero flip-flop to "1", or otherwise perform the following instructions.

CPI #06: Compare the content of the accumulator with #06. Upon coincidence, the zero flip-flop is set to "1".

JZ A15: Jump to the address denoted by branch A15 provided that the CPI #06 results in the setting of the zero flip-flop to "1", or otherwise perform the following instructions.

CPI #07: Compare the content of the accumulator with #07. Upon coincidence, the zero flip-flop is set to "1".

JZ A17: Jump to the address denoted by branch A17 provided that the CPI #07 results in the setting of the zero flip-flop to "1", or otherwise perform the following instructions.

CPI #08: Compare the content of the accumulator with #08. Upon coincidence, the zero flip-flop is set to "1".

JZ A19: Jump to the address denoted by branch A19 provided that the CPI #08 results in the setting of the zero flip-flop to "1", or otherwise perform the following instructions.

CPI #09: Compare the content of the accumulator with #09. Upon coincidence, the zero flip-flop is set to "1".

JZ A21: Jump to the address denoted by branch A21 provided that the CPI #09 results in the setting of the zero flip-flop to "1", or otherwise perform the following instructions.

CPI #0A: Compare the content of the accumulator with #0A. Upon coincidence, the zero flip-flop is set to "1".

JZ A23: Jump to the address denoted by branch A23 provided that the CPI #0A results in the setting of the zero flip-flop to "1", or otherwise perform the following instructions.

CPI #0B: Compare the content of the accumulator with #0B. Upon coincidence, the zero flip-flop is set to "1".

JZ A25: Jump to the address denoted by branch A25 provided that the CPI #0B results in the setting of the zero flip-flop to "1", or otherwise perform the following instructions.

MVI A, 27: Transfer digital value representative of a dicimal number 27 to the accumulator.

The DEGA subroutine achieves the entry of the shutter opening angle data in the form of a hexadecimal number selectively into the accumulator and the performance of the program of the selected one of the addresses denoted by the branch A5, A7, A9, A11, A13, A15, A17, A19, A21, A23 and A25 which depends upon the selected angle data. The programs of the various branches are:

A5: MVI A, 5; JMP DEGA1
A7: MVI A, 7; JMP DEGA1
A9: MVI A, 9; JMP DEGA1
A11: MVI A,11; JMP DEGA1  A13: MVI A,13; JMP DEGA1
A15: MVI A,15; JMP DEGA1
A17: MVI A, 17; JMP DEGA1
A19: MVI A, 19; JMP DEGA1
A21: MVI A, 21; JMP DEGA1
A23: MVI A, 23; JMP DEGA1
A25: MVI A, 25; JMP DEGA1

The MVI instruction transfers digital value representative of the same decimal number as the numeral given to the branch to the accumulator and is followed by the JMP instruction for jump to the address denoted by the branch DEGA1. Hence, stored in the accumulator is the digital value representative of a decimal number corresponding to the selected shutter opening angle, and then the program of the address denoted by the branch DEGA1 is performed. As the DEGA1 instruction is identical to a RET (Return) instruction of the DEGA subroutine, the CALL DEGA instruction is followed by the STA DEG1M instruction.

Degree One Set Subroutine (Continued)

STA DEG1M: Store the content of the accumulator in a first memory area addressed by a hexadecimal number #41F1.

RET: Return to the CALL DEGSET instruction proceeded by the CALL D1SET of the D12SET subroutine.

D12SET Subroutine (Continued)

The CALL DEGSET instructions is followed by IN DEG and CALL DEGA instructions in sequence with the result that the light-emitting diode $LED_D$ is intermittently energized until the push button 10a is depressed as in the aforementioned D1SET subroutine. Upon depression of the push button 10a, the selected angle data enter the accumulator.

STA DEG2M: Store the content of the accumulator in a second memory area addressed by a a hexadecimal number #41F2.

Hence, the first selected opening angle data is stored in the first memory area addressed by #41F1, and the subsequently selected opening angle data is stored in the second memory area addressed by #41F2. Thus, two data of the opening angle are set.

Time One (T1) Subroutine

This subroutine covers statements Nos. 552 to 556.

MOV B, H: Transfer the content of the H register to the B register.

CALL MS125: Perform a subroutine which will be described later to provide a time interval of 125 milliseconds.

DCR B: Subtract digital value representative of a decimal number 1 from the content of the B register. As the time data X is set in the form of 125x by the T1SET subroutine, this instruction performs a calculation defined by X−1. At a time when the content of the B register becomes zero, therefore, the duration of a time interval corresponding to the selected time data is terminated.

JNZ T1: Jump to the address denoted by branch T1 when the zero flip-flop is not set to "1" yet. When the DCR B results in the occurrence of zero in the content of B register, the zero flip-flop is set to "1" to proceed to the following instruction.

In consequence, by a number of times necessary to reduce the content of the BB register to zero, the MS125 subroutine is repeated to provide a time interval equal to 125 times the content of the B register in millisecond. For example, when #08 representative of one second was stored in the B register, the DCR B instruction is repeated eight times to obtain one second based on the formula $125 \times 8 = 1000$ milliseconds.

Time two (T2) Subroutine

This subroutine covers statements Nos. 557 to 561.

MOV B,L: Transfer the content of the L register to the B register.

Subsequent procedure is similar to that of the T1 subroutine. The time is formed on the basis of the time data memorized in LL register.

Shutter Subroutine

This subroutine covers statements Nos. 471 to 500.

IN PHASE: Provide an output of digital value representative of a hexadecimal number #18 to the address lines with only 4-L and 3-L becoming low. As inverter IN12 produces a signal of binary "1" level which is applied to AND$_{SR2}$, there appears at the input terminal Kb of the selector CD4019 a signal of "1" level so that digital information appearing at the B input terminals of CD4019 is permitted to pass therethrough, that is, the output of the binary counter CD452$\emptyset$ is selected to enter the accumulator of CPU.

The binary counter CD452$\emptyset$ is operated to count the number of pulses supplied from the light-emitting diode LEDP1, as each pulse is generated when one slit of the main shutter blade 21 comes to alignment therewith. Therefore, the number of pulses counted by CD452$\emptyset$ represents the phase angle of the shutter 21 and is to be written in the accumulator by the IN PHASE instruction. The main shutter blade 21 is provided with thirty six slots spaced from each other by an angular distance of 10°. As the counting starts at a time when a pulse is applied from the resetting circuit 23 to the RESET terminal of the binary counter CD452$\emptyset$, the phase angle from the initial position can be determined by multiplying the number of pulses counted by a factor of 10.

CPI #00: Subtract #00 from the content of the accumulator. If the result is zero, the zero flip-flop is made set to "1".

JNZ SHUTTER: Jump to the address denoted by branch SHUTTER except when the CPI #00 results in the setting of the zero flip-flop to "1". If such setting occurs, the following address instruction is performed.

Until the zero flip-flop is set to "1", therefore, a procedure comprising the steps IN PHASE, CPI #00 and JNZ SHUTTER repeats itself. Upon occurrence of zero in the CPI #00 step, in other words, upon attainment of the phase angle of the shutter to the initial one as shown in FIG. 4, the photo-diode PT2 is stricken by light from the light-emitting diode LEDP2 of FIG. 5A to produce a pulse which is applied to the RESET terminal of CD452$\emptyset$. Only when the resetting of CD452$\emptyset$ is established, the following MVI B,2 instruction gets performed. Before the shutter arrives the initial position, therefore, the performance of the subsequent program is inhibited to start.

MVI B,2: Transfer digital value representative of a decimal number 2 to the B register when the shutter has reached the initial position as shown in FIG. 4.

IN PHASE: Detect the actual phase angle of the shutter likewise as in the aforesaid IN PHASE instruction.

ANI #01: Taking ANDING of the content of the accumulator with #01. If the content of the accumulator is an odd number, the zero flip-flop is prevented from being set to "1".

JZ STR1: Jump to the address denoted by branch STR1 when the aforesaid ANI #01 step results in the setting of the zero flip-flop to "1", or otherwise perform the following address instruction.

For this reason, only when the content of the accumulator is an odd number, the following address instruction gets performed. When it is an even number, a procedure of IN PHASE, ANI #01 and JZ STR1 is repeated. In other words, after the phase of the shutter is set to "0", the program of the address corresponding to the statement No. 474 and those that follow is performed. Until the shutter rotates 10° from the initial position to effect application of one pulse to the binary counter CD452$\emptyset$, the performance of the following program is inhibited to start. After the shutter has rotated 10°, the following program is performed.

CALL PMC: Call the aforementioned PMC subroutine and perform this subroutine with the result that the auxiliary shutter is turned in such a direction as to close the aperture as the pulse motor rotates one step.

IN PHASE: Introduce the actual phase of the shutter into the accumulator as in the aforementioned IN PHASE.

ANI #01: Take ANDING of the content of the accumulator with #01 likewise as in the aforesaid ANI #01. When the content of the accumulator is an even number, the zero flip-flop is set to "1". Such event occurs after the phase of the shutter has advanced from 10° to 20°.

JNZ STR2: Jump to the address denoted by branch STR2 when the zero flip-flop is not set to "1" yet, or otherwise perform the following address instruction.

Until the shutter advance 20° in phase, therefore, IN PHASE; ANI #01; and JNZ STR2 are repeatedly performed. Upon advancement to 20°, CALL PMSTOP is performed.

CALL PMSTOP: Perform the aforementioned PMSTOP subroutine with the result that the energization of the pulse motor is stopped.

DCR B: Subtract 1 from the content of the B register. As mentioned before, at this time, the content of the B register is 2 so that the DCR B results in the occurrence of 1 in the new content of the B register. If the DCR B results in the occurrence of 0, the zero flip-flop is set to "1". Because the new content of the B register is 1, the zero flip-flop is not set to "1" yet.

JNZ STR1: Jump to the address denoted by branch STR1 when the zero flip-flop is not set to "1" yet, or otherwise perform the following address instruction.

As the zero flip-flop is not set to "1", the program of statements Nos. 476 to 484 for the branch STR1 is again performed so that the auxiliary shutter has advanced two steps. When the main shutter has arrived a phase of 40°, the aperture is fully closed, and then following program starts to be performed. It is to be noted that the main shutter starts to uncover the aperture at a phase of 60° and then reaches the aperture fully open position at a phase of 100°. In the above mentioned procedure, therefore, the auxiliary shutter reaches the aperture fully closed position before the main shutter starts to uncover the aperture.

IN PHASE: Introduce the actual phase angle of the shutter into the accumulator.

SUB E: Subtract the content of the accumulator from the content of the E register. When the subtraction results in zero, the zero flip-flop is made set to "1".

JNZ STR3: Jump to the address denoted by branch STR3 when the zero flip-flop is not set to "1", or otherwise perform the following address instruction.

Until the phase of the main shutter comes to coincidence with the phase stored in the E register, therefore, IN PHASE; SUB E; and JNZ STR3 are repeatedly performed. When the main shutter has reached a phse equal to that stored in the E register at a time during the maintenance of the auxiliary shutter in the aperture fully closed position, the following program is performed.

MVI B,2: Transfer 2 to the B register.

IN PHASE: Introduce the phase of the shutter into the accumulator.

ANI #01: Taking ANDING of the content of the accumulator with #01 likewise as in the aforesaid ANI #01. When the content of the accumulator is an even number, the zero flip-flop is made set to "1".

As the content of the E register is an odd number, when the shutter has reached a phase advanced by 10° from that stored in the E register, the ANI #01 results in the setting of the zero flip-flop to "1".

JNZ STR4: Jump to the address denoted by branch STR4 when the zero flip-flop is set to "0", or otherwise perform the following address instruction.

Until the phase of the shutter is advanced 10° from that stored in the E register, therefore, IN PHASE; ANI #01; and JNZ STR4 are repeatedly performed. Upon advancement of 10° from the phase of the E register, the following instruction gets performed.

CALL PMO: Perform the aforementioned PMO subroutine with the result that the auxiliary shutter is turned one step in a direction to open the aperture.

IN PHASE: Introduce the phase of the shutter into the accumulator likewise as in the aforesaid IN PHASE.

ANI #01: Likewise as in the aforesaid ANI #01, when the phase of the shutter is advanced by more 10°, in other words, by 20° from the phase stored in the E register, the zero flip-flop is not set to "1".

JZ STR5: Jump to the address denoted by branch STR5 when the zero flip-flop is set to "1", or otherwise perform the following address instruction.

Until the shutter is advanced by 20° from the phase equal to that stored in the E register, therefore, IN PHASE; ANI #01; and JZ STR5 are repeatedly performed. Upon advancement of 20° from the phase of the E register, the following CALL PMSTOP instruction is performed.

CALL PMSTOP: Perform the aforementioned PMSTOP subroutine with the result that the power supply to the pulse motor is stopped.

DCR B: Subtract 1 from the content of B register. When the subtraction results in 0, the zero flip-flop is made set to "1".

JNZ STR4: Jump to the address denoted by branch STR4 when the zero flip-flop is not set to "1", or otherwise perform the following address instruction.

As the initial content of the B register is 2, the DCR B results in the production of 1 based on the calculation: 2−1=1, so that the instructions beginning with IN PHASE of statement No. 490 of branch STR4 and terminating at JNZ STR4 of statement No. 499 are again performed, resulting in the setting of the zero flip-flop to "1". Thereafter, the following RET instruction is performed. Hence, the pulse motor is driven two steps. When the main shutter had advanced by 40° from the pulse of the E register, the auxiliary shutter is set to fully open the aperture.

0.5 Millisecond (MS05) Subroutine

This subroutine covers statements Nos. 678 to 681.

MVI C,#40: Transfer #40 to the C register.

DCR C: Subtract 1 from #140 of the C register.

JNZ MS05A: When the DCR C results in the setting of the zero flip-flop to "1", the following address instruction is performed, or otherwise the instruction of the address denoted by branch MS05A is performed.

As the calculation of #40−1=63, therefore, DCR C, and JNZ MS05A are performed 64 times before the following address or RET instruction is performed to terminate the program. As a result, an interval of time obtained by the computation is 0.5 millisecond.

5 Milliseconds (MS5) Subroutine

This subroutine covers statements Nos. 682 to 688.

MVI C,#0A: Introduce #0A into the C register.

MVI D,#40: Introduce #40 into the D register.

DCR D: Subtract 1 from #40 of the D register.

JNZ MS5B: When the DCR D results not in 0, the instruction of the address denoted by branch MS5B is performed. After DCR D; and JNZ MS5B are performed 64 times, the following instruction is performed.

DCR C: Subtract 1 from the content of the C register. The result is 9.

JNZ MS5A: If the result of the DCR C is not zero, jump to the address of branch MS5A to perform the program beginning with MVI D,#40. After the DCR C; and JNZ MS5B are repeated 10 times, the following RET instruction is performed to obtain 5 milliseconds.

500 Milliseconds (MS500) Subroutine

This subroutine covers statements Nos. 696 to 704.

MVI C,#FF: Transfer #FF to the C register.

MVI D,#7F: Transfer #7F to the D register.

DCR D: Subtract 1 from the content of the D register.

JNZ MS500B: If the above DCR D results not in zero, the instruction of the address denoted by branch MS500B is performed.

Hence, the DCR D; and JNZ MS500B are repeated #7F times, before the following instruction is performed.

DCR C: Subtract 1 from the content of the C register.

JNZ MS500A: If the above DCR C results not in zero, the instructions of the addresses beginning with the branch MS500A are performed.

Hence, the DCR instruction is performed #FFx#7F times to obtain 500 milliseconds.

125 Milliseconds (MS125) Subroutine

This subroutine covers statements Nos. 689 to 695.

MVI C;#80: Introduce #80 into the C register.

MVI D,#7F: Introduce #7F into the D register.

DCR D: Subtract 1 from #7F of the D register.

JNZ MS125B: If the result of the DCR D is not zero, the instruction of the address of the statement number for branch MS 125B is performed.

Hence, the instructions of the DCR to JNZ MS125B are performed #7F times before the following instruction is performed.

DCR C: Subtract 1 from #80 of the C register.

JNZ MS125A: If the result of the above DCR C is not zero, the instructions beginning with branch MS125A are performed.

Hence, the instructions MVI D,#7F to JNZ MS125B are performed #80 times to obtain 125 milliseconds.

The operation of the cinematographic camera of the invention will next be described with respect to the various operating modes.

(1) Normal (NORMAL) Mode

The operator will first turn the mode setting dial 7 to place an index mark cut thereon in registry with a symbol NORM, and then the main switch dial 5 with an index mark cut thereon being placed in registry with a symbol ON, thereby the CPU is rendered operative to start performance of a micro program written in the ROM with the memory addresses corresponding to a statement No. 21 and those that follow.

The statement No. 21 involves an instruction designated IN with an operand designated MODE and, upon performance, derives digital signals representative of a hexadecimal number #11 and appearing at respective address lines MBADDs ∅-L to 7-L with only ∅-L and 4-L lines taking the low level signals, which after inverted by INs 9 and 13 to high level signals are applied to input terminal A of decoder CD4028$_1$ and AND$_{MB2}$ respectively. The performance of the statement No. 21 (which will be hereinafter abbreviated as Stm. 21) for the instruction IN with the operand MODE (which will be hereinafter abbreviated as IN/MODE) also causes production of a low level signal appearing at line MB I/O RS-L. This signals is inverted by NAND$_{RS}$ to a high level signal which is applied to one input terminal of each of the NAND gates NANDs R0 to R7, thereby the NANDs R0 to R7 are acted on to produce inverted signals to those entered. As the address line MBADD 3-L takes a high level signal which is applied through inverters IN12 and IN$_{S1}$ to one input terminal of AND gate AND$_{SR1}$, and the output of AND$_{MB2}$ is of high level, said AND gate AND$_{SR1}$ produces a high level output so that the data selector CD4019 is operated to pass only those of the input signals which appear at A to NANDs R0 to R3. Further, as the decoder CD4028$_1$ produces only one output signal at terminal 1, those of the switches SW1 to SW21 which are connected to the output terminal 1 of CD4028$_1$ are rendered effective so that digital signals representing the switched positions of SWs 5 to 8 are introduced through NANDs R0 to R3 to the accumulator. In the case of the NORMAL mode, upon setting of dial 7 to the corresponding position, all SWs 5 to 8 remain in OFF states, thus the digital signals fed to the data lines MBDATAs ∅-L to 7-L representing #00 and being stored. Thereafter, Stm22 CPI/#00 is performed and then followed by Stm. 23 JZ/NORM. When the content of the accumulator is #00, Stm. 23 is followed by Stm. 52 for addresses denoted by a branch NORM.

The above performance of Stm 21 IN/MODE leads to the entry of #00 in the accumulator, and therefore a program of Stms. 51 to 68 is to be performed. Upon Stm.52 CALL/PMOST, the subroutine PMOST is performed with the result that the auxiliary shutter of FIG. 1 is set to the initial position as shown in FIG. 3A where the aperture is fully open with respect to the auxiliary shutter. Upon Stm. 53 IN/RL, digital signals representative of a hexadecimal number #10 (represented by HEX code) are fed to the address lines MBADDs ∅-L to 7-L with only 4-L becoming low so that all the inputs A to D of the decoder are of low level, and so that only output terminal 0 of the decoder produces a high level signal. In a similar manner to that described in connection with Stm. 21 IN, digital signals dependent upon the switched positions of SWs 1 to 4 are caused to enter the accumulator. Let us now assume that the manual release lever 6 is actuated to the second stroke, then SWs 1 and 2 are in ON states. This leads to the entry of a hexadecimal number #03 in the accumulator. Upon sequence of Stm. 54 CPI/#03, the content of the accumulator is compared with #03. If the result is "0", the zero flip-flop takes "1". Upon Stm. 55 JNZ/MRM with the setting of the zero flip-flop to "1", Stm. 56 CALL/START succeeds. Alternately assuming that the release lever 6 is not depressed to the second stroke yet, then the zero flip-flop is not made set to "1", so that the performance of Stm. 55 JNZ/NRM results in jump to the address denoted by branch NRM.

As the actuation of lever 6 has advanced to the second stroke, the performance of Stms. 501-504 START subroutine starts to drive the film motor 12 in a forward direction with simultaneous initiation of the taking of a first normal motion picture frame. Upon Stm. 57 IN/RL of branch NORM2 identical to that of branch NORM1, digital value depending upon the switched position of SWs 1 to 4 are written in the accumulator. Upon Stm. 58 SUI/#02, subtraction of #02 from the content of the accumulator is performed. If the content of the accumulator is less than #02, in other words, if the actuation of lever 6 is released, the sign flip-flop takes a "1" condition so that Stm. 59 JP/MORM2 is followed by Stm. 60 IN/PHASE. So long as the lever 6 remains depressed to the second stroke, SW1 and SW2 are left in ON states to enter #03 into the accumulator, so that Stm. 58 SUI/#02 results in the maintenance of the sign flip-flop set in "0" condition. Upon Stm. 59 JP/NORM2, therefore, the program of Stms. 57-59 starts again to be performed. Thus, rotation of the film motor 12 is retained until the actuation of lever 6 is terminated.

When the actuation of trigger 6 is released from the second to the first stroke, or further from the first stroke to the unactuated position, as SW2 or both of SW1 and SW2 is or are opened respectively, Stm. 57 IN/RL results in the entry of #01 or #00 into the accumulator respectively. Upon Stm. 60, as mentioned before, digital value representative of the actual phase of the main shutter 21 are transferred from the counter CD452∅ to the accumulator. Upon Stm. 61 CPI/34, the content of the accumulator is compared with 34. When the content of the accumulator has come to coincidence with the digital value representative of 34, the zero flip-flop is made set to "1". If so, Stm. 62 JNZ/Z1 is followed by Stm. 63 CALL/STOP.

As the binary counter CD452∅ counts the number of pulses beginning with the first pulse which occurred when the shutter 1 had rotated 10° from the initial phase position of FIG. 4, therefore, only when the shutter 21 has rotated 340° from the initial position, Stm. 63 is rendered effective, causing the plunger 24a of FIG. 3A to engage in the first arcuate slot 15a near or at the leading edge thereof. After a further slight rotation of the gear 15, the trailing edge of the slot 15a comes to abutment against the plunger 24a, thereby the shutter 21 is arrested in the initial phase position as shown FIGS. 3A and 4, while the energization of the film motor 21 is terminated.

Upon Stm. 64 MVI/B,#00, a hexadecimal number #00 is entered into the B register. Upon Stm. 65 IN/-MODE, as mentioned before, digital signals from SWs 5 to 8 are entered into the accumulator. In the subsequent Stm. 66 CMP/B, the content of B register is compared with the content of the accumulator. If these contents are coincident with each other, the zero flip-flop is set to "1" condition. Or otherwise, when the content of B register is smaller than the content of the accumulator, the carry flip-flop is set to "1" condition. Upon Stm. 67 JZ/NORM1 with the setting of the zero flip-flop to "1" condition, Stm. 67 is succeeded by Stm. 53 for branch NORM1. With alternate setting of the zero flip-flop, Stm. 67 is succeeded by Stm. 68 JMP/INITI1. If the mode setting dial 7 is unchanged in position during the abovementioned exposure operation, therefore, as Stm. 65 IN/MODE results in the entry of #00 into the accumulator, and Stm. 66 results in the setting of the zero flip-flop to "1" condition, the program beginning with Stm. 53 is performed. When the lever 6 is actuated again, a next normal motion picture sequence starts. With the dial 7 set out of the NORM position, Stm. 68 JMP/INITI1 is followed by Stm. 24 for the entry of the selected mode information.

During the process of taking a normal motion picture sequence, the film advancing mechanism operates in such a manner that as the phase angle of the main shutter 21 is sensed by the binary counter CD452$\emptyset$, in other words, as a number of pulses corresponding to the number of slits passed across a beam of light from LEDP1 is counted by CD452$\emptyset$, when the number of pulse counted has become 6, an actuating signal is applied through ANDD1 to the flip-flop FF', thereby the transistor Tr is turned on to energize the electromagnet 19. When the number of pulses counted has become 25, a deactuating signal is applied through ANDD2 to FF' to reset the latter. As a result, the period of actuation of the electromagnet 19 is controlled in accordance with the phase angle of the shutter, ranging from 60° to 250°. As shown in FIG. 6, the main shutter moves in a range of angles from 60° to 320° to open the aperture 20 at least in part of the aperture area thereof, while the pulldown claw pin 17a is retracted by the energized electromagnet 19 out of engagement with the perforations 18a of the film 18. Further, the pulldown plate 17 remains stationary at 200° during the rotation of the shutter. When the electromagnet 19 is de-energized at a time of 250°, the claw pin 17a is permitted to engage in one of the perforations, but remains stationary until the shutter assumes a 320° position. During a rotative range of 320° to 60°, therefore, one cycle of claw operation is completed with the film 18 advanced one frame past the aperture 20.

The above-described control process will change the sequence of branches before the actuation of lever 6 is not depressed to the second stroke as follows: By Stm. 55 JNZ/NRM, a jump to Stm. 712 shown by the branch name, NRM is caused to occur. Upon Stm. 712 MVI/B,#00, digital value representative of #00 are transferred to B register. Upon Stm. 713 IN/MODE, digital value corresponding to the selected mode by the dial 7 are transferred to the accumulator. Upon Stm. 714 CMP/B, the digital value representative of #00 entered in B register are compared with the digital value representative of the selected mode entered in the accumulator. When the selected mode is NORMAL mode, the zero filp-flop is set to "1" condition, so that Stm. 715 JZ/NORM1 is succeeded by Stm. 53 IN/RL. Alternately when the selected mode is not NORMAL mode, Stm. 715 is succeeded by Stm. 716 JMP/NORM3, then by Stm. 68 JMP/INITI1, and then by Stm. 24. Accordingly, when the dial 7 is left in registry with NORMAL, the camera operates for the taking of a normal motion picture. With the dial 7 turned to select any other mode than the normal mode, there is need to depress the push button 7A to start an exposure operation in the selected mode.

(2) Diaphragm Preference Mode (SHIBORI)

This mode makes possible automatic adjustment of the shutter opening angle in accordance with the level of brightness of an object being photographed so that correct exposure can be always effected in taking normal motion picture frames.

At first, the mode setting dial 7 will turn to place the index in registry with a symbol SHI, and then the main switch dial 5 will be turned to ON position, thereby the CPU is rendered operative to start performance of Stm. 21 IN/MODE. In SHI position, of the mode setting switches SW5 to SW8, only SW5 is turned on to provide digital value representative of #01 to data lines MBDATAs $\emptyset$-L to 3-L as shown in FIG. 5C and which are written in the accumulator. Upon Stm. 22 CPI/#00, the content of the accumulator is compared with #00. As the content of the accumulator is #01, the zero flip-flop is not set to "1" condition so that Stm. 23 JZ/NORM is succeeded by Stm. 24 CPI/#01. Upon Stm. 24, the zero flip-flop is set to "1", so that Stm. 25 JZ/SHIBORI is succeeded by Stm. 70 CALL/PMOST. The performance of the PMOST subroutine results in the setting of the auxiliary shutter to the initial open position. Upon Stm. 71 IN/RL, as mentioned before, the switched positions of SW1 and SW2 are written in the accumulator. Upon Stm. 72 CPI/#07, the content of the accumulator is compared with #07. If the content of the accumulator was not #07, the zero flip-flop is not set to "1" condition. Those of the switches SW1 to SW4 which are arranged to cooperate with the manual release lever 6 are only SW1 and SW2. Therefore, the actuation of lever 6 cannot achieve the entry of any smaller hexadecimal number than #03. Upon Stm. 73 JNZ/SBRI with "0" condition of the zero flip-flop, there is a jump to Stm. 717 MVI/B, #01 with which branch SBRI begins. This branch SBRI contains Stms. 717 MVI/B,#01; 718 IN/MODE; 719 CMP/B; 720 JZ/SHIBORI1; and 721 JMP/SHIBORI4 which are identical to Stms. 712 to 716 respectively, except that instead of transferring #00 into B register, #01 is transferred and that when the selected mode is not the diaphragm preference mode, Stm. 721 JMP/SHIBORI4 is succeeded by Stm. 89 JMP/INITI2 which is then succeeded by Stm. 26 CPI/#02 with which branch INITI2 begins. When the mode setting dial 7 is left in a position for the diaphragm preference mode, Stm. 720 JZ/SHIBORI1 is succeeded by Stm. 71 IN/RL with which branch SHIBORI1 begins. So long as the dial 7 remains in the position for the diaphragm preference mode, therefore, the performance of Stm. 71 IN/RL; Stm. 72 CPI/#07; and Stm. JNZ/SBRI are repeated.

When the push button 7a is depressed at a time during the repetition of the performance of Stms. 71 to 73, switch SW3 is closed so that with the trigger 6 depressed to the second stroke, Stm. 71 IN/RL results in the entry of #07 into the accumulator. Upon Stm. 72 CPI/#07, the zero flip-flop is set to "1" condition. Now first, Stm. 73 JNZ/SBRI is succeeded by Stm. 74 CALL/START. In conclusion, only when the depression of the lever 6 to the second stroke and the depression of the program start button 7a occur, the performance of the program for the diaphragm preference mode starts. Upon Stm. 74 CALL/START, the aforementioned START subroutine is called to perform with the result that the film motor 12 starts to be driven in the forward direction.

Upon Stm. 75 IN/EXT, in a similar manner to that described in connection with the IN instruction, there is derived an output of digital value representative of a hexadecimal number #20 (represented by HEX code) corresponding to the operand EXT in the address lines MBADDs ∅-L to 7-L. As only one MBADD line 5-L becomes low, AND$_{MB2}$ produces an output signal of "0" level which after inverted to "1" level is applied to the D input terminal of the decoder CD4028$_1$, while all the other input terminals A to C of the decoder receives "0" level signals, causing only one output terminal 8 of CD4028$_1$ to produce a "1" level output signal. This signal actuates the AND gates AA1 to AA4 of FIG. 5B to pass digital signals representative of a proper exposure value, in this instance, proper shutter opening angle dependent upon the level of brightness of the object photoelectrically sensed by SPCC of FIG. 13A and the sensitivity of the used film set in the variable resistor SvR from the analogue-to-digital converter AD to data lines MBDATAs ∅-L to 3-L and therefrom to the accumulator. Upon Stm. 76 MOV/E,A, the content of the accumulator is transferred to E register. Upon Stm. 77 CALL/SHUTTER, when the main shutter 21 has rotated 40° from the initial phase position, the auxiliary shutter 39 is driven to fully close the aperture 20 and maintained in this state. When the shutter 21 has advanced 40° from the phase entered in E register, the auxiliary shutter 39 is set fully open with respect to the aperture 20. By this, the phase of the main shutter stored in E register, in other words, the object brightness level is made use of in controlling the shutter opening angle.

Assuming that E register stores a decimal number 11 which corresponds to a shutter opening angle of 160°, when the main shutter has rotated 40° from the initial phase position, the auxiliary shutter 39 reaches the aperture fully closed position as shown by dashed lines in FIG. 7(d). When the main shutter assumes a phase of 110°, this is detected. When the phase of the main shutter becomes 120°, the pulse motor 38 is driven one step to turn the auxiliary shutter 39 counterclockwise by one step, thus the picture aperture starts to open. Further rotation of the main shutter to 140° is accompanied by counterclockwise movement of the auxiliary shutter 39 to uncover the picture aperture as much as half the entire area thereof. At a time for 140°, the pulse motor 38 is further driven by more one step. When the main shutter has reached 150°, the auxiliary shutter fully uncovers the aperture 20.

When the object brightness level is increased from the above, Stms. 75 and 76 enter a larger decimal number than 11 into the E register so that the auxiliary shutter 39 starts to open the aperture 20 after a corresponding time delay from the moment the main shutter has assumed a phase of 120°, with the resulting shutter opening angle being made smaller.

After the performance of Stm. 77, a succession of Stms. 78 IN/RL; 79 SUI/#02 and 79 JP/SHIBORI2 is performed which is identical to that of Stms. 57 to 59, so that, so long as the lever 6 is depressed, a program of Stms. 75 to 80 is repeatedly performed to make a normal motion picture sequence with automatic adjustment of the shutter opening angle in accordance with the object brightness level.

When the lever 6 is released from the force exerted thereon, Stm. 81 IN/PHASE is caused to succeed. Upon Stm. 83 JNZ/Z2, when the main shutter 21 has reached 340° as measured from the initial phase position, there occurs a jump to Stm. 84 CALL/STOP in a similar manner to that described in connection with the NORMAL mode, so that the main shutter 21 gets stopped at the final phase position coincident with the initial phase one. Then, the program proceeds in performance with Stm. 85 to 88: 85 MVI/B,#01; 86 IN/MODE; 87 CMP/B and 88 JZ/SHIBORI1, which are identical to Stms. 64 to 67 respectively. When the mode setting dial 7 is left in SHI position. Stm. 88 is succeeded by Stm. 71 with which the branch SHIBORI1 begins so that when the actuation of release is made again, the camera is rendered operative to take a second normal motion picture sequence in the diaphragm preference mode. When the dial 7 was changed in position from SHI mode, Stm. 88 is succeeded by Stm. 89 JMP/INITI2 which is then succeeded by Stm. 26 for the entry of the selected mode information.

(3) Memo Motion (MM) Mode

This mode performs a succession of single frame operations with each intervening time period previously adjusted to a desired value. The operator will first turn the mode setting dial 7 to place the index in registry with a symbol MM, and then throw the power switch, thereby the CPU is rendered operative with the start of performance of Stm. 21 IN/MODE. In MM position of the dial 7, of SWs 5 to 8 there is closed only SW6 to enter digital value representative of #02 through the respective lines MBDATAs ∅-L to 3-L to the accumulator as shown in FIG. 5C. Upon Stm. 22 CPI/#00, the condition of the zero flip-flop is determined based on the comparison of the content of the accumulator with #00. Now, the comparison takes #02 and #00, so that the zero flip-flop remains in "0" condition, causing Stm. 23 JZ/MORM to be succeeded by Stm. 24 CPI/#01. Such succession continues until the performance of the last CPI instruction in said succession sets the zero flip-flop to "1" condition. Upon the JZ instruction of the statement number next to that for the CPI instruction which occurred when the zero flip-flop was set to "1" condition, a branch of which the name is given on the same line as that of the effective JZ instruction-including statement. Now, the content of the accumulator is #02. Therefore, Stm. 26 CPI/#02 hits the case. Upon Stm. 27 JZ/MM, there is a jump to Stm. 91 with which branch Memo Motion (MM) begins. Upon Stm. 91 CALL/PMOST, the pulse motor 38 is set to the initial open position. Upon Stm. 92 CALL/T1SET, the aforementioned T1SET subroutine is performed to effect intermittent lighting of LED$_T$ until the push bottom 9a is depressed to enter digital value representative of a selected value of time by the dial 9 into H register. Let us now assume that the selected value of time is 1 second, then digital value representative of #08 are stored in H register as has been mentioned before. Upon Stm. 93 IN/RL, digital value depending upon the switched positions of SW1 and SW2 cooperative with the lever 6 are written in the accumulator. Upon Stm. 94 CPI/#07, the content of the accumulator is compared with #07. When the content of the accumulator takes at a value other than #07, the zero flip-flop is not made set to "1", but only when at #07, "1" condition is established. Of SWs 1 to 4, however, the only two switches SWs 1 and 2 are operated by the lever 6 to derive one of the hexadecimal numbers #00 and #03. Hence, it is impossible to set the zero flip-flop to "1" condition. Upon Stm. 95, the "0" condition of the zero flip-flop is detected, causing a jump to Stm. 722 with which the branch MMB begins. This branch MMB is comprised of Stms. 722 MVI/B,#02, 723 IN/MODE; 724 CMP/B; 725 JZ/MM1 and 726 JMP/MM3 which are identical to the aforementioned Stms. 712 to 716. Although a detailed description is omitted, instead of transfer of #00 to B register, there is transfer of #02. If the selected mode is not MM mode, Stm. 726 JMP/MM3 is succeeded by Stm. 110 JMP/INITI3 which is then succeeded by Stm. 28. Thus, the selected mode is scanned. Alternately when the mode setting dial 7 is left unchanged in MM position, Stm. 725 JZ/MM1 is succeeded by Stm. 93 with which the branch MM1 begins. So long as the dial 7 is in MM position, therefore, a number of succession cycles of Stms. 93 IN/RL; 94 CPI/#07; and 95 JNZ/MMB are repeated in performance. When the push button 7a is depressed at a time during the repetition of performance of Stms. 93 to 95, SW3 is closed. With the lever 6 depressed to the second stroke, therefore, the depression of the push button 7a realizes simultaneous closure to SWs 1 to 3, causing digital value representative of #07 to enter the accumulator when Stm. 93 is ON. Upon Stm. 94, the content of the accumulator is compared with #07 to result in the setting of the zero flip-flop to "1" condition, and Stm. 95 JNZ/MMB is succeeded by Stm. 96 CALL/START. As described above, unless the lever 6 is depressed to the second stroke and the program button 7a is made "ON" the program of the MM mode would not be performed.

Upon Stm. 96 CALL/START, the aforementioned START subroutine is performed to start forward rotation of the film motor 12. As the film motor 12 rotates, the actual phase of the main shutter 21 is sensed by IN/PHASE. When the phase as sensed has become 340° from the initial phase position, there occurs a jump to Stm. 100 CALL/STOP by CPI 34, JNZ/K. By the aforementioned STOP subroutine, the main shutter gets stooped after completion of one revolution. In other words, based on the program of Stms. 96 CALL/- START to 100 CALL/STOP, the film motor 12 is operated to drive the main shutter for rotation from the initial phase or 0° position to a first 340° phase position, and rotation of the shutter is stopped at a time when the initial phase is regained. During this one cycle of shutter operation, a first single frame has been exposed.

Upon Stm. 101 CALL/T1, the T1 subroutine of Stms. 552 to 556 is performed to form a time delay based on the time data stored in H register. As the required value of time is 1 second, after the main shutter is maintained stationary in the 360° phase position for 1 second, a succession of Stms. 102 IN/RL; 103 SUI/#02; and 104 JP/MM2 occurs to perform which are identical with Stms. 57 to 59 of the NORMAL mode. So long as the actuation of release continues, Stm. 104 is succeeded by Stm. 96 CALL/START (branch name MM2), thus starting a second cycle of performance of the program of Stms. 96 to 104, with the result that a second frame is exposed. In such a manner, the time period between successive two single frame exposures is adjusted to a desired value selected by the dial 9.

When duration of the release is terminated, Stm. 105 CALL/STOP is rendered effective in performance to terminate a particular continuous series of single frame exposures. Thereafter, in a manner similar to that shown in connection with Stms. 64 to 68 for NORMAL mode, there occurs a succession of Stms. 106 MVI/B,#02; 107 IN/MODE; 108 CMP/B and 109 JZ/MM1. If the selected mode is left unchanged from MM mode, Stm. 109 is succeeded by Stm. 93 so that upon second actuation of release, the camera starts to operate in MM mode. If a different mode from MM mode was selected, Stm. 109 is succeeded by Stm. 110 JMP/INITI3 which is then succeeded by Stm. 28 with which the branch INITI3 begins. The MM mode has been explained in connection with one second for the intervening time period. It is of course possible to vary the time period over a wide range of values available on the control panel shown in FIG. 1.

(4) Indent Work Sampling (IWS) Mode

This mode enables a desired time interval for which each of successive four single frame operations takes place to be selected as different from another desired time interval in which the next succession of four single frame operations is delayed to take place.

At first, the mode setting dial 7 will be turned to registry with a symbol IWS, and then the main switch will be closed, thereby the CPU is rendered operative with the start of performance of Stm. 21 IN/MODE for the entry of the switched positions of SWs 5 to 8 into the accumulator. Now the dial 7 is in IWS position where SW5 and SW6 are simultaneously closed to derive digital value representative of #03 to the data lines MBDATAs 0-L to 3-L as shown in FIG. 5C. Upon Stm. 22 CPI/#00, the content of the accumulator is compared with #00 to determine the condition of the zero flip-flop as has been mentioned before. The instant comparison takes place with a combination of #03 and #00, causing no change in the condition of the zero flip-flop. Upon Stm. 23 JZ/MORM, there occurs a jump to Stm. 24 CPI/#01 which performs comparison of the content of the accumulator with #03. Such procedure repeats itself until the zero flip-flop is set to "1" condition. Upon the JZ instruction next in statement number to the last CPI instruction which caused the zero flip-flop to be set to "1" condition, said "1" is detected to start performance of a succession of statements for the branch of which name is given on the same line as that having the last effective JZ instruction. As the content of the accumulator for the IWS mode is #03, the performance of Stm. 28 CPI/#03 results in the setting of the zero flip-flop to "1" condition. Upon Stm. 29 JZ/IWS, therefore, an Indent Work Sampling subroutine beginning at Stm. 112 starts to perform. Upon Stm. 112 CALL/PMOST, the aforementioned PMOST subroutine is performed to set the auxiliary shutter in the initial open position. Upon Stm. 113 CALL/T12- SET, the aforementioned T12SET subroutine is performed with the result that digital value representative of a time datum first selected by the dial 9 are stored in H register, and then digital value representative of another time datum selected by the dial 9 are stored in L register. Let us now assume that the first and second selected time data are ¼ and 1 in second respectively, the aforementioned T12SET subroutine when ON transfers to the accumulator #02 (a hexadecimal number corresponding to ¼ second) dependent upon the switched positions of SWs 12 to 15. Upon Stm. 586 DCR/A, the content of the accumulator is reduced to #01. Upon Stm. 587 MOV/B,A, the #01 is transferred to B register. Upon Stm. 588 MVI/A,#01, a #01 is transferred to the accumulator. Upon Stm. 589 RLC, the content of the accumulator becomes #02. Upon Stm. 590 DCR/B, the content of B register becomes #00. Upon Stm. 591

JNZ/T12SET followed by Stm. 592 MOV/H,A, the #02 of A register is transferred to H register.

To L register is transferred a 16-ma 1 number #08 corresponding to 1 second in the following manner. Upon Stms. 593 and 594, representative of #04 are transferred to the accumulator. Upon Stm. 595 CDR/A, the content of the accumulator becomes #03. Upon Stm. 596 MOV/B,A, the #03 is transferred to B register. Upon Stm. 597 MVI/A,#01, a #01 is transferred to the accumulator. Upon Stm. 598 RLC, the content of the accumulator becomes #02. Upon Stm. 599 DCR/B, the content of the B register becomes #02. Upon Stm. 600 JNZ/T12SET2, there is a jump to Stm. 598 RLC. This jump is repeated more two times until the content of B register becomes #00. At the final, therefore, the content of the accumulator is #08 which is to be transferred to L register.

After the entry of the time data into H and L registers has been completed, Stm. 113 CALL/T12SET is succeeded by Stm. 114 MVI/D,4 to transfer digital value representative of a decimal number 4 into D register. Upon Stm. 115 IN/RL, the switched positions of SW1 and SW2 cooperative with the lever 6 are written in the accumulator. Upon Stm. 116 CPI/#07, the content of the accumulator is compared with #07. When the content of the accumulator takes at a value other than #07, the zero flip-fop is not made set to "1" condition, but only when it takes at #07, the "1" condition is established. Of SWs 1 to 4, however, the only two switches SW1 and SW2 are operated by lever 6 to derive one of the hexadecimal numbers #00 and #03. Until then, therefore, the zero flip-flop was not set to the "1" condition. Upon Stm. 117 JNZ/IWSB, the "0" condition of the zero flip-flop is detected, causing a jump to Stm. 727 with which the branch IWSB begins. This branch IWSB is comprised of Stms. 727 MVI/B,#03; 728 IN/-MODE; 729 CMP/B; 730 JZ/IWS1; and 731 JMP/IWS4 which are identical with the aforementioned Stms. 712 to 716. Although a detailed description is omitted, instead of transferring #00 to B register, there is a transfer of #03. If the selected mode is not IWS mode, Stm. 731 JMP/IWS4 is succeeded by Stm. 136 JMP/INITI4 which is then succeeded by Stm. 30 (represented by the branch name IWITI4). Thus, the selected mode is scanned. Alternately when the mode setting dial 7 is left unchanged from IWS position, Stm. 730 JZ/IWS1 is succeeded by Stm. 115 IN/RL with which the branch IWS1 begins. So long as the dial 7 is in IWS position, therefore, a number of cycles of Stms. 115 IN/RL; 116 CPI/#07 and 117 JNZ/IWSB sequence are repeated to perform. When the push button 7a is depressed at a time during the repetition of such cycles, SW3 is closed. With lever 6 depressed to the second stroke, therefore, the depression of the push button 7a realizes simultaneous closure of three switches SW1 to SW3, causing digital value representative of #07 to enter the accumulator when Stm. 115 is ON. Upon Stm. 116 CPI/#07, the content of the accumulator is compared with #07 to result in the setting of the zero flip-flop to "1" condition, and then Stm. 117 JNZ/IWSB is succeeded by Stm. 118 CALL/START. As has been indicated above, when the depression of the lever 6 to the second stroke and the "ON" operation of the push button 7a are made, the program of the IWS mode is performed.

Upon Stms. 118 to 123 which are identical with Stms. 96 to 101 for the MM mode, a first single frame operation takes place. Based on the time data stored in H register, the main shutter is maintained stationary in the aperture fully closed position, that is, for ¼ second. At the termination of duration of ¼ second, Stm. 124 DCR/D starts to perform so that 1 is subtracted from 4 with the resulting content of D register becoming digital value representative of a decimal number 3. Upon Stm. 125 JNZ/IWS2, the condition of the zero flip-flop is detected. When the condition of the zero flip-fop as detected is "1", the following statement, namely, Stm. 126 CALL/T2 is rendered effective. Or otherwise, the program begining with Stm. 118 is performed again. As indicated just above, the new content of the D register is 3 so that the zero flip-flop is prevented from being set to "1", causing a second performance of the program beginning with Stm. 118, with the result that a second single frame operation is performed. After the duration of ¼ second from the closure of the aperture by the main shutter, Stms. 124 CDR/D; and 125 JNZ/IWS2 are performed. Until the zero flip-fop is set to "1" by the JNZ instruction, a number of repetitions of the program of Stms. 118 to 125 are performed. As mentioned just above, the initial content of D register is four so that the necessary number of repetitions is four. The fourth times Stm. 125 is succeeded by Stm. 26 CALL/T2. As a result, only after four single frame operations have taken place with each intervening time interval of ¼ second, the statement CALL/T2 starts to perform.

Upon Stm. 126 CALL/T2, the aforementioned subroutine T2 is performed with the result that the shutter is maintained stationary along with the film motor in the aperture fully closed position for the time interval previously stored in L register. In other words, as mentioned above, the time interval stored in L register is #08 corresponding to 1 second so that the aforementioned MS125 subroutine is performed a number of times equal to that necessary to cause the zero flip-flop to be set to "1" by the DCR instruction of the T2 subroutine, in this instance, eight times to form a continuous time interval of 1 second based on the calculation: $125 \times 8 = 1000$ milliseconds.

After the four cycles of single frame operation with each duration of ¼ second were completed in sequence, when a time interval of 1 second counting from the termination of duration of the last cycle of single frame operation has passed, Stm. 127 MVI/D,4 starts to perform with the result that digital value representative of a decimal number 4 are transferred again to D register. As Stms. 128 IN/RL, 129 SUI/#02; and 130 JP/IWS2 are identical with Stms. 57 to 59 for NORMAL mode, the maintenance of the once actuated release permits a mumber of repetitions of the program beginning with Stm. 118 CALL/START (represented by the branch name IWS2) and terminating at Stm. 130 to be performed with simultaneous occurrence of taking a number of picture frames as much as 4 times, while controlling the first time interval between the successive two frame exposures in each four single frame operations counting from the start in accordance with the time data, in this instance ¼ second, stored in H register and further controlling the second time interval by which the next following each four frame exposures are equally delayed from the just preceding each four ones in accordance with the time data, in this instance 1 second, stored in L register.

When the once actuated release has come to end, Stm. 131 CALL/STOP is rendered effective in performance to terminate the taking of a particular picture frame sequence made in the Indent Work Sampling mode. Thereafter, in a manner similar to that shown in connection with Stms. 64 to 68 for NORMAL mode, there occurs a succession of Stms. 132 MVI/B, #03; 133 IN/MODE; 134 CMP/B; and 135 JZ/IWS1. If the selected mode is left unchanged from IWS mode, Stm. 135 JZ/IWS1 is succeeded by Stm. 115 (represented by the branch name IWS1) so that upon a subsequent actuation of release, the camera starts to operate in IWS mode. If a different mode from IWS mode was selected, Stm. 135 is succeeded by Stm. 136 JMP/INITI4 which is then succeeded by Stm. 30. Thus, the newly selected mode is scanned.

(5) Work Sampling (WS) Mode

This mode repeats a number of cycles of motion picture-like operation with each cycle lasting for a desired time, while the cycles are time-spaced from each other by a desired time length. The mode setting dial 7 will first be turned on WSP position, and then the main switch will be closed, thereby the CPU is rendered operative with the start of performance of Stm. 21 which effects the entry of the information representative of the switched positions of SWs 5 to 8 into the accumulator. In WSP position, only SW7 is closed to derive digits representative of #04 to lines MBDATAs $\emptyset$-L to 3-L as shown in FIG. 5C, thus the content of the accumulator taking at #04. Upon Stm. 22 CPI/#00, the content of the accumulator is compared with #00 to determine the condition of the zero flip-flop as mentioned before. The instant comparison concerns #04 and #00, so that the zero flip-flop is not set to "1". Upon Stem. 23 JZ/NORM, there occurs a subsequence to Stm. 24 CPI/#01 where it occurs again to compare the content of the accumulator with #01. Such procedure repeats itself until the zero flip-flop is set to "1". Upon the JZ instruction next in statement number to the particular CPI instruction at which the zero flip-flop is made set to "1", this "1" condition is detected resulting in a jump to that of the statements with which the branch to be performed in sequence begins. As the content of the accumulator for WS mode is #04, Stm.30 CPI/#04 when ON causes the zero flip-flop to be set to "1" condition. Upon Stm.31 JZ/WS, therefore, there occurs a jump to Stm.138 with which the branch "Work Sampling" begins. Upon Stm.138 CALL/PMOST, the auxiliary shutter is set to the initial open position. Upon Stm.139 CALL/T12SET, as explained in connection with IWS mode, a first required value of time is set by the dial 9 to be entered into H register, and a second required value of time is set by the same dial 9 to be entered into L register. Now assuming that the first and second required values of time are $\frac{1}{4}$ and 1 in second respectively as identical to those used in IWS mode, the contents of H and L registers are #02 and #08 respectively.

Upon Stm.140 IN/RL, the switched positions of SW1 and SW2 controllable by trigger 6 are written in the accumulator. Upon Stm.141 CPI/#07, the content of the accumulator is compared with #07. If the content of the accumulator is different from #07, the zero flip-flop is prevented from being set to "1" condition. But only when it coincides with #07, the zero flip-flop is caused to take "1" condition. As those of the switches SW1 to SW4 which are to be controlled by trigger 6 are only SW1 and SW2, the possible 16-mal numbers are #00 and #03 so that Stm.141 CPI/#07 when ON fails to set the zero flip-flop to "1" condition. Upon Stm.142 JNZ/WSB, the "0" condition of the zero flip-flop is detected, causing occurrence of a jump to Stm.732 with which the brance WSB begins. This branch is comprised of Stms.732 MVI/B, #04; 733 IN/MODE; 734 CMP/B; 735 JZ/WS1; and 736 JMP/WS3 which are identical with Stms.712 to 716 for the NORMAL select branch. Although a detailed explanation of these statements is omitted, some notice has to be made below. Instead of transferring #00 to B register, #04 is transferred thereto. If a newly selected mode is different from WS mode, Stm.136 JMP/WS3 is succeeded by Stm.158 JMP/INITI5 which is then succeeded by Stm.32 with which the selected mode scanning program begins. If the mode setting dial 7 is left unchanged from WS mode position, Stm.735 JZ/WS1 is succeeded by Stm.140 IN/RL with which the branch WS1 begins. This WS1 branch is performed repeatedly until the push button 7a is depressed. Upon depression of button 7a, a program for WS mode beginning with Stm.143 CALL/START starts to perform.

After the aforementioned START subroutine is performed to start driving of the film motor to a frame frequency, Stm.144 CALL/T1 is rendered effective to control the period of actuation of the film motor to establish one cycle of motion picture operation based on the time data, in this instance, $\frac{1}{4}$ second stored as #02 in H register. At the termination of duration of the $\frac{1}{4}$ second, Stms.145 IN/PHASE; 146 CPI/34; 147 JNZ/K3 and 148 CALL/STOP are rendered effective to stop the main shutter in the initial phase position.

Upon Stm.149 CALL/T2, the aforementioned T2 subroutine is performed to maintain the main shutter stationary in the aperture closed position for 1 second based on the time data stored as #08 in L register. In other words by the program beginning with Stm.143 CALL/START and terminating at Stm.149 CALL/T2, it is made possible to perform a motion picture sequence for $\frac{1}{4}$ second according to the time data stored in H register and, in subsequence thereto, to stop exposure operation for 1 second according to the time data stored in L register. After the completion of performance of Stm.149 CALL/T2, there occurs a sequence of Stm.150 IN/RL; 151 SUI/#02, and 152 JP/WS2 which are identical with Stms. 57 to 59 for NORMAL mode. So long as the once actuated release is maintained effective, a number of repetitions of the program of Stms.143 CALL/START to 152 JP/WS2 are performed to take the corresponding number of motion picture sequences, while controlling the first and second time intervals in a manner mentioned above.

When the once actuated release has been terminated, Stm.152 JP/WS2 is succeeded by Stm.153 CALL/STOP. After that, Stms.154 MVI/B, #04; 155 IN/MODE; 156 CMP/B; 157 JZ/WS1; and 158 JMP/INITI5 which are identical with Stms.64 to 68 for NORMAL mode are performed in sequence repeatedly. When the mode setting dial 7 is maintained in WSP mode, and when a release is actuated again the program beginning with Stm.140 takes place. When the dial 7 is set to a position different from WSP position, the mode scanning program takes place.

(6) Self Timer Mode

This mode delays the start of a motion picture sequence by a desired time interval and limits duration of the motion picture sequence to a desired time interval. The operator will first turn the mode setting dial 7 to place the index in registry with a symbol St, and then turn on the main switch, thereby the accumulator is caused to store digits representative of #05 which is then discriminated in such a manner as can be understood from the description of any of the heretofore mentioned modes. Thus, upon Stm.32 CPI/#05, the zero flip-flop is set to "1" condition. Upon Stm.33 JZ/ST, there occurs a jump to Stm.160 CALL/PMOST. The aforementioned PMOST subroutine when ON sets the auxiliary shutter to the initial open position. Upon Stm.161 CALL/T12SET, the T12SET subroutine of Stms.583 to 602 is performed to effect the entry of a first and second required value of time into H and L registers respectively. Let us now assume that the first and second required values of time are 8 and 1 in second respectively, the the T12SET subroutine when ON enters digits dependdent upon the switched positions of SWs 12 to 15 for 8 seconds and which represent #07 in a hexadecimal number into the accumulator. Upon the DCR/A, the content of the accumulator is reduced to #06, but instead the content of H register, namely, #01 is shifted left one bit. Such procedure repeats itself six times until the content of the accumulator becomes #00 with the result that the final content of H register is digits representative of #40 in a hexadecimal number which corresponds to 64 in a hexadecimal number. On the other hand, entered into L register are digits representative of #08 likewise as in any of IWS and WSP modes.

When the trigger 6 is depressed to the second stroke and when the push button 7a is depressed, a succession of Stms.162 IN/RL; 163 CPI/#07; and 164 JNZ/STB is further succeeded by Stm.165 CALL/T1. If the push button 7a is not depressed yet, Stm.164 JNZ/STB is succeeded by Stm.737 with which the branch STB begins. This branch is comprised of Stms.737 MVI/B,#05; 738 IN/MODE; 139 CMP/B; 740 JZ/ST1; and 741 JMP/ST2. When a new mode is selected as different from ST mode, this new mode is scanned. If the mode setting dial 7 is permitted to remain in St mode, a number of repetitions of the program beginning with Stm.162 and terminating at Stm.740 are performed until the push button 7a is depressed.

Upon depression of the push button 7a at a time during the course of repetitions of the program, Stm.165 CALL/T1 starts to perform, causing the T1 subroutine to repeat the performance of the MS125 subroutine 64 times based on the digits representative of a hexadecimal number 64 stored in H register. At the termination of duration of 125 milliseconds × 64 = 8 seconds, Stm.166 CALL/START starts to drive the film motor for rotation and simultaneously to take a motion picture sequence. In other words, after the elapse of 8 seconds from the time at which the push button 7a is depressed, the taking of the motion picture sequence starts. Upon Stms.167 CALL/T2 to 171 CALL/STOP, the aforesaid motion picture operation continues to take place for 1 second, as this value of the time data is stored in L register. After the elapse of 1 second, the taking of the particular motion picture sequence is terminated. Thus, the start of a particular motion picture sequence is delayed by a time length set in H register, and the period of duration of the particular motion picture sequence is adjusted to a time interval set in L register.

After the completion of the taking of the particular motion picture sequence, the program beginning with Stm.172 is performed so that in a manner similar to that described in connection with NORMAL mode, upon actuation of a release again, the camera operates in ST mode provided that the mode setting dial 7 remains in ST position. If a new mode is selected as different from ST mode, the mode scanning program is rendered effective.

(7) Time Exposure One (TE1) Mode

This mode takes a continuous series of single frame exposures with each exposure time of a long duration previously selected, while the unexposure times between the successive frame exposure are adjusted to a value previously selected. The operator will first turn the mode setting dial 7 to place the index in registry with a symbol TE1, and then throw the main switch, thereby the accumulator is caused to store digits representative of #06 which is then discriminated in such a manner as can be seen from the foregoing description. Upon Stm.34 CPI/#06, therefore, the zero flip-flop is set to "1" condition. Next, upon Stm.35 JZ/TE1, there occurs a jump to Stm.178 CALL/PMOST. The aforementioned PMOST subroutine when ON sets the auxiliary shutter to the initial open position. Upon Stm.179 CALL/T12SET, the T12SET subroutine of Stms.583 to 602 is performed to effect the entry of a first and second required value of time into H and L registers respectively. Let us now assume that the first and second required values of time are 8 and 1 in second respectively, then the T12SET subroiutine when ON enters digits dependent upon the switched positions of SWs 12 to 15 for 8 seconds and which represent #07 in a hexadecimal number into the accumulator. Upon the DCR/A, the content of the accumulator is reduced to #06, but instead the content of H register, namely, #01 is shifted left one bit. Such procedure repeats itself six times until the content of the accumulator becomes #00 with the result that the final content of H register is digits representative of #40 in a hexadecimal number which corresponds to 64 in a decimal number. On the other hand, digits representative of #08 are entered into L register likewise as described above.

In performance of Stms.180 IN/RL; 181 CPI/#07; and 182 JNZ/TE1B, only when the depression of trigger 6 to the second stroke and the depression of the push button 7a occur simultaneously, Stm.183 CALL/T1 succeeds. If the push button 7a is not depressed yet, Stm.182 JNZ/TE1B is succeeded by Stm.742 with which the branch TE1B begins. This branch contains Stms.742 MVI/B,#06; 143 IN/MODE; 745 CMP/B; 745 JZ/TE11; and 746 JMP/TE14. As explanied in connection with the above modes, when a new mode is selected as different from TE1 mode, this mode is scanned to be effective. If the mode setting dial 7 is permitted to remain in TE1 position, a number of repetitions of the program of Stms.180 to 182 and 742 to 745 are performed until the push button 7a is depressed.

Upon depression of the push button 7a at a time during the course of repetitions of the program, Stm.183 CALL/START with the aforesaid START subroutine is performed to start driving of the film motor for forward rotation. Upon Stms.184 IN/PHASE; 185 CPI/16; and 186 JNZ/TE12, the main shutter is permitted to advance through an angular distance of 160° from the initial phase position. At a time when the shutter attains the advancement of 160°, Stm.187 CALL/STOP is performed causing the aforementioned STOP subroutine to actuate the electromagnet 24 for energization, thereby the plunger 24a is driven to engage in the second arcuate slot 15b (FIG. 3A), and simultaneously the film motor gets stopped from further rotation. By inertia drive, the main shutter 21 is further driven to assume a phase of 180° and then held in this position where the picuture gate 20 is fully open with the start of exposure of a first frame. This state is maintained for 8 seconds by Stm.188 CALL/T1.

At the termination of duration of 8 seconds, Stm. 189 CALL/START with the START subroutine starts driving of the film motor again. Upon Stms.190 IN/-PHASE; 191 CPI/34; 191 JNZ/K5; and 192 CALL/-STOP, the main shutter gets stopped in a position coincident with the initial phase position, so that the first frame exposure has been completed with the resulting exposure time being adjusted to the time data set in H register. Upon Stm.194 CALL/T2 with the aforementioned T2 subroutine, this state of the main shutter is maintained for 1 second, as this value of time is previously set in L register. As a result, by the program of Stms.183 to 194, the camera is operated in TE1 mode to make a single frame exposure of a desired duration followed by an unexposure of a desired duration.

So long as the once actuated release continues as detected by Stms.195 to 197, namely, 195 IN/RL; 196 SUI/#02; and 197 JP/TE13 which are identical with Stms.57 to 59 for NORMAL mode, a number of repetitions of the program of Stms. 183 to CALL/START to 197 JP/TE13 are performed to make a continuous series of the corresponding number of single frame exposure.

When the once actuated release has come to end, Stm.197 JP/TE13 is succeeded by Stm.198 CALL/-STOP. After that, Stms.199 MVI/B,#06; 200 IN/-MODE; 201 CMP/B; 202 JZ/TE11; and 203 JMP/INITI7 which are identical with Stms.64 to 68 for NORMAL mode are performed in this order repeatedly. When the mode setting dial 7 is maintained in TE1 position, and when a release is actuatead again, the camera is operated in TE1 mode again. When the dial 7 is set to a position different from TE1 position, the mode scanning program is selected to perform.

(8) Time Exposure Two (TE2) Mode

This mode makes a continuous series of single frame exposure while controlling the exposure time in accordance with the level of brightness of an object being photographed. The operator will first turn the mode setting dial 7 to place the index in registry with a symbol TE2, and then throw the power switch, thereby said mode is written in the accumulator in a similar manner to that in which each of the heretofore described modes is written therein, and the selected mode is discriminated. As the dial 7 is set in TE2 position, #07 is written in the accumulator. Upon Stm.36 CPI/#07, the zero flip-flop is set to "1" condition. Upon Stm.37 JZ/TE2, there occurs a jump to Stm.205 CALL/PMOST which when ON sets the auxiliary shutter to the initial open position.

Upon Stms.206 IN/RL; 207 CPI/#07; and 208 JNZ/TE2B, a simultaneous occurrence of the depression of the trigger 6 to the second stroke and the depression of the push button 7a only leads to start exposure operation in TE2 mode by the program beginning with Stm.209. If the push button 7a is not depressed yet, Stm.208 JNZ/TE2B is succeeded by Stm.747 with which the branch TE2B begins. This branch contains Stms.747 MVI/B,#07; 748 IN/MODE; 749 CMP/B; 750 JZ/TE21; and 751 JMP/TE25. As explained in each of the heretofore described modes, when a new mode is selected as different from TE2 mode, this new mode is scanned to be effective. If the mode setting dial 7 is permitted to remain in TE2 position, a number of repetitions of the program of Stms.206 to 208 and 747 to 750 are performed until the push button 7a is depressed.

Upon depression of the push button 7a at a time during the course of repetitions of the aforesaid program, Stm.209 IN/LEVEL is performed. Now the operand LEVEL means a 16-mal number #21 so that an output of digits representative of the 16-mal number #21 is derived to the address lines MBADDs ∅-L to 7-L with only ∅-L and 5-L becoming low. At only input terminals A and D of decoder $CD4028_1$ there appear high level signals causing $CD4028_1$ to produce an output of "1" level at output terminal 9. This output is applied to AND gates AA5 to AA8 of FIG. 5B through which digits representative of a predetermined value set in level circuit are introduced to the accumulator in a manner to that in which the aforesaid IN instruction is performed. Upon Stm.210 MOV/E,A, the content of the accumulator is transferred to the E register. Upon Stms.211 to 215 which are identical with Stms.183 to 187, the main shutter is driven for rotation and then arrested in a 180° phase position where the picture gate 20 is fully open. Upon Stm.216 IN/ICC, as this operand ICC means a hexadecimal number #22, an output of digits representative of #22 is derived to the address lines MBADDs ∅-L to 7-L in a similar manner to that in which the just mentiioned IN instruction is performed with only 1-L and 5-L becoming low. As the input terminals B and D of decoder $CD4028_1$ receive "1" signals, decoder $CD4028_1$ produces a "1" output at terminal 10, thereby the AND gates AA9 to AA12 are gated on and the flip-flop FFL is set from "1" to "0" condition at $\bar{Q}$ output stage with simultaneous occurrence of OFF of the transistor Tra. The light measuring circuit EXT produces an output proportional to the level of brightness of the object which is integrated by the capacitor C1. The output of the capacitor C1 is converted by the analog-to-digital converter AD' to a digital output which is loaded to the accumulator. Upon Stm.217 SUB/E, the reference value in E register is compared with the output of AD' upon coincidence with each other to set the zero flip-flop to "1" condition so that the program beginning with the next Stm.219 CALL/START. If the coincidence is not attained, a sequence of instructions with Stms.216 to 218 designated by the branch TE23 is carried out repeatedly.

When the coincidence has been attained, in other words, when the output of the capacitor C1 has attained a reference level dependent upon the output of LEVEL circuit of FIG. 5B, Stm.219 CALL/START is carried out. In a time interval corresponding to the output of the light measuring circuit EXT, the main shutter starts to be driven for rotation from the 180°phase position to the 360°phase position at which the main shutter will be stopped by the next sequence of the instructions with Stms.220 IN/PHASE; 221 CPI/34; 222 JNZ/K6; and 223 CALL/STOP. It is to be noted here that the occurrence of coincidence of the C1 output with the LEVEL output leads to the production of an output from the comparator which causes the flip-flop to be reset to the initial state, thus the capacitor C1 being made ready for the next cycle of single frame operation.

So long as the once actuated release is maintained effective as detected by the instructions of Stms.224 IN/RL; 225 SUI/#02; and 226 JP/TE24, which are identical with Stms.57 to 59 for NORMAL mode, a number of cycles of single frame operation are performed to take a continuous series of frame exposures while controlling the exposure time in accordance with the object brightness level, as the corresponding number of repetitions of the program of Stms.211 CALL/-START to 226 JP/TE24 designated by the branch T24. When the once actuated release has come to end, Stm.226 JP/TE24 is followed next by Stm.227 MVI/B,#07. In a similar manner to that in which the program for NORMAL mode is carried out, the camera is ready for operation in TE2 mode provided that the mode setting dial 7 remains unchanged from TE2 position. Upon displacement of dial 7 from TE2 position, the mode-scanning program starts to carry out.

(9) Fade-in (FI) Mode

The mode setting dial 7 will first be turned to place the index in registry with a symbol FI, and then the main switch will be thrown, thereby FI mode will be written in the accumulator, and the mode discriminating operation is performed in a manner similar to that described in any of the heretofore described modes. Now the symbol FI is registered by the dial 7 so that #08 is loaded to the accumulator and Stm.38 is carried out effectively to set the zero flip-flop to "1" condition. Upon Stm.39 JZ/FI, therefore, there occurs a jump to Stm.233 CALL/PMOST with which the branch FI begins and which when ON sets the auxiliary shutter to the initial open position. Upon Stm.234 CALL/D12-SET with the D12SET subroutine of Stms.615 to 619, two kinds of open angle data selected by the dial 10 are stored in respective memory locations addressed by #41F1 and #41F2 respectively. As shown in FIG. 5C, there are available 12 values of the shutter opening angle in 20° which are selected one at a time by the dial 10, the selected value depending upon the particular combination of the switched positions of SWs 16 to 19 cooperative with the dial 10. The first and second data of the opening angle set in this order represent degrees of initial and final angles at which a fade-in effect starts and terminates respectively.

After such setting of the opening angle data has been performed, a sequence of instructions with Stms.235 IN/RL; 236 CPI/#07; and 237 JNZ/FIB is carried out. Likewise as in any of the heretofore described modes, only when the depression of the trigger 6 to the second stroke and the depression of the push button 7a occur simultaneously, an exposure operation with fade-in effect starts to be carried out by a sequence of instructions beginning with Stm.238. If the push botton 7a is not depressed yet, Stm.237 JNZ/FIB is followed next by Stm.752 with which the branch FIB begins. This branch FIB contains 752 MVI/B,#08; 753 IN/MODE; 754 CMP/B; 755 JZ/FI1; and 756 JMP/FI4. As explained in each of the heretofore described modes, when a new mode is selected as different from FI mode, this new mode is rendered effective. When the mode setting dial 7 is left unchanged from FI mode position, the program of Stms.235 to 237 and 752 to 755 is repeatedly carried out until the push button 7a is depressed.

Upon depression of the push button 7a at a time during the process of carrying out the just mentioned program, Stm.238 LDA/DEG1M is carried out so that the content of the memory location #41F1 addressed by DEG1M, in other words, the opening angle data stored in #41F1 is loaded to the accumulator. Upon Stm.239 MOV/E,A, the opening angle data in the accumulator is transferred to E register. Upon Stm.240 CALL/-START, the aforementioned START subroutine is called on to be carried out. By this, the film motor is initiated to be driven for rotation in the forward direction. Upon Stm.241 MVI/D,6, digits representative of 6 are set in D register.Upon Stm.242 CALL/SHUTTER, the aforementioned SHUTTER subroutine is carried out.

Now assuming that the first and second values of the shutter opening angle entered by the aforementioned D12SET subroutine are 0° and 220° respectively, then decimal numbers 27 and 5 are stored in #41F1 and #41F2 respectively. When the main shutter 21 of FIG. 3A has rotated from the initial phase to a phase of 40°, the auxiliary shutter 39 fully closes the aperture. When the main shutter 21 has reached a phase of 280°, in other words, when the picture gate 20 starts to be closed by the main shutter 21, the pulse motor 38 is driven through one step in the direction to open the picture gate 21. During the turning movement of the auxiliary shutter 39 to the aperture half-open position, however, the main shutter moves from 280° to 300°. Then the pulse motor 38 is further driven through more one step to fully open the aperture, while the main shutter is advanced to 320° at which the aperture is fully closed. In total, therefore, the entire area of the aperture is being covered by either or both of the auxiliary shutter and the main shutter during the time when the main shutter moves from 60° to 320° as can be seen from FIG. 8(a) where the ordinate represents the proportion of an open part of the aperture to the entire area thereof, and the abscissa represents the phase angle of the main shutter. In other words, the initiation of aperture opening operation of the auxiliary shutter is controlled in accordance with the data stored in the memory location #41F1 by the SHUTTER subroutine. As the data stored in #41F1 is, in this instance, 27, the auxiliary shutter starts to open the aperture at a time when the main shutter has arrived at a phase of 280°. The selection of 27 as the first opening angle data leads to the maintenance of closure of the aperture during the first one revolution of the main shutter.

After a first frame exposure has been completed, the SHUTTER subroutine is followed by Stm.243 DCR/D which when ON subtracts 1 from 6 in D register. The result of the subtraction is discriminated by Stm.244 JNZ/FI2. If not 0, the branch FI2 is repeatedly carried out. In this instance, the necessary number of repetitions of the branch FI2 is 6 so that the first six frames are exposured to no light as the aperture is maintained closed. Thereafter, upon Stm.245 DCR/E, subtraction of 1 from the content of E register, in this instance, from 27 is carried out with the resulting content of E register being 26. Next, CALL/DISPLAY1 is carried out to display the content of E register by the light-emitting diodes LEDs 0 to 3 of FIG. 5(A). Upon Stm.247 LDA/DEG2M, the content of the memory location addressed by DEG2M or #41F2 is loaded to the accumulator. As the opening angle data stored in #41F2 was assumed to be 5, the resulting content of the accumulator becomes 5. Upon Stm.248 SUB/E, the content of the accumulator is subtracted from the content of E register with a result: 26−5=21. Upon Stm.249 JNZ/F15, whether or not the result of SUB/E is zero is detected. If not so, the instruction of the address denoted by the branch FI5 is carried out. After all, a number of repetitions of the program of Stms. 241 to 249 are carried out until the content of E register comes to coincidence with the opening angle set in #41F2.

Because the result of the SUB/E now is not zero, the just mentioned program is carried out again. At this time, however, as the content of E register was descreased from 27 to 26, performance of the SHUTTER subroutine causes the pulse motor to be driven when the main shutter has rotated to a phase of 270°, so that a resulting opening angle defined by the auxiliary shutter and the main shutter is wider than that for which the first six frame exposure were made by 10° as shown by dashed line B in FIG. 8(b). With a new opening angle of 10°, second six frame exposures are made in sequence. To take a motion picture sequence with fade-in effect, the initiation of operation of the auxiliary shutter is caused to be faster progressively with respect to the phase angle of the main shutter with the resulting opening angle being increased by 10° for every six frame exposures as shown by a sequence of dashed slope lines A to V in FIG. 8(b). At a time when the final one of the performances of the SUB/E occurs with a result of zero, in other words, when the opening angle is widened to a level narrower by 10° than the degree of angle set in #41F2, Stm.249 JNZ/FI5 is followed next by Stm. 250 CALL/SHUTTER. In this instance, after the opening angle has reached 210°, Stm. 250 CALL/SHUTTER is carried out to make six more frame exposures with the widest opening angle of 220° which was entered as #5 in #41F2 as shown by a dashed slope line W in FIG. 8(b). Thus, operation of the auxiliary shutter is controlled to increase the shutter opening angle from a first value of angle stored in #41F1 to a second value of angle stored in #41F2 in discrete steps of variation separated by 10° from each other for each six frame exposures.

After the completion of the last frame exposure with the widest opening angle dependent upon the data stored in #41F2, Stm.251 IN/RL is carried out, thereby the states of switches SW1 and SW2 of FIG. 5(A) are written in the accumulator as mentioned before. Upon Stm.252 SUI/#02, the content of the accumulator is subtracted by #02. So long as the trigger 6 is maintained depressed down to the second stroke, the content of the accumulator written in by the IN/RL is #03, so that the sign flip-flop is not set. Upon Stm.253 JP/F13, the instruction of the address denoted by the branch F13 is carried out. Until the trigger 6 is released from the once actuated depression, a number of repetitions of the program of Stms. 250 CALL/SHUTTER; 251 IN/RL; 252 SUI/#02; and 253 JP/F13 are carried out with the result that the particular motion picture sequence with fade-in effect is followed by a continuous series of the corresponding number of frame exposures with the opening angle dependent upon the data stored in #41F2 and remaining unchanged therethrough. When the once actuated release of the trigger 6 has come to end, Stm. 251 IN/RL results in the entry of #00 or #01 into the accumulator. Upon Stm. 253 JR/FI3, Stms.254 IN/PHASE to 257 CALL/STOP succeed in sequence. When the main shutter nears to the position equivalent to the initial phase position, the film motor is arrested to stop, as a current is allowed to flow through the solenoid of electromagnet 24 for 5 milliseconds to drive the plunger 24a for engagement with the first arcuate slot 15a.

After that, upon Stm.258 MVI/B,#08, a hexadecimal number #08 is written in B register. Upon Stm.259 IN/MODE, as mentioned before, the states of switches SW5 to SW8 are written in the accumulator. Upon Stm.260 CMP/B, the content of the accumulator is compared with the content of B register. When these contents are found to be equal to each other, the zero flip-flop is set to "1" condition. When the content of B register is smaller than that of the accumulator, the carry flip-flop is set to "1" condition. Upon Stm.261 JZ/FI1, the condition of the zero flip-flop is detected. When the zero flip-flop was set to "1" condition, the instruction of Stm.235 denoted by the branch FI1 is carried out. Or otherwise, Stm.261 JZ/FI1 is followed next by Stm.262 JMP/INITI9. If the mode setting dial 7 is not moved out of registry with FI mode during the above mentioned process of exposure operation, therefore, Stms.259 IN/MODE and 260 CMP/B when ON selects the program beginning with Stm.235 of the branch FI1 to be carried out, because FI mode provides #08 as mentioned before. A subsequent depression of the trigger 6 will lead to the start of a motion picture sequence with fade-in effect. If the dial 7 was operated to select a new mode as different from FI mode, the program of the mode set by the JMP/INITI9 instruction is carried out.

In operating the camera in such fade-in mode, it is possible to vary the length of that portion of the film which is to be exposed with fade-in effect by selecting the initial and final degrees of the variable opening angle as desired. Further, in order to vary the intensity of image in linear relation to the number of frames exposed with fade-in effect, the arrangement of the slits 21a of FIG. 4 as equally spaced from each other by 10° may be modified as spaced from each other by progressively longer angular distances, for example, proportional to the logarithms of angles in radian, as indicated by dotted lines in FIG. 4.

(10) Fade-out (FO) Mode

The mode setting dial 7 will first be turned to place the index in registry with a symbol FO, and then the main switch will be thrown, thereby the selected mode or FO mode is written in the accumulator, and the mode discriminating operation is performed in a manner similar to that described in any of heretofore described modes. Now the symbol FO is registered by the dial 7 so that #09 is loaded to the accumulator and Stm.40 is carried out to set the zero flip-flop to "1" condition. Upon Stm.41 JZ/FO, therefore, there occurs a jump to Stm.264 CALL/START with which the branch FO begins and which when ON sets the auxiliary shutter to the initial open position. Upon Stm.265 CALL/D12-SET with the D12SET subroutine of Stms.615 to 619, two kinds of opening angle data selected by the dial 10 are stored in respective memory locations addressed by #41F1 and #41F2 respectively. As shown in FIG. 5(C), there are available 12 values of the shutter opening angle in progression of 20° which are selected one at a time by the dial 10, the selected value depending upon the particular combination of the switched positions of SW16 to SW19 cooperative with the dial 10. The first and second data of the opening angle set in this order represent degrees of initial and final angles at which a fade-out effect starts and terminates respectively.

After such setting operation of the opening angle data has been performed, a sequence of instructions with Stms. 266 IN/RL; 267 CPI/#07; and 268 JNZ/FOB is carried out. Likewise as in any of the heretofore described modes, only when the depression of the trigger 6 to the second stroke and the depression of the push button 7a occur simultaneously, an exposure operation with fade-out effect starts to be carried out by a sequence of instructions beginning with Stm.269. If the push button 7a is not depressed yet, Stm.268 JNZ/FOB is followed next by Stm.757 with which the branch FOB begins. This branch FOB contains 757 MVI/B,#09; 758 IN/MODE; 759 CMP/B; 760 JZ/FO1; and 761 JMP/FO4. As explained in each of the heretofore described modes, when a new mode is selected as different from FO mode, this new mode is rendered effective. When the mode setting dial 7 is left unchanged from FO mode position, the program of Stms. 266 to 268 and 757 to 760 is repeatedly carried out until the push button 7a is depressed.

Upon depression of the push button 7a at a time during the process of carrying out the just mentioned program, Stm.269 LDA/DEG1M is carried out so that the content of the memory location #41F1 addressed by DEG1M, in other words, the opening angle data stored in #41F1 is loaded to the accumulator. Upon Stm.270 MOV/E,A, the opening angle data in the accumulator is transferred to E register. Upon Stm.271 CALL/START, the aforementioned START subroutine is carried out. In this, the film motor is initiated to be driven for rotation in the forward direction. Upon Stm.272 MVI/D,6, digits of a decimal number 6 are set in D register. Upon Stm.273 CALL/SHUTTER, the aforementioned SHUTTER subroutine is carried out.

Now assuming that the first and second values of the shutter opening angle entered by the aforementioned D12SET subroutine are 220° and 160° respectively, then decimal numbers 5 and 11 are stored in #41F1 and #41F2 respectively. When the main shutter 21 of FIG. 3A has rotated from the initial phase of 0° to a phase of 40°, the auxiliary shutter 39 fully covers the aperture. When the main shutter has advanced by more 10°, reaching a phase of 50°, this is detected. When the main shutter has reached a phase of 60°, in other words, when the picture gate 20 starts to be opened, the pulse motor is driven by one step to turn the auxiliary shutter in the counterclockwise direction to open the picture gate 20 to a point at which laterally half the entire area of the picture gate 20 is uncovered by the auxiliary shutter 39. When the main shutter further advances to a phase of 80°, the pulse motor is further driven by more one step. When the main shutter reaches a phase of 100°, in other words, when the picture gate is fully opened with respect to the main shutter, the auxiliary shutter is also moved away completely from the picture gate 20 so that the picture gate 20 is fully opened to an image forming light beam.

Whilst the main shutter is operated to open the aperture at least in part over a range of 60° to 280° in phase angle, operation of the auxiliary shutter is controlled in such a manner that when the main shutter is in a range of 0° to 40° in phase angle, in other words, when the aperture is fully covered by the main shutter, the auxiliary shutter also fully covers the aperture; when the main shutter reaches a phase of 60° to start uncovering of the aperture, the auxiliary shutter uncovers the picture gate 20 to half the entire area thereof; and when the main shutter reaches a phase of 100°, in other words, when the aperture is fully uncovered by the main shutter, the auxiliary shutter also fully uncovers the aperture. Thus, the auxiliary shutter is entirely retarded from the aperture when the main shutter is uncovering the aperture, thereby a first frame exposure is made with a maximum possible opening angle of 220° in the main shutter as will be seen from FIG. 7(a) wherein the main shutter covers and uncovers the aperture as indicated by the solid lines, while the auxiliary shutter covers and uncovers the aperture as indicated by the dashed lines. A time interval during which the auxiliary shutter covers the aperture is in coincidence with a time interval during which the main shutter covers the aperture to prevent the auxiliary shutter from affecting the first exposure.

After the first frame exposure has been completed, the SHUTTER subroutine is followed by Stm.274 DCR/D which when ON subtracts 1 from 6 in D register. The result of the subtraction is discriminated by Stm.275 JNZ/FO2. If not 0, the branch FO2 is repeatedly carried out. In this instance, the necessary number of repetitions of the branch FO2 is six so that the first six frames are exposed with one and the same opening angle of 220°. Thereafter, upon Stm.276 INR/E, addition of 1 to the content of E register, in this instance, to 5 is carried out with the resulting content of E register being increased to 6. Next, Stm.277 CALL/DISPLAY1 is carried out to display the new content of E register by the light-emitting diodes LEDs 0 to 3 of FIG. 5(A). Upon Stm.278 LDA/DEG2M, the content of the memory location addressed by DEG2M or #41F2 is loaded to the accumulator, thereby the opening angle data stored in #41F2 is transferred to the accumulator. As the opening angle data stored in #41F2 was assumed to be 11, the resulting content of the accumulator becomes 11. Upon Stm. 279 SUB/E, the content of E register is subtracted from the content of the accumulator to obtain a result: 11−6=5. Upon Stm.280 JNZ/FO5, whether or not the result of SUB/E is zero is detected. If not so, the instruction of the address denoted by the branch FO5 is carried out. After all, a number of repetitions of the program of Stms. 272 to 280 are carried out until the content of E register comes to coincidence with the opening angle set in #41F2.

Now because the result of the SUB/E is not zero, the just mentioned program is carried out again. At this time, however, as the content of E register was increased from 5 to 6, performance of the SHUTTER subroutine causes the pulse motor to be driven when the main shutter has rotated to a phase of 70°, so that a resulting opening anlge defined by the auxiliary shutter and the main shutter is narrower than that for which the first six frame exposures were made by 10°, being equal to 210° as shown by dashed line in FIG. 7(b). With a new opening angle of 210°, second six frame exposure are made in sequence. To take a motion picture sequence with fade-out effect, the start of operation of the auxiliary shutter is caused to be delayed by progressively longer times with respect to the phase angle of the main shutter with resulting opening angle being decreased by 10° for every six frame exposures. At a time when the final one of the performances of the SUB/E occurs with a result of zero, in other words, when the opening angle is narrowed to a level equal to the data set in #41F2, Stm.280 JNZ/FO5 is followed by Stm.281 CALL/SHUTTER. In this instance, after the opening angle has reached 160°, Stm. 281 CALL/SHUTTER is carried out to make six more frame exposures with the narrowest opening angle of 160° which was entered as #11 in #41F2 as shown in FIG. 7(c). Thus, operation of the auxiliary shutter is controlled to decrease the shutter opening angle from a first value of angle in degree stored in #41F1 to a second value of angle in degree stored in #41F2 indiscrete steps of variation separated by 10° from each other for each six frame exposures.

After the completion of the last frame epxosure with the narrowest opening angle dependent upon the data stored in #41F2, Stm. 282IN/RL is carried out, thereby the state of switches SW1 and SW2 of FIG. 5(A) are written in the accumulator as mentioned before. Upon Stm.283 SUI/#02, the content of the accumulator is subtracted by #02. So long as the trigger 6 is maintained depressed to the second stroke, the content of the accumulator written in by the IN/RL is #03, so that the sign flip-flop is not set. Upon Stm. 284 JP/FO3, the instruction of the address denoted by the branch FO3 is carried out. Until the trigger 6 is released from the once actuated depression, a number of repetitions of the program of Stms. 281 CALL/SHUTTER; 282 IN/RL; 283 SUI/#02; and 284 JP/FO3 are carried out with the result that the particular motion picture sequence with fade-out effect is followed by a continuous series of the corresponding number of frame exposures with the opening angle dependent upon the data stored in #41F2 and remaining unchanged therethrough. When the once actuated release of the trigger 6 has come to end, Stm. 282 IN/RL results in the entry of #00 or #01 into the accumulator. Upon Stm. 284 JR/RO3, Stms. 285 IN/PHASE to 288 CALL/STOP succeed in sequence. When the main shutter nears to the position equivalent to the initial phase position, the film motor is arrested to stop as a current is allowed to flow through the solenoid of electromagnet for 5 milliseconds to drive the plunger 24a for engagement with the first arcuate slot 15a.

Upon Stm. 289 MVI/B,#09, a hexadecimal number #09 is written in B register. Upon Stm. 290 IN/MODE, as mentioned before, the states of switches SW5 to SW8 are written in the accumulator. Upon Stm. 291 CMP/B, the content of the accumulator is compared with the content of B register. When these contents are found to be equal to each other, the zero flip-flop is set to "1" condition. When the content of B register is smaller than that of the accumulator the carry flip-flop is set to "1" condition. Upon Stm. 292 JZ/FO1, the condition of the zero flip-flop is detected. When the zero flip-flop was set to "1" condition, the instruction of Stm. 266 denoted by the branch FO1 is carried out. Or otherwise, Stm. 292 JZ/FO1 is followed by Stm. 293 JMP/INITI10. If the mode setting dial 7 is not displaced from registry with FO mode during the above mentioned process of exposure operation. Therefore, Stms. 290 IN/MODE and 291 CMP/B when ON selects the program beginning with Stm.266 of the branch FO1 to be carried out because FO mode provides #09 as mentioned before. A subsequent depression of the trigger 6 will lead to the start of a motion picture sequence with fade-out effect. If the dial 7 was operated to select a new mode as different from FO mode, the program of the mode set by the JMP/INITI10 instruction is carried out.

It will be understood from the foregoing that the length of that portion of the film which is to be exposed with fadeout effect can be varied by suitable selection of the initial and final values of the variable opening angle. By a similar modification of arrangement of the slits 21a to that described in connection with the FI mode, the intensity of imaging light can be varied in a linear manner over the entire length of that portion of the film which is exposed with fadeout effect.

(11) Overlap (OL) Mode

The mode setting dial 7 will first be turned to place the index in registry with a symbol OL, and then the main switch will be thrown, thereby OL mode is written in the accumulator, and the mode discriminating operation is performed in a similar manner to that described in any of the heretofore described modes. Now, the symbol OL is registered by the dial 7 so that #OA is loaded to the accumulator and Stm. 42 CPI/#OA is carried out to effect the setting of the zero flip-flop to "1" condition. Upon Stm. 43 JZ/OL, therefore, there occurs a jump to Stm. 295 CALL/PMOST with which the branch OL begins. This branch OL covers Stms. 295 CALL/PMOST to 311 JNZ/OL5 which are identical with Stms. 264 to 280 for FO mode. After this branch OL is carried out to take a motion picture sequence with fade-out effect in discrete steps of decrease of the shutter opening angle from a previously selected value of angle to a value of angle larger by 10° than another previously selected value of angle, each step occurring for the taking six frame exposures in sequence, Stm. 311 JNZ/OL5 is followed by a sequence of Stms. 312 IN/PHASE to 315 CALL/STOP so that the main shutter and the film motor are stopped in the position equivalent to the initial phase position. Thereafter, Stms. 316 IN/RL; 317 SUI/#02 and 318 JP/OL3 are carried out to permit this state to be maintained so long as the once actuated release continues.

When the once actuated release has come to end, the next Stm. 319 LDA/DEG1M is carried out, thereby the content of the memory location addressed by DEG1M, namely, the opening angle data for the start of fade-out effect stored in #41F1 is loaded to the accumulator. Upon Stm.320 MOV/E,A, the content of the accumulator is transferred to E register. Upon Stm. 321 CALL/PMCST, the aforementioned PMCST subroutine is carried out to turn the auxiliary shutter 39 in a clockwise direction to close the aperture. Upon Stm. 322 CALL/REV, the aforementioned REVERSE subroutine is carried out to drive the film motor 12 for rotation in the reverse direction, thereby the rewinding of the film is initiated. Upon Stm. 323 MVI/D,6, a transfer of 6 to D register occurs. Upon Stms. 324 IN/PHASE; 325 CPI/#00 and 326 JNZ/OL4, the main shutter is rotated counterclockwise as viewed in FIG. 3A to the initial phase position at which the film has been rewound by a length corresponding to one frame. Upon Stms. 327 IN/PHASE; 328 CPI/#00; and 329 JZ/K11, the main shutter is further rotated counterclockwise causing the film to be rewound by more one frame. During this time, Stm. 330 DCR/D is carried out to subtract 1 from the content of D register. Such procedure repeats itself until the subtraction results in zero. If the result is zero, Stm. 332 INR/E is permitted to succeed. Or otherwise, the branch OL4 of Stms. 324 to 331 is carried out again. Now, because of the fact that the initial content of the D register is 6, the rewinding of the film by a length corresponding to the sum of six picture frames is required to set the zero flip-flop to "1" condition by carrying out Stm. 330 DCR/D. When the zero flip-flop is set to "1" condition, Stm. 331 JNZ/OL4 is followed by Stm. 332 INR/E which when ON adds 1 to the content of E register. Upon Stm. 333 LDA/DEG2M, the opening angle data for the finish of fade-out effect is transferred to the accumulator. Upon Stms. 334 SUB/E and 335 JNZ/K12, the content of E register is subtracted from the content of the accumulator, and, when the content of E register has come to coincidence with the content of the accumulator, the zero flip-flop is set to "1" condition. When the condition of the zero flip-flop is "1", the program beginning with Stm. 336 is carried out. Or otherwise, the branch K12 of Stms. 323 to 335 is carried out repeatedly until the result of the SUB/E is zero. After all, the film has been rewound to a point at which the fade-out is initiated.

Now assuming that a fade-out is to be effected with variation of the shutter opening angle from 220° to 180°, upon instructions of Stms. 300 to 311, a continuous series of six frame exposures are made four times with stepwise variation of the opening angle from 220° to 190° by a separation of 10° so that 4×6=24 frames are made with fade-out effect. Therefore, upon Stms. 319 to 335, the rewinding of every six frames for each 10° from 220° to 190° is performed 4 times. When the film has been rewound by 24 frames based on the formula: 6×4=24, a sequence of Stms. 336 IN/PHASE; 337 CPI/34; 338 JNZ/K13; and 339 CALL/STOP are performed to stop the film motor in the position equivalent to the initial phase position.

When the depression of the trigger 6 to the second stroke and the depression of the push button 7a simultaneously occur again as detected by carrying out Stms. 340 IN/RL; 341 CPI/#07; and 342 JNZ/OL41, the aforesaid PMOST subroutine is selected by Stm. 343 CALL/PMOST, and carried out to set the auxiliary shutter to the initial open position. Upon Stms. 344 to 363 which are identical with Stms. 239 to 257 for FI mode, that particular motion picture sequence which has been taken with fade-out effect is now re-exposed with fade-in effect while the shutter opening angle is varied from the second angle data stored in the memory location #41F2 addressed by DEG2M to the first angle data stored in the memory location #41F1 addressed by DEG1M. After the completion of the taking of the particular overlapped motion picture sequence, the shutter is maintained stationary in the aperture closed position, while the instructions of Stms. 364 MVI/B,- #0A; 365 IN/MODE; 366 CMP/B; 367 JZ/OL1; and 368 JMP/INITI11 are carried out in sequence. Likewise as for the program of NORMAL mode, a second of actuation of the release trigger 6 followed by the depression of the push button 7a will lead to the start of operation of the camera in OL mode provided that the mode setting dial 7 is left unchanged from OL mode position. Otherwise, when the mode setting dial 7 is displaced from the OL position to select a new mode, the mode scanning program starts to be carried out. It is to be noted again that the use of modified arrangement of the slits 21a as with the angular spaces of geometrical progression is preferable particularly in this overlap mode because the total intensities of the overlapped exposures are made uniform to one another.

(12) Wipe-in Mode

This mode performs exposure operation with the picture aperture being fully closed for a previously selected time interval, and thereafter taking an open area which is gradually increasing from zero to the maximum. The mode setting dial 7 will first be turned to place the index in registry with a symbol WI, and then the main switch will be thrown, thereby the instant or WI mode is written in the accumulator, and the mode discriminating operation is performed in a manner similar to that described in any of the heretofore described modes. Now, the symbol WI is registered by the dial 7 so that #0B is written in the accumulator and Stm. 44 is carried out to set the zero flip-flop to "1" condition. Upon Stm. 45 JZ/WI, therefore, there occurs a jump to Stm. 370 CALL/PMCST with which the branch WI begins and which when ON sets the auxiliary shutter to the aperture closed position as shown in FIG. 9(A). Upon Stm. 371 CALL/T1SET, the aforementioned T1SET subroutine is carried out to set a time data in H register. Now assuming that the selected time data is 1 second, a hexadecimal number #06 is transferred to H register as mentioned before. Upon simultaneous occurrence of the depression of the trigger 6 to the second stroke and the depression of the push button 7a as detected by carrying out Stms. 372 IN/RL; 373 CPI/#07; and 374 JNZ/WIB, an exposure operation in wipe-in mode starts to be performed by a sequence of instructions beginning with Stm. 375. If the push button 7a is not depressed yet, Stm.374 JNZ/WIB is followed next by Stm. 767 with which the branch WIB begins. This branch WIB contains 767 MVI/B,#0B; 768 IN/- MODE; 769 CMP/B; 770 JZ/WI1; and 771 JMP/WI4. As has been expained in each of the heretofore described modes, when a new mode is selected as different from WI mode, this new mode is rendered effective. When the mode setting dial 7 is left unchanged from WI mode position, the program of Stms. 372 to 374 and 767 to 770 is repeatedly carried out until the push button 7a is depressed.

Upon depression of the push button 7a at a time during the process of carrying out the just mentioned program, Stm. 375 CALL/START with the aforementioned START subroutine is carried out causing the film motor to start in rotation. As the auxiliary shutter was operated to fully close the picture gate 20, no exposure is made. Upon Stm. 376 MVI/D,2, digits representative of a decimal number 2 are transferred to D register. Upon next Stm. 377 CALL/PMO, the pulse motor is driven for rotation in a direction to open the picture gate, thereby the aperture is half opened by the auxiliary shutter as shown in FIG. 9B. Upon Stm. 378 CALL/MS5 with the aforementioned MS5 subroutine, this state is maintained for 5 milliseconds. Upon Stm. 379 CALL/PMSTOP with the aforementioned PMSTOP subroutine, the power supply to the pulse motor 38 is stopped. Upon Stm. 380 CALL/T1 with the aforementioned T1 subroutine, an exposure operation is performed for 1 second with the auxiliary shutter half opened. Thereafter, upon Stm. 381 DCR/D, subtraction of 1 from the content of D register is performed. If the subtraction results in zero, Stm. 382 JNZ/WI2 is followed by Stm. 383 IN/RL. If not so, the program of Stms. 377 to 380 is carried out repeatedly until the DCR/D results in zero. Now the content of D register is 2 so that after the program of Stms. 377 to 380 has been carried out two times, the instructions of Stm. 383 and that follow are carried out. Accordingly, after an exposure operation has been performed with an aperture shown in FIG. 9B for 1 second, the pulse motor is driven by more one step causing the auxiliary shutter to fully open the aperture as shown in FIG. 9C with which a further exposure operation is performed for 1 second. Then, the program beginning with Stm. 383 is carried out. In such a manner, the aperture takes a half open state for first 1 second exposure, and thereafter the full open state for more 1 second exposure, thereby the film frame is first exposed in half the entire area thereof, and then exposed over the entire area thereof. After the wipe-in exposure operation has been performed in such a manner, the program of Stms. 383 IN/RL to 385 JP/WI3 is carried out. Likewise as in the instructions of Stms. 57 to 59 for NORMAL mode, so long as the once actuated release is maintained effective, the program of Stms. 383 IN/RL to 385 JP/WI3 for the branch WI3 is carried out repeatedly to continue the exposure operation with the fully open aperture. When the once actuated release as come to end, the JP instruction of Stm. 385 reaches the CALL/STOP of Stm. 389, and the STOP subroutine is carried out to terminate the exposure operation. Thereafter, the instructions of Stms. 390 to 394 are carried out so that when the mode setting dial is left unchanged from the wipe-in mode position, a second of actuation of the release starts an exposure operation in WI mode, while when the dial 7 is displaced from the WI position, the mode scanning program is carried out. Such procedure is similar to that with the program for NORMAL mode.

(13) Wipe-out (WO) Mode

This mode performs exposure operation while the picture aperture being first fully opened for a previously selected time interval and then gradually decreased in the open area thereof to zero. The mode setting dial 7 will first be turned to place the index in registry with a symbol WO, and then the main switch will be thrown, thereby the instant or WO mode is written in the accumulator, and the mode discriminating operation is performed in a manner similar to that described in any of the heretofore described modes. Now, the symbol WO is registered by the dial 7, so that #0C is written in the accumulator, and Stm. 46 CPI/#0C is carried out to set the zero flip-flop to "1" condition. Upon Stm. 47 JZ/WO, therefore, there occurs a jump to Stm. 396 CALL/PMOST with which the branch WO begins and which when ON sets the auxiliary shutter to the initial open position. Upon Stm. 397 CALL/T1SET, the aforementioned T1SET subroutine is carried out to set a desired time data in H register. Now assuming that the selected time data is 1 second, a hexadecimal number #06 is transferred to H register as mentioned before. Upon simultaneous occurrence of the depression of the trigger 6 to the second stroke and the depression of the push button 7a as detected by carrying out Stms. 398 IN/RL; 399 CPI/#07; and 400 JNZ/WOB, Stm. 401 CALL/START succeeds to start an exposure operation in WO mode. If the push button 7a is not depressed yet, Stm. 400 JNZ/WOB is followed next by Stm. 772 with which the branch WOB begins. This branch contains 772 MVI/B,#0C; 773 IN/MODE; 774 CMP/B; 775 JZ/WO1; and 776 JMP/WO3. As has been explained in each of the heretofore described modes, when a new mode is selected as different from WO mode, this new mode is rendered effective. When the mode setting dial 7 is left unchanged from WO mode position, the program of Stms. 398 to 400 and 772 to 775 is repeatedly carried out until the push button 7a is depressed.

Upon depression of the push button 7a at a time during the process of carrying out the just mentioned program, Stm. 401 CALL/START is carried out with the start of an exposure operation. Thereafter, upon Stm. 402 MVI/D,2, a transfer of digits representative of a decimal number 2 to D register occurs. Upon next Stm. 403 CALL/PMC, the aforementioned PMC subroutine is carried out to set the auxiliary shutter in a position where the aperture is open in half the entire area thereof. Upon Stms. 404 CALL/MS5 and 405 CALL/PMSTOP, the power supply to the pulse motor is stopped likewise as in WI mode. Thereafter, upon Stm. 406 CALL/T1, this state (where the aperture is half closed) is maintained for 1 second, while permitting exposure operation to proceed. Upon Stms. 407 DCR/D and 408 JNZ/WO2 which are identical with Stms. 381 and 382 for WI mode, there occurs a number of jumps to Stm. 403 until the result of the DCR/D is zero. Now the content of D register is 2, so that after an exposure operation is performed with the half opened aperture for first 1 second and further with the fully opened aperture for more 1 second, Stms. 409 IN/PHASE to 412 CALL/STOP are carried out to stop the main shutter in the position equivalent to the initial phase position. After that, the instructions of Stms. 413 to 417 are carried out so that when the mode setting dial 7 is left unchanged from the wipe-out mode position, a second of actuation of the release starts an exposure operation in WO mode, while when the dial 7 is displaced from the WO position, the mode scanning program is carried out. Such procedure is similar to that with the program for NORMAL mode.

As a result, by a succession of exposure operations the first one of which is performed with the half open aperture for 1 second and the second one of which is performed with the full open aperture for 1 second, picture images are first formed on film frames in only half the area of each of the frames, and then no picture images are formed on subsequent film frames, thus a picture sequence is taken in WO mode.

(14) Wipe Lap (WL) Mode

This mode makes wipe-out and wipe-in exposures on the same portion of the film. Prior to the making of wipe lap exposures, there is need to manipulate a not shown operating member so that the stopper 40b of FIG. 3A is moved from the normal position shown in FIG. 9A to the left, reaching a position shown in FIG. 10, where the stopper 40b is held in abutment against the left end of the arcuate slot 101c. Then, the mode setting dial 7 will be turned to place the index in registry with a symbol WL, and the main switch will be thrown, thereby the instant or WL mode is written in the accumulator and the mode discriminating operation is performed in a manner similar to that described in any of the heretofore described modes. Now, the symbol WL is registered by the dial 7, so that #0D is written in the accumulator, and Stm. 48 CPI/#0D is carried out to set the zero flip-flop to "1" condition. Upon Stm. 49 JZ/WL, therefore, there occurs a jump to Stm. 419 CALL/PMOST with which the branch WL begins and which when ON sets the auxiliary shutter to the initial open position. Upon Stm. 420 CALL/T1SET, the aforementioned T1SET subroutine is carried out to set a desired time data in H register. Upon simultaneous occurrence of the depression of the trigger 6 to the second stroke and the depression of the push button 7a as detected by carrying out Stms. 421 IN/RL; 422 CPI/#07; and 423 JNZ/WLB, Stm. 424 CALL/START succeeds to start an exposure operation in WL mode. If the push button 7a is not depressed yet, Stm. 423 JNZ/WLB is followed by Stm. 777 with which the branch WLB begins. This branch WLB contains 777 MVI/B,#0D; 778 IN/MODE; 779 CMP/B; 780 JZ/WL1; and 781 JMP/WL7. As has been explained in each of the heretofore described modes, when a new mode is selected as different from WL mode, this new mode is rendered effective. When the mode setting dial 7 is left unchanged from WL mode position, the program of Stms. 421 to 423 and 777 to 780 is repeatedly carried out until the push button 7a is depressed.

Upon depression of the push button 7a at a time during the process of carrying out the just mentioned program, Stm. 424 CALL/START with the aforementioned START subroutine is carried out with the start of an exposure operation, while the aperture is fully opened. Upon Stm. 425 CALL/T1, such exposure operation is permitted to proceed for a time interval dependent upon the time data stored in H register. The subsequent Stms. 426 to 436 are identical with Stms. 402 to 412 for the wipe-out mode, so that a continuous succession of exposure operations with variation of the aperture in the open area thereof from the fully open through half open to fully closed state is carried out.

When the release is actuated no more as detected by carrying out Stms. 437 IN/RL; 438 SUI/#02 and 439 JP/WL3, a program beginning with Stm. 440 is carried out. This program is a sequence of instructions of Stms. 440 MVI/D,3; 441 CALL/REV; 442 CALL/T1 and 444 JNZ/WL4. Upon Stm. 440 MVI/D,3, a transfer of 3 to D register occurs. Upon 441 CALL/REV, the film motor is driven for rotation in the reverse direction to rewind the film for a time interval which is controlled by the next Stm. 442 CALL/T1. At the termination of duration of this time interval, Stm. 443 is carried out to subtract 1 from the content of D register. When the result of the DCR/D as detected by the next Stm. 444 JNZ/WL4 is not zero, the sequence of the instructions of Stms. 442 to 444 is carried out again. Such procedure repeats itself until the DCR/D results in zero. Now, the content of D register is 3 so that after the CALL/T1 is repeated 3 times, the result of the DCR/D becomes zero to start a program of Stms. 445 IN/PHASE to 448 CALL/STOP. As a result, the rewinding of the film takes place for a time interval equal to 3 times the selected time data. This means that the film is rewound to that frame with which the wipe-out exposure operation began.

When a second release is actuated as detected by Stms. 449 IN/RL; 450 CPI/#03; and 451 JNZ/WL5, Stm. 452 CALL/START is carried out with the start driving of the film motor for rotation in the forward direction. Upon a first of carrying out of Stm. 453 CALL/T1, an exposure operation is pformed with the fully closed aperture for the time interval T1. In subsequent thereto, Stms. 454 to 460 which are identical with Stms. 376 to 382 of wipe-in mode except that the CALL/PMO is replaced by the CALL/PMC, are carried out with the result that the auxiliary shutter assumes a position shown in FIG. 10A for opening the aperture to half the entire area thereof with which an exposure operation is performed for the time interval T1, and then takes a position shown in FIG. 10B where the aperture is fully opened to perform a subsequent exposure operation for the time interval T1. Thereafter, Stms. 461 IN/PHASE; 462 CPI/34; 463 JNZ/K19; and 464 CALL/STOP are carried out to stop the main shutter in the position equivalent to the initial phase position.

In summary, for the first time interval, an image of a first scene is formed on the film through the fully open picture gate as shown in FIG. 9C; for the second time interval, images of the first scene and a second scene which is different from the first scene are formed on the film along the same length thereof but at different areas laterally separated from each other as these images are projected through respective areas of the aperture as shown in FIGS. 9B and 10A respectively; and for the third time interval, the only second scene is photographed through the fully open aperture shown in FIG. 10B on that portion of the film which was exposed with the fully closed aperture shown in FIG. 9A. As a result, the first scene is wiped out from right to left as viewed in FIGS. 9 and 10, and at the same time the second scene is wiped in from the same direction as above.

After the completion of the wipe lap exposure operation, Stms. 464-1 CALL/PMO; 464-2 CALL/MS5; 464-3 CALL/PMSTOP; and 465 CALL/PMOST are carried out in sequence with the result that the auxiliary shutter is set to the initial open position. Upon Stms. 466 MVI/B,#OD; 467 IN/MODE; 468 CMP/B; 469 JZ/WL1 and 470 JMP/INITI14, a second of actuation of the release trigger 6 followed by the depression of the push button 7a will lead to the start of operation of the camera in WL mode provided that the mode setting dial 7 is left unchanged from WL mode position. Otherwise, when the mode setting dial 7 is displaced from the WL position to select a new mode, the mode scanning program starts to be carried out.

It will be seen from the foregoing that the cinematographic camera of the invention is controlled by use of the program. Although this program is described as written in ROM, it is of course possible to write this program in RAM (Random Access Memory). Further, the use of the program in controlling the cinematographic camera makes it possible to selectively perform a wide variety of operating modes while nevertheless preserving the simple structure of the control circuit.

What is claimed is:

1. A motion picture camera comprising:
   (a) a film transporting motor;
   (b) a rotary shutter having a shutter opening and rotating to an exposure opening, further making an exposure on a film when the shutter opening is at a position to pass over the exposure opening, while stopping the exposure on the film when the shutter opening passes over the exposure opening, whereby the shutter opening passes over the exposure opening every time the rotary shutter makes one rotation, thus effecting an exposure with an amount of light regulated by the shutter opening;
   (c) an auxiliary shutter arranged to make a reciprocating movement against the exposure opening, shifting alternately from a non-shielding position where it does not shield the exposure opening to a shielding position where it shields the exposure opening during the reciprocating movement;
   (d) a light measuring circuit for producing an output corresponding to the brightness of an object being photographed; and
   (e) a regulating circuit fro driving the auxiliary shutter as its first operation before the shutter opening of the rotary shutter is shifted to a position passing over the exposure opening to shift the auxiliary shutter to a shielding position, then driving the auxiliary shutter with a timing corresponding to an output of the light measuring circuit as a second operation thereof when the shutter opening of the rotary shutter is at a position passing over the exposure opening thus shifting said auxiliary shutter from the shielding position to the non-shielding position, as the rotary shutter makes one rotation, whereby an exposure time in which a light beam is irradiated onto a film through the exposure opening as the rotary shutter rotates will become an interval of time from the moment the auxiliary shutter is shifted from the shielding position to the non-shielding position till the moment the shutter opening of the rotary shutter passes over the exposure opening, thus such an exposure control as corresponding to a light measuring output will be made.

2. A motion picture camera comprising:
(a) a film transporting motor;
(b) a rotary shutter having a shutter opening and rotating to an exposure opening, further making an exposure on a film when the shutter opening is at a position to pass over the exposure opening, while stopping the exposure on the film when the shutter opening passes over the exposure opening, whereby the shutter opening passes over the exposure opening every time the rotary shutter makes one rotation, thus effecting an exposure with an amount of light regulated by the shutter opening;
(c) an auxiliary shutter making a reciprocating movement between the totally closing position for totally closing the exposure opening and the totally opening position for totally opening the same; and
(d) a regulating circuit, said circuit shifting the auxiliary shutter, as its first operation, to the totally closing position before the shutter opening of the rotary shutter is shifted to the position passing over the exposure opening, then shifting the auxiliary shutter from the totally closing position to the totally opening position, as its second operation, when the shutter opening of the rotary shutter is at the position passing over the exposure opening, as the rotary shutter makes one rotation, said regulating circuit gradually shortening a time interval from the moment the auxiliary shutter is shifted to the totally closing position as the first operation till the moment the second operation is started corresponding to an increase of the number of the first operations being carried out, whereby an exposure time in which a light beam is irradiated onto a film through the exposure opening as the rotary shutter rotates will gradually become longer, thus a shutter opening angle gradually becomes wider.

3. A motion picture camera comprising:
(a) a film transporting motor;
(b) a rotary shutter having a shutter opening and rotating to an exposure opening, further making an exposure on a film when the shutter opening is at a position to pass over the exposure opening, while stopping the exposure on the film when the shutter opening passes over the exposure opening, whereby the shutter opening passes over the exposure opening every time the rotary shutter makes one rotation, thus effecting an exposure with an amount of light regulated by the shutter opening;
(c) an auxiliary shutter making a reciprocating movement between the totally closing position for totally closing the exposure opening and the totally opening position for totally opening the same; and
(d) a regulating circuit, said regulating circuit shifting the auxiliary shutter, as its first operation, to the totally closing position before the shutter opening of the rotary shutter is shifted to a position passing over the exposure opening, then shifting the auxiliary shutter from the totally closing position to the totally opening position, as its second operation, when the shutter opening of the rotary shutter is at the position passing over the exposure opening, as the rotary shutter makes one rotation, said regulating circuit further gradually lengthening a time interval from the moment the auxiliary shutter is shifted to the totally closing position in the first operation till the moment the second operation is started corresponding to an increase of the number of the first operations being carried out, whereby an exposure time in which a light beam is irradiated onto a film through the exposure opening when the rotary shutter rotates gradually becomes shorter, thus a shutter opening angle becomes gradually shorter.

4. A motion picture camera comprising:
(a) a film transporting motor;
(b) a rotary shutter having a shutter opening and rotating to an exposure opening, further making an exposure on a film when the shutter opening is at a position to pass over the exposure opening, while stopping the exposure on the film when the shutter opening passes over the exposure opening, whereby the shutter opening passes over the exposure opening every time the rotary shutter makes one rotation, thus effecting an exposure with an amount of light regulated by the shutter opening;
(c) an auxiliary shutter arranged to make a reciprocating movement against the exposure opening, shifting alternately from a non-shielding position where it does not shield the exposure opening to a shielding position where it shields the exposure opening during the reciprocating movement;
(d) a detecting circuit, said detecting circuit detecting a phase of the shutter opening of the rotary shutter against the exposure opening; and
(e) a regulating circuit for driving the auxiliary shutter and shifting the same to the shielding position when the phase detected by the detecting circuit becomes a prescribed first phase, and driving the auxiliary shutter and shifting the same to the non-shielding position when the phase becomes a prescribed second phase.

5. A motion picture camera comprising:
(a) a film transporting motor;
(b) a rotary shutter having a shutter opening and rotating to an exposure opening, further making an exposure on a film when the shutter opening is at a position to pass over the exposure opening, while stopping the exposure on the film when the shutter opening passes over the exposure opening, whereby the shutter opening passes over the exposure opening every time the rotary shutter makes one rotation, thus effecting an exposure with an amount of light regulated by the shutter opening;
(c) an auxiliary shutter arranged to make a reciprocating movement against the exposure opening, shifting alternately from a non-shielding position where it does not shield the exposure opening to a shielding position where it shields the exposure opening during the reciprocating movement;
(d) a detecting circuit, said detecting circuit detecting a phase of the shutter opening of the rotary shutter against the exposure opening; and
(e) a regulation circuit for driving the auxiliary shutter in correspondence to the phase detected by the detection circuit to a shielding position and a non-shielding position.

6. A motion picture camera comprising:
(a) a film transporting motor;
(b) a rotary shutter having a shutter opening and rotating to an exposure opening, further making an exposure on a film when the shutter opening is at a position to pass over the exposure opening, while stopping the exposure on the film when the shutter opening passes over the exposure opening, whereby the shutter opening passes over the exposure opening every time the rotary shutter makes one rotation, thus effecting an exposure with an amount of light regulated by the shutter opening;
(c) an auxiliary shutter arranged to make a reciprocating movement against the exposure opening, shifting alternately from a non-shielding position where it does not shield the exposure opening to a shielding position where it shields the exposure opening during the reciprocating movement;
(d) information setting means for setting a shutter opening angle information; and
(e) a regulating circuit which, during one rotation of the rotary shutter, drives the auxiliary shutter as a first operation before the shutter opening of the rotary shutter is shifted to a position passing over the exposure opening to shift the auxiliary shutter to the shielding position, and as a second operation drives the auxiliary shutter from the shielding position to the non-shielding position with a timing corresponding to the information set by the information setting means while the shutter opening of the rotary shutter is at the position passing over the exposure opening, whereby the exposure time of the film through the exposure opening during one rotation of the rotary shutter corresponds to the time from when the auxiliary shutter is shifted from the shielding position to the non-shielding position to when the shutter opening of the rotary shutter passes over the exposure opening and the exposure is controlled in accordance with the set information.

7. A motion picture camera comprising:
(a) a film transporting motor;
(b) a rotary shutter having a shutter opening and rotating to an exposure opening, further making an exposure on a film when the shutter opening is at a position to pass over the exposure opening, while stopping the exposure on the film when the shutter opening passes over the exposure opening, whereby the shutter opening passes over the exposure opening every time the rotary shutter makes one rotation, thus effecting an exposure with an amount of light regulated by the shutter opening;
(c) an auxiliary shutter arranged to make a reciprocating movement against the exposure opening, shifting alternately from a non-shielding position where it does not shield the exposure opening to a shielding position where it shields the exposure opening during the reciprocating movement;
(d) an exposure information signal forming circuit for producing an exposure information signal; and
(e) a regulating circuit which, during one rotation of the rotary shutter, the auxiliary shutter as a first operation before the shutter opening of the rotary shutter is shifted to a position passing over the exposure opening to shift the auxiliary shutter to the shielding position, and a second operation drives the auxiliary shutter from the shielding position to the non-shielding position with a timing corresponding to the information signal of the signal forming circuit, whereby the exposure time of the film through the exposure opening during one rotation of the rotary shutter corresponds to the time from when the auxiliary shutter is shifted from the shielding position to the non-shielding position to when the shutter opening of the rotary shutter passes over the exposure opening, and the exposure is controlled in accordance with the exposure information signal.

* * * * *